US009925574B2

United States Patent
Christenson et al.

(10) Patent No.: US 9,925,574 B2
(45) Date of Patent: Mar. 27, 2018

(54) MODULAR OXIDANT DELIVERY SYSTEM

(71) Applicant: NUtech Ventures, Lincoln, NE (US)

(72) Inventors: Mark Christenson, Lincoln, NE (US); Steven Douglas Comfort, Lincoln, NE (US)

(73) Assignee: NUtech Ventures, Lincoln, NE (US)

( * ) Notice: Subject to any disclaimer, the term of this patent is extended or adjusted under 35 U.S.C. 154(b) by 7 days.

(21) Appl. No.: 15/086,532

(22) Filed: Mar. 31, 2016

(65) Prior Publication Data

US 2016/0288178 A1    Oct. 6, 2016

Related U.S. Application Data

(60) Provisional application No. 62/140,645, filed on Mar. 31, 2015.

(51) Int. Cl.
*B09C 1/08* (2006.01)
*B09C 1/00* (2006.01)
*C02F 1/72* (2006.01)
*C02F 103/06* (2006.01)

(52) U.S. Cl.
CPC ............. *B09C 1/002* (2013.01); *B09C 1/08* (2013.01); *C02F 1/72* (2013.01); *C02F 2103/06* (2013.01)

(58) Field of Classification Search
CPC ... B09C 1/002; B09C 1/08; C02F 1/72; C02F 2103/06
USPC ......... 210/747.8, 170.07; 405/128.5, 128.75, 405/129.25
See application file for complete search history.

(56) References Cited

U.S. PATENT DOCUMENTS

| | | | |
|---|---|---|---|
| 6,457,905 B1 * | 10/2002 | Nickell ................... | B09C 1/08 210/747.8 |
| 6,472,198 B1 * | 10/2002 | Semprini ............... | B09C 1/002 210/601 |
| 6,733,207 B2 * | 5/2004 | Liebert, Jr. ............. | B09C 1/00 405/128.5 |
| 7,431,849 B1 | 10/2008 | Swearingen et al. | |
| 2006/0016766 A1 * | 1/2006 | Kerfoot .................. | B09C 1/002 405/128.5 |

(Continued)

OTHER PUBLICATIONS

Christenson et al., "Using slow-release permanganate candles to remove TCE from a low permeable aquifer at a former landfill," Oct. 1, 2012, Chemosphere, 89(6):680-687.

(Continued)

*Primary Examiner* — Christopher Upton
(74) *Attorney, Agent, or Firm* — Fish & Richardson P.C.

(57) ABSTRACT

In one implementation, a direct-push oxidant candle apparatus for the treatment of contaminated groundwater through direct-push installation methods includes: a drive tip positioned at a bottom end of the apparatus, the drive tip having one or more front surfaces that are shaped to create a bore as force is applied to an opposite base surface of the drive tip; a structural pathway that is connected to and extend upwardly from the base surface of the drive tip; one or more oxidant delivery devices that are enclosed within the structural pathway; and one or more fluid supply lines that extend from one or more locations outside of the bore and that terminate at or near a bottom end of the structural pathway so that fluid supplied through the fluid supply lines travels through the structural pathway and along the one or more oxidant delivery devices.

20 Claims, 34 Drawing Sheets

(56) References Cited

U.S. PATENT DOCUMENTS

| | | |
|---|---|---|
| 2008/0275288 A1 | 11/2008 | Swearingen et al. |
| 2011/0195875 A1 | 8/2011 | Swearingen et al. |
| 2013/0248458 A1* | 9/2013 | Pisanova ................. B09C 1/002 210/747.8 |
| 2014/0231322 A1* | 8/2014 | Bastiaens ................ B09C 1/002 210/170.07 |
| 2016/0030988 A1* | 2/2016 | Dugan .................... B09C 1/002 210/747.8 |

OTHER PUBLICATIONS

Kambhu et al., "Developing slow-release persulfate candles to treat BTEX contaminated groundwater," Jan. 1, 2012, Chemosphere 89:656-664.

Ross et al. "Characteristics of potassium permanganate encapsulated in polymer," Journal of Environmental Engineering, 131.8 (2005): 1203-1211.

\* cited by examiner

Full-sized Candle with and without Aeration
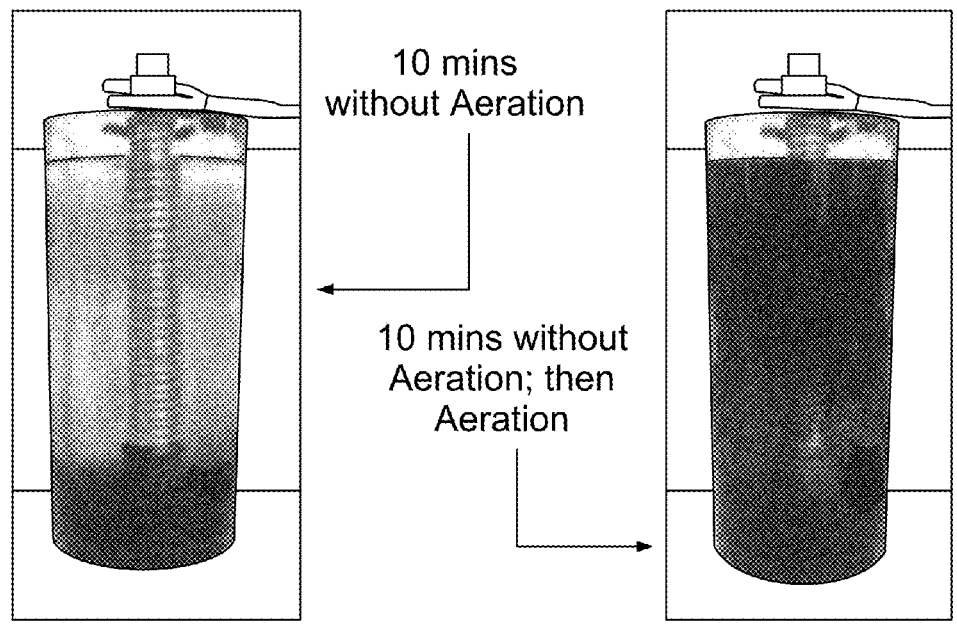
10 mins without Aeration
10 mins without Aeration; then Aeration
With Initial Aeration
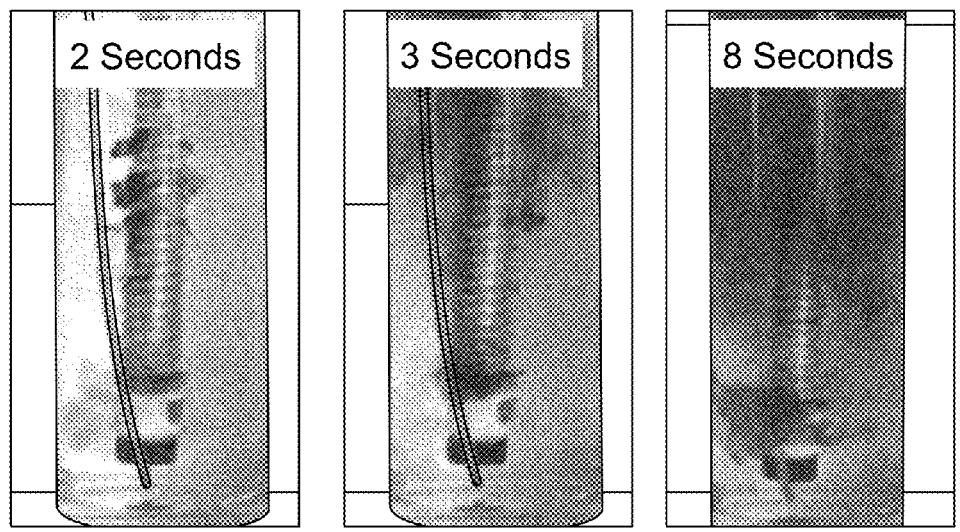
2 Seconds  3 Seconds  8 Seconds
FIG. 10

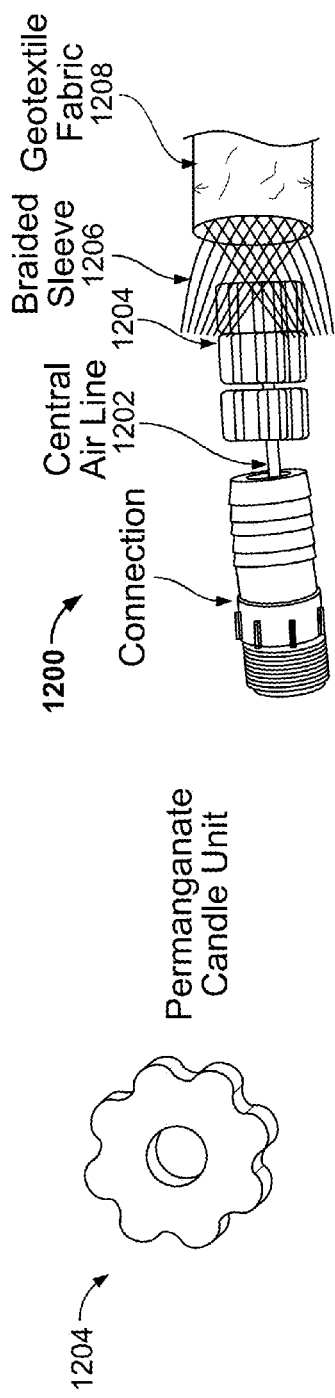
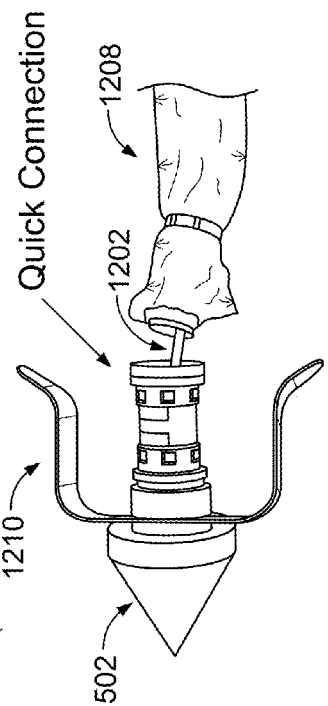
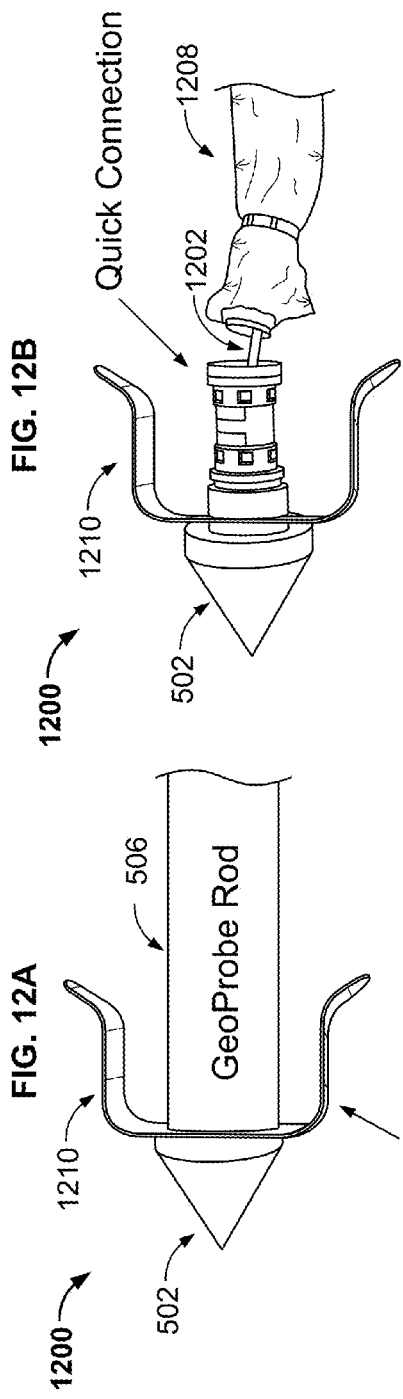
FIG. 12A  FIG. 12B  FIG. 12C  FIG. 12D

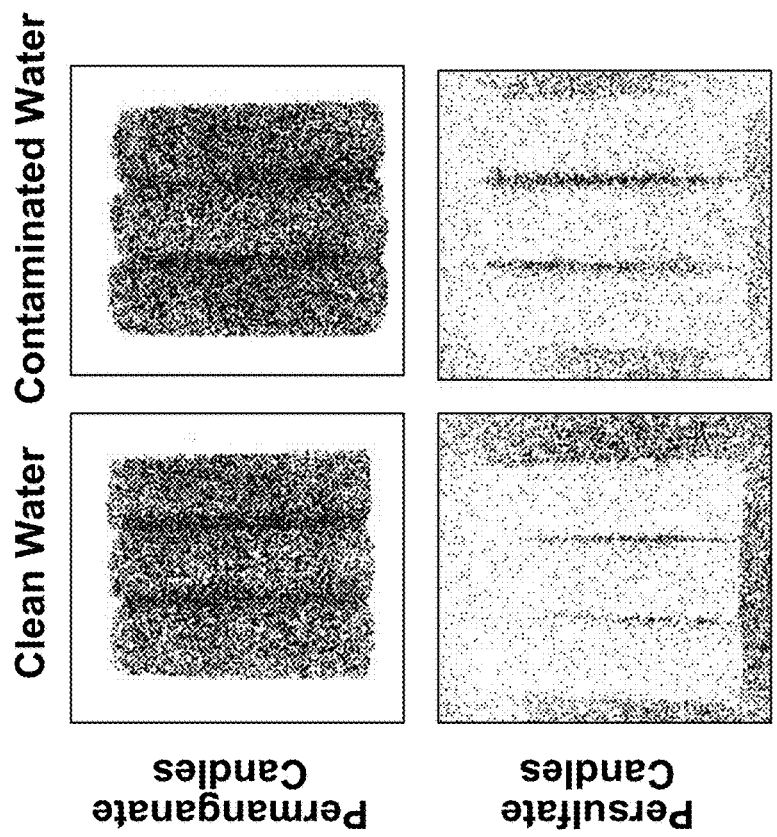
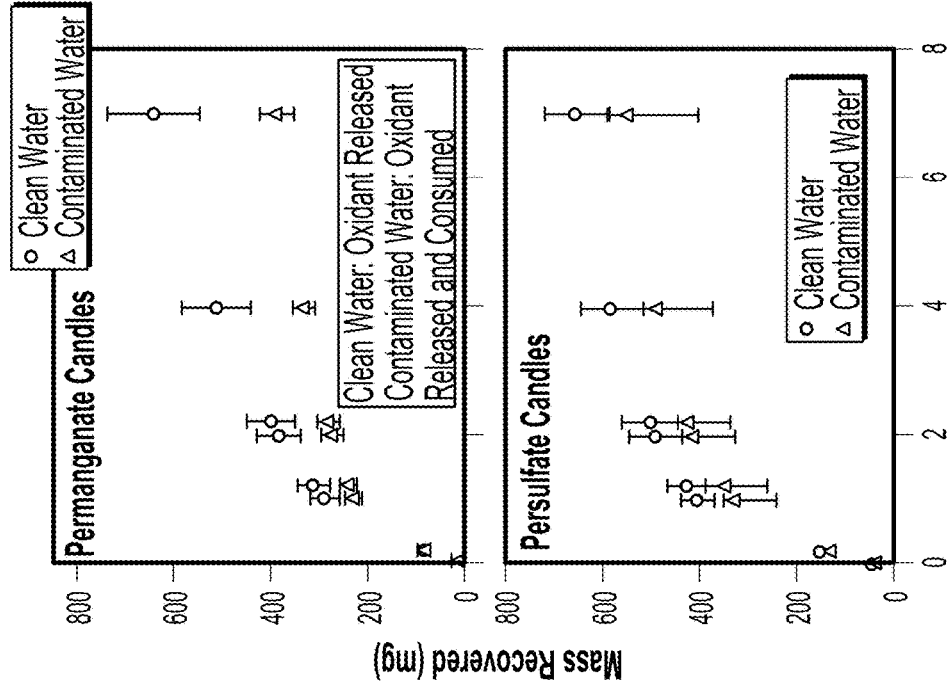
FIG. 17A
FIG. 17B

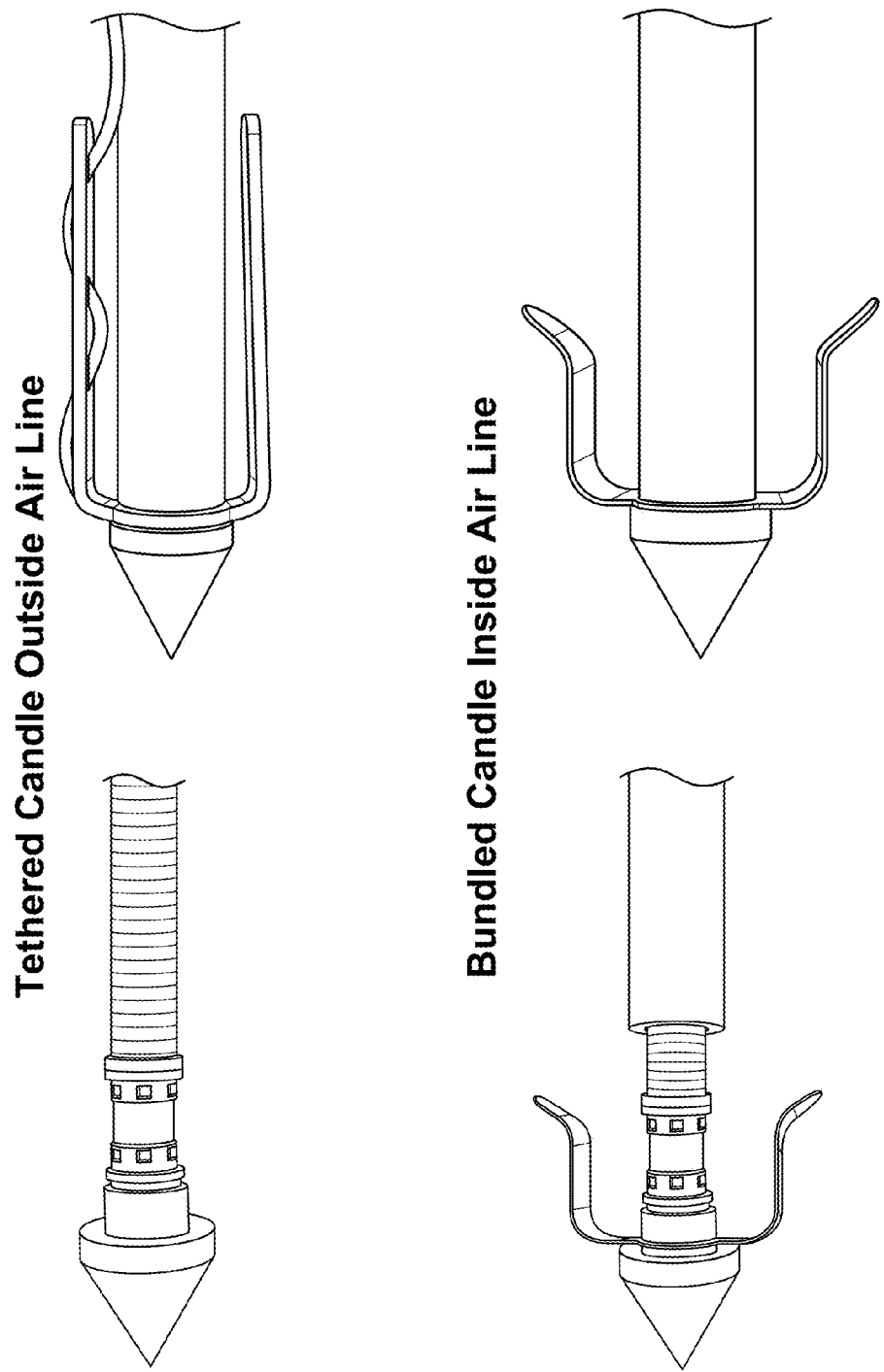

MODULAR OXIDANT DELIVERY SYSTEM

CROSS-REFERENCE TO RELATED APPLICATIONS

This application claims priority to U.S. Provisional Application Ser. No. 62/140,645, filed on Mar. 31, 2015, entitled "Modular Oxidant Delivery System," the entire contents of which are hereby incorporated by reference.

FEDERALLY SPONSORED RESEARCH

The disclosed technology was made with government support under a Small Technology Transfer grant (No. IR41ES22530-1A1) awarded by the National Institute of Health and a matching grant from the Nebraska Department of Economic Development. The government has certain rights in the technology.

TECHNICAL FIELD

This document generally describes technology related to slow-release oxidant candles for use in treating contaminated groundwater.

BACKGROUND

Various techniques have been used to treat contaminated groundwater, such as liquid injection of chemical oxidants (e.g., in situ chemical oxidation (ISCO)). However, treatment of contaminated groundwater located in low permeable zones of aquifers, which can have various contaminants, like trichloroethene (TCE), can be difficult to accomplish using such conventional techniques. Slow-release oxidant candles have been developed and deployed to treat contamination in groundwater in such situations. For example, permanganate-paraffin candles have been developed for treating chlorinated solvents and persulfate-paraffin/iron-paraffin candles have been developed for treating petroleum contaminants.

SUMMARY

In one implementation, a direct-push oxidant candle apparatus for the treatment of contaminated groundwater through direct-push installation methods includes: a drive tip positioned at a bottom end of the apparatus, the drive tip having one or more front surfaces that are shaped to create a bore as force is applied to an opposite base surface of the drive tip; a structural pathway that is connected to and extend upwardly from the base surface of the drive tip; one or more oxidant delivery devices that are enclosed within the structural pathway; and one or more fluid supply lines that extend from one or more locations outside of the bore and that terminate at or near a bottom end of the structural pathway so that fluid supplied through the fluid supply lines travels through the structural pathway and along the one or more oxidant delivery devices.

The apparatus can optionally include one or more of the following features. For example, the apparatus can further include a bracket with a front end that abuts, at least a portion of, the base surface of the drive tip and one or more arms that generally extend opposite a direction of the force that is being applied to the drive tip, the one or more arms of the bracket each defining a plurality of apertures. The one or more fluid supply lines can each threaded through the apertures of one of the one or more arms of the bracket. The apparatus can further include one or more shield components that extend around at least a portion of the one or more arms of the bracket so as to protect the fluid supply lines threaded through the one or more arms. The one or more shield components can emanate from between the base surface of the drive tip and the front end of the bracket, and terminate with a portion that flares laterally outward so as to form an anchor that prevents the drive tip from being retracted. The arms of the bracket and the one or more fluid supply lines can extend outside of a drive-rod that encloses the structural pathway.

The one or more fluid supply lines can be enclosed within the structural path. The one or more oxidant delivery devices can each define one or more apertures through which the one or more fluid supply lines extend. The one or more fluid supply lines and the structural pathway can be enclosed within a drive-rod that applies the force to the base surface of the drive tip. The apparatus can further include one or more anchor components that emanate from the base surface of the drive tip and terminate with a portion that flares laterally outward so as to form an anchor that prevents the drive tip from being retracted.

The one or more oxidant delivery devices can be one or more oxidant candles. The one or more oxidant candles can be one or more permanganate candles. The one or more oxidant candles can be one or more persulfate candles.

The structural pathway can be a conduit. The conduit can define holes along one or more sides of the conduit that expose, at least a portion of, the one or more oxidant delivery devices to media surrounding the conduit. The structural pathway can be a PVC screen. The structural pathway can be a geotextile fabric. The structural pathway can further include a braided sleeve.

The one or more front surfaces of the drive tip can have a generally conical shape. The apparatus can further include a connection component that is secured to the base surface of the drive tip and that is configured to be releasably connected to a connector that is secured to a bottom end of the structural pathway. The one or more fluid supply lines can be one or more air supply lines, and the fluid supplied through the one or more fluid supply lines can be air.

Implementations can include one or more of the advantages described below. For example, the disclosed technology can allow for the remediation of contaminated groundwater in low permeable zones in a manner that slowly dissolves and intercepts contaminants over many years. In another example, the disclosed technology can be used to prevent the dissolved oxidants from migrating downward from candles placed in porous aquifers through the use of pneumatic circulators that can produce air bubbles at the base of the candles. In addition to preventing oxidants from sinking, pneumatic circulators can also facilitate greater horizontal and spatial distribution of the oxidants. In a further example, the disclosed technology can be deployed without the use permanent wells, which can be expensive to install and maintain, and can hinder oxidant candle use at some locations. In particular, the disclosed technology can be installed to treat contaminated groundwater using a modular oxidant delivery system (e.g., candle and aerator) that is robust enough to be inserted with direct-push equipment that does not need a permanent well. Such features can provide a variety of additional advantages, such as decreased costs, deceased time for deployment and installation, decreased equipment requirements, and smaller sizes for both the apparatus and the installation site.

One or more implementations are set forth in the accompanying drawings and the description below. Other features, objects, and advantages will be apparent from the description and drawings, and from the claims.

DESCRIPTION OF DRAWINGS

FIG. 10 depicts photographs of tests comparing the distribution of oxidants with and without aeration for full-sized candled in an aluminum conduit.

FIGS. 12A-D depict another example direct-push oxidant candle assembly that can be used for installation of an oxidant candle through direct-push methods.

FIGS. 17A-B depicts results from tests performed using the flow-through system from FIG. 16.

FIG. 27 depicts the example direct-push candle assembly from FIG. 26 being used with both a tethered and bundled air line configuration.

Like reference symbols in the various drawings indicate like elements.

DETAILED DESCRIPTION

This document generally describes configurations of slow-release oxidant candles that can improve the treatment of groundwater and that can be more readily used through various methods of installation, such as direct-push installation. For example, this document describes configurations of oxidant candles that include pneumatic circulators to release air bubbles at or around the tip of the candles, which can improve the spatial distribution of oxidants and can minimize the amount that oxidants sink over time. Additionally, this document describes configurations of oxidant candles that permit installation by direct-push equipment, which can eliminate the need for permanent wells.

This document describes various types of oxidant delivery devices, including oxidant candles (e.g., wax-matrix oxidant candles), oxidant pucks, and/or other oxidant materials. Oxidant delivery devices can additionally include oxidant dispensing canisters that allow the oxidant chemical to be released over time, such as being released by diffusion (e.g., when density-driven flow is not observed). Other devices, products, and/or materials that are able to release oxidant over time can also be used.

Oxidant Candles and Aeration

Figure 1A:
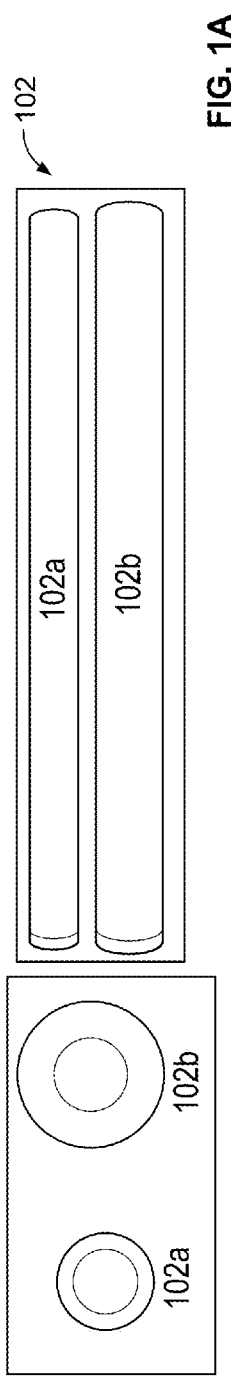
FIGS. 1A-B depicts example types of slow-release oxidant candles that can be used to treat groundwater contaminants.
Figure 1B:
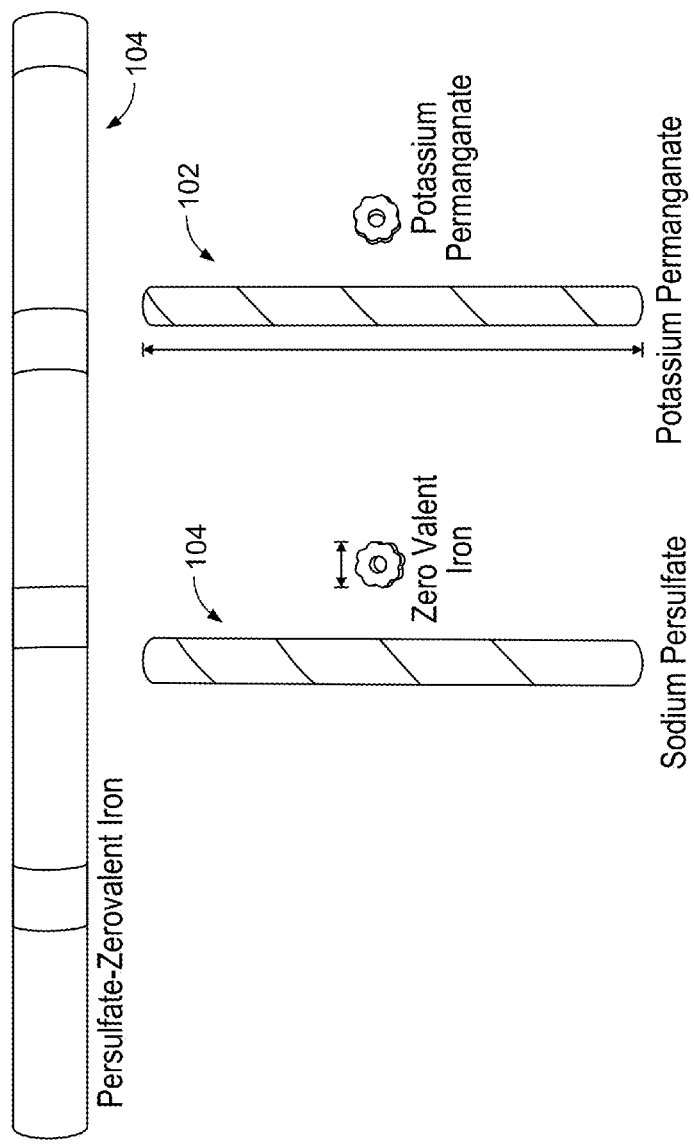
Figure 2A:
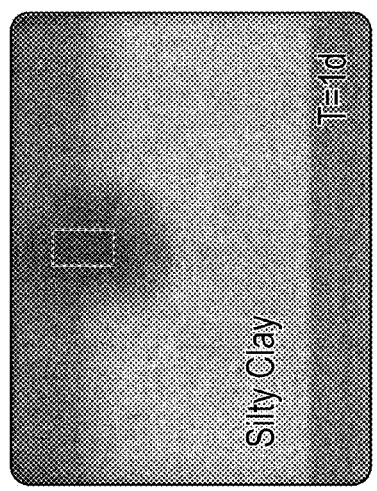
FIGS. 2A-F depicts photographs of example laboratory studies that were performed within various environments using miniature oxidant candles, such as the example candles.
Figure 2C:
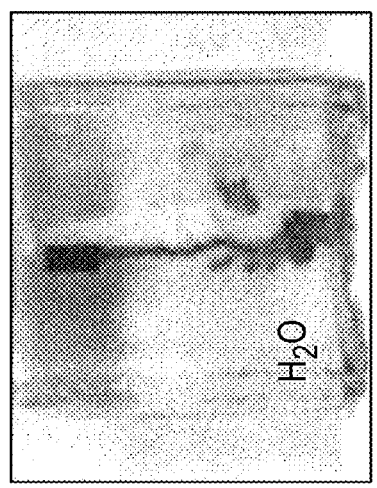
Figure 2E:
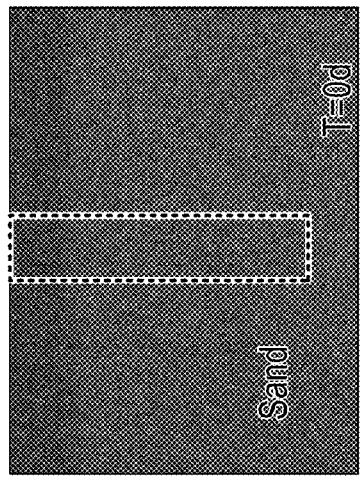
Figure 2B:
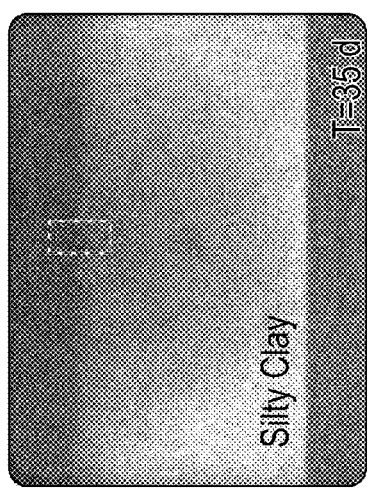
Figure 2D:
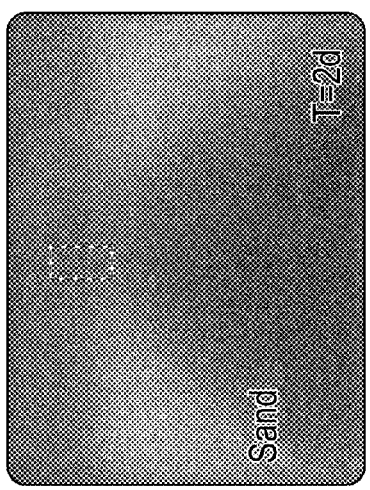
Figure 2F:
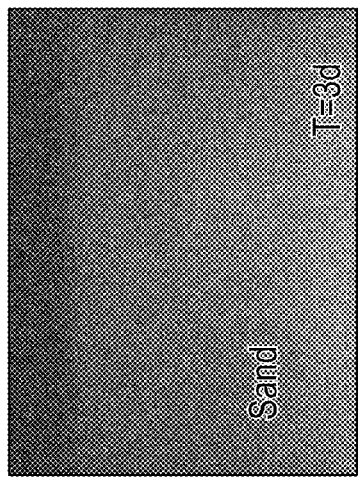

FIGS. 1A-B depict example types of slow-release oxidant candles 102-108 that can be used to treat groundwater contaminants. For instance, FIG. 1A depicts first example candles 102 that are permanganate-paraffin candles and can be used for treating chlorinated solvents, and a second example candle 104 as a persulfate-iron candle for treating petroleum contaminants. The candles 102 can have any of a variety of appropriate dimensions. For instance, the example candle 102a can have a diameter of 5.1 cm and a length of 91.4 cm, and the example candle 102b can have a diameter of 7.6 cm and a length of 91.4 cm. Other dimensions are also possible.

FIG. 1B depicts example components and dimensions of the candles 102 and 104, such as the component parts and dimensions of the permanganate-paraffin candle 102 and the sodium persulfate and zero valent iron components of the persulfate-iron candle 104. Example dimensions of the candles are depicted, including example diameters and example lengths of the candles 102-104. For instance, the candle 104 can have a diameter of 5.1 cm and a length of 91.4 cm. In another example, the candles 102 and 104 can have diameters of 1 inch and lengths of 12 inches. Other types of oxidant candles can also be used, and other dimensions for the candles 102-104 can also be used.

FIGS. 2A-F depict photographs (described below as photographs A-F) of example laboratory studies that were performed within various environments using miniature oxidant candles, such as the example candles 102-104. For example, photographs A-B depict the progression of a study performed using a saturated tank filled with low permeable silty clay soil and a miniature permanganate candle placed therein at 1 day (photograph A) and 35 days (photograph B). As illustrated by the results of this study, as the permanganate dissolves, it spreads laterally into the soil matrix without evidence of density flow.

While these slow-release candles can fill a niche by treating contaminants in low permeable zones, density driven flow could still be problematic when the candles are placed in sandy aquifers or heterogeneous aquifers with varying hydraulic conductivities. For instance, when permanganate candles are placed in water (photograph C) or a saturated tank filled with porous sand (photograph D), density gradients can cause the permanganate to sink. While permanganate has a distinct purple color that is easy to visualize in the photographs, persulfate is colorless. To illustrate how persulfate is also subject to density driven flow, the organic dye methylene blue was used in the study depicted in photographs E and F using persulfate-iron candles. Methylene blue turns colorless upon contact with sulfate radicals, which form when persulfate is activated by iron. A persulfate-iron candle was placed in sand tank flooded with methylene blue and, as depicted in the progression from zero days (photograph E) to three days (photograph F), density flow was observed. Dashed lines in photographs A-F shows the location of slow-release oxidant candle. Results from both types of oxidant candles used in these example studies confirm that density driven flow can occur in porous media.

Aeration devices, such as pneumatic circulators, can be used to overcome the downward migration of oxidants. For example, pneumatic circulators can release air bubbles at the base of the candle, which can alter flow patterns around candles, break the intermolecular forces holding oxidant together, and allow the oxidant to solvate with water and prevent downward migration.

Figure 3A:
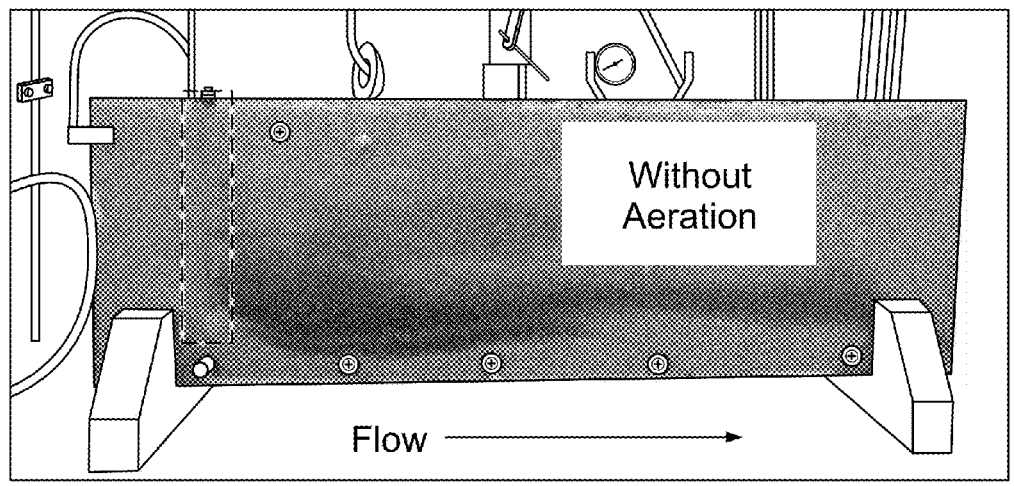
FIGS. 3A-B are photographs of a 2D tank with advection depicting results from example studies with and without aeration.
Figure 3B:
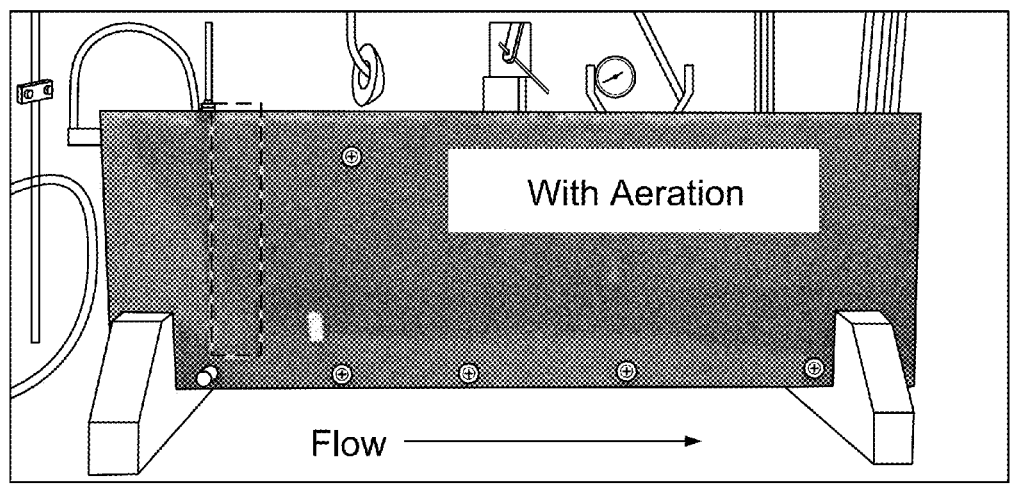

FIGS. 3A-B are photographs of a 2D tank with advection depicting results from example studies with and without aeration. For instance, FIG. 3A is a photograph of a study that did not use aeration with permanganate concentrations in 1.5 ft. by 4 ft. table-top groundwater flow model equipped with a permanganate candle. FIG. 3B is a photograph of a study under similar conditions, but with the addition of an outer screen and a pneumatic circulator. As indicated by the differences in the distribution between FIGS. 3A and 3B, a pneumatic circulator can promote uniform coverage of oxidant to a targeted zone.

Well-Based Installation of Oxidant Candles with Aeration

Figure 4A:
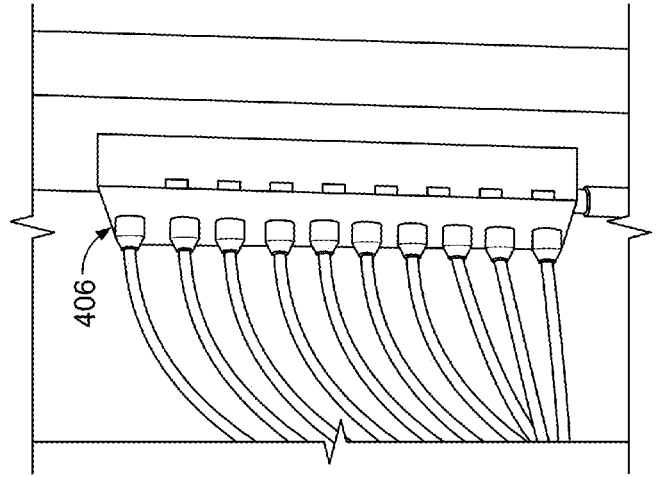
FIGS. 4A-C depicts an example well-based installation of oxidant candles with pneumatic circulators.
Figure 4B:
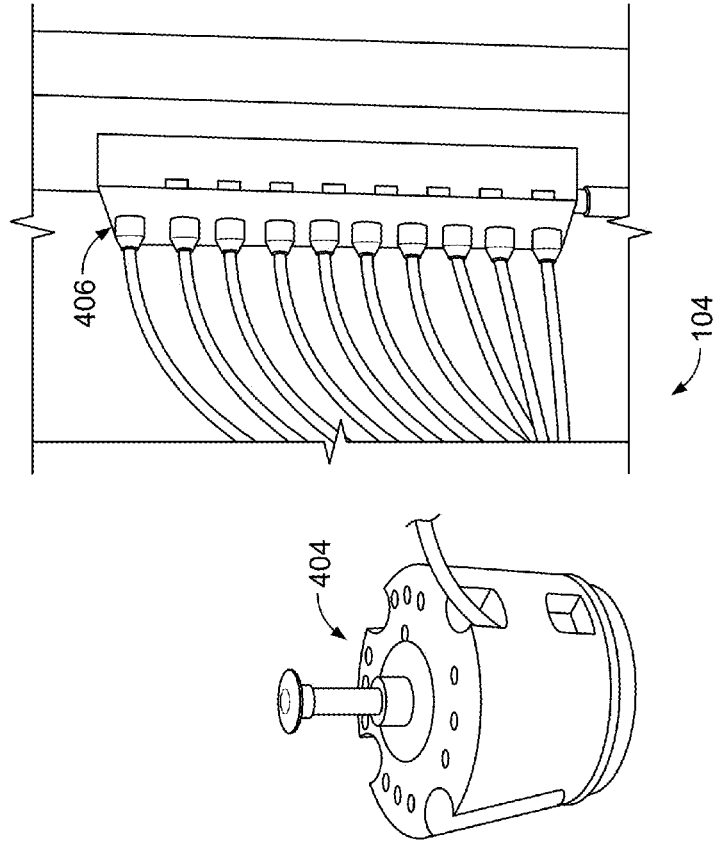
Figure 4C:
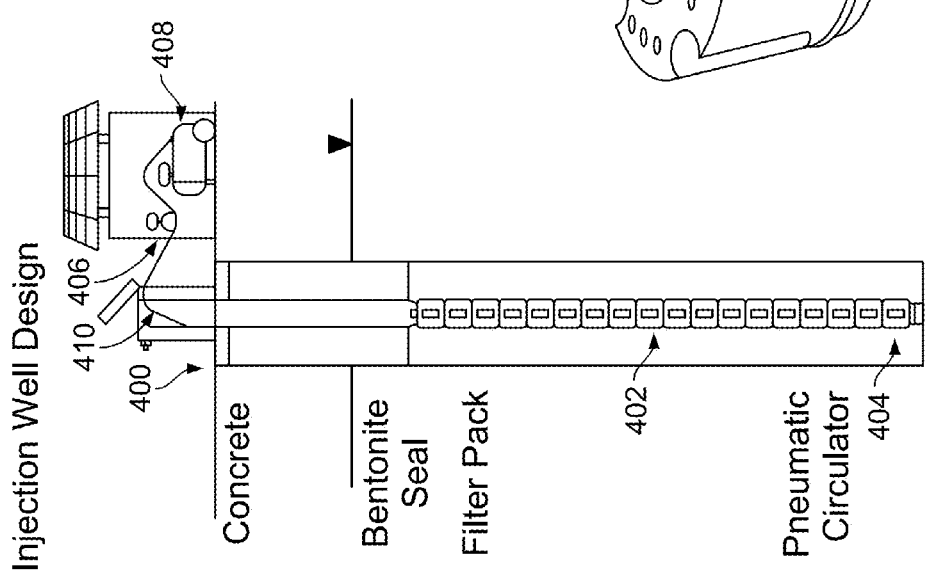

FIGS. 4A-C depicts an example well-based installation of oxidant candles with pneumatic circulators. For instance, FIG. 4A is a diagram of an example well 400 (e.g., permanent well) into which one or more oxidant candles 402 are placed with a pneumatic circulator 404 positioned at the bottom of well 400 and/or at the bottom end of the candles 402. The diagram also depicts an example manifold 406 that is driven by an air compressor 408 that are connected to the pneumatic circulator 404 by one or more air supply lines 410 (e.g., flexible tubing) that extend from the manifold 406 and air compressor 408, through the length of the well 400, and connect to the pneumatic circulator 404 to supply air at the base of the well 400 and the candles 402. FIG. 4B is a photograph of an example pneumatic circulator 404 and FIG. 4C is a photograph of an example manifold 406 that includes ports for 10 air supply lines, which can be used for up to 10 different wells containing the example configuration depicted in FIG. 4A.

As discussed above, the example configuration depicted in FIG. 4A with a pneumatic circulator can be used to prevent downward migration of oxidants (e.g., permanganate). However, such a configuration relying upon permanent wells for the placement of oxidant candles assisted by pneumatic circulators can hinder oxidant candle use at some sites where permanent wells are not feasible. Although installing permanent wells is commonplace, there are several drawbacks. These include the expense of contracting a drill rig, disposal of hazardous soil removed during drilling (e.g., drill cuttings), and the material costs of screens, well casings, gravel packs and registration permits. In addition, installing just a few wells can take days to complete. Accordingly, other mechanisms, such as direct-push installation methods, for placing oxidant candles with aeration systems that do not need permanent wells could be beneficial in the treatment of contaminated groundwater. Example methods, devices, components, and systems for providing direct-push oxidant candles with aeration are described in the sections below.

Direct-Push Installation with Aeration and Removable/Refillable Oxidant Chamber

Figure 4D:
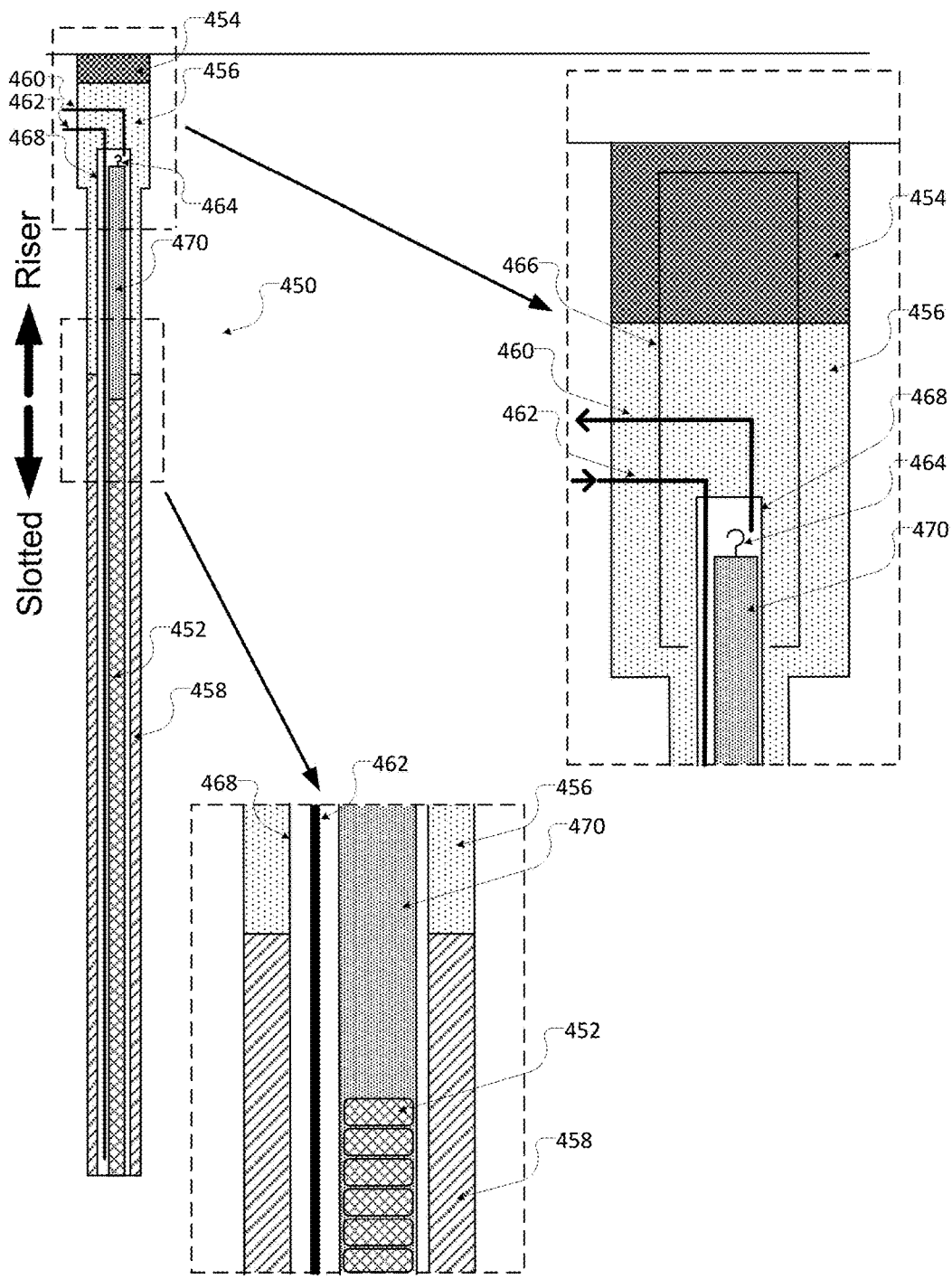
FIG. 4D depicts an example direct push-based installation of refillable oxidant candles with aeration.

FIG. 4D depicts an example direct push-based installation 450 of refillable oxidant candles with aeration. The installation 450 can be similar to the examples described with regard to FIGS. 4A-C, but is designed to provide an oxidant chamber 470 that can be more readily accessed and refilled with oxidant material 452 (e.g., oxidant pucks, oxidant candles, other suitable oxidant delivery devices/apparatus/materials). In particular, the installation 450 includes an air chamber 468 with sidewalls that define an opening into which the oxidant chamber 470 can be inserted and removed, along with an air/gas/fluid supply line 462 (which can extend to or near a base of the air chamber 468 and/or oxidant chamber 470 so as to delivery air to a bottom of the air chamber 468 and/or oxidant chamber 470). At least some portions of the sidewalls of the air chamber 468 can be perforated to permit the oxidant material 452 in the oxidant chamber 470 to interact with the surrounding groundwater.

The oxidant chamber 470 can include one or more sidewalls that define a space into which the oxidant material 452 is positioned. As depicted in this example, the oxidant material 452 (depicted as example oxidant pucks) is slotted into a bottom portion of the oxidant chamber 470, leaving the top portion of the oxidant chamber 470 to serve as a riser. The oxidant chamber 470 may be slotted with oxidant material 452 to one or more different depths, which can vary depending on a variety of factors, such as the depth of the installation 450, depths at which contaminants are found in the surrounding ground, groundwater flow in the area, and/or other appropriate factors. Similar to the air chamber 458, the sidewalls of the oxidant chamber 470 can be perforated or otherwise configured to permit the oxidant material 452 to interact with the surrounding groundwater, so as to treat contaminant in the groundwater.

The top of the oxidant chamber 470 includes a retrieval hook 464 (or other appropriate mechanism) that is affixed/attached to a top surface of the oxidant chamber 470 so as to permit the oxidant chamber 470 to be removed from the air chamber 468. For example, the oxidant chamber 470 can be removed after a period of time (e.g., 6 months, 1 year, 2 years) so that the oxidant material 452, which may be expended at that point, can be replaced with new oxidant material. After being refilled with new oxidant material, the oxidant chamber 470 can be inserted back into the air chamber 468 for continued use. In some implementations, the oxidant chamber 470 may be a single use and may be replaced with a new oxidant chamber. In other instances, the oxidant chamber 470 can be refillable and reusable.

The installation 450 can further include an exhaust line 460 that vents air/gas/fluids from at or near the top of the air chamber 468. The air exhaust line 460 can vent air/gas/fluid that is introduced into the air line 462, which can be supplied by air/gas/fluid by one or more appropriate sources, such as the air/gas/fluid supply system described above with regard to FIGS. 4A-C.

The installation 450 can include a collection of different materials surrounding the air chamber 468 so as to promote distribution of the oxidant material 452 into the surrounding ground water. For example, a bottom portion 458 of the direct push-based installation 450 can be fill material that permits groundwater to readily interact with the oxidant material 452, such as a gravel pack or other suitable fill material. A middle portion 456 of the installation 450 can include more dense/non-porous material that can seal a top of the air chamber 468, such as a bentonite seal, clay-based materials, and/or other appropriate materials. A top portion 454 of the installation 450 can include material, such as top soil, that is placed on top of the middle portion 456 and that can be readily removed to access the middle portion 456 and the installation 450. A locator apparatus 466 can be embedded within the middle portion 456 of the installation 450 and can extend into the top portion 454 so that a technician can readily locate the installation 450. For example, the locator apparatus 466 can be a metal wire or coil of sufficient size that it can be readily identified through visual and/or magnetic detection (e.g., detection by a technician digging in the area, detection with a metal detector).

The depth to which the middle portion 456 (e.g., bentonite seal) extends (also the depth at which the bottom portion 458 begins) can be, for example, 5 feet. Different depths are also possible. The depth of the overall installation 450 can be, for example, 21 feet. Different overall depths are also possible.

The removable/refillable direct-push installation 450 can allow for oxidant mass to be reloaded with new oxidant when needed. For example, the installation 450 provides limited space for the oxidant material 452, which may be exhausted over time. By providing removable and refillable features, the installation 450 has the ability to reload the drive point with new/fresh oxidant candles (or other oxidant delivery devices) when needed. In particular, the example installation 450 depicted in FIG. 4D provides a direct-push system with aeration that can be reloaded with new oxidant when needed.

The features from the installation 450 that permit it to be removable and refillable, such as the air chamber 468 and the removable oxidant chamber 470, can be combined with features for other implementations described throughout this document. Additionally, the other implementations described throughout this document can be modified to incorporate at least some of the features from the installations 450 so as to permit those other implementations to be readily refilled by a technician.

Direct-Push Oxidant Candles with Aeration

As discussed above, slow-release, oxidant-paraffin candles, when inserted into low permeable zones, slowly dissolve and intercept the contaminant over many years. To prevent the oxidant from migrating downward from candles placed in porous aquifers, pneumatic circulators can be used to produce air bubbles at the base of the candles, which can prevent the oxidant from sinking and can facilitate its horizontal distribution. To gain the advantages of using aerated oxidant candles but without the limitations associated with permanent wells, as mentioned above, modular oxidant delivery systems (candles+aerators) that are robust enough to be inserted with direct-push equipment can be used. Such direct-push oxidant candles with pneumatic circulators, which are described throughout this document, can be manufactured to withstand the physical forces exerted during installation through direct-push methods, which can make the installation and use of oxidant candles easier, faster, and less expensive to treat contaminated groundwater. Direct-push oxidant candles can be used in and applied in a variety of ways, such as to deliver chemical oxidants evenly to targeted zones (e.g., 15-30 vertical feet of aquifer, lithology).

FIGS. 5A-D depict an example direct-push oxidant candle assembly 500 that can be used for installation of an oxidant candle through direct-push methods. The example assembly 500 includes a drive tip 502 that forms a leading end of the assembly 500 and a bracket 504 that fits onto and is connected to a base of the drive tip 502. The drive tip 502 that is depicted has a generally conical shape, but other shapes are also possible. The bracket 504 that is depicted is U-shaped with a flat center portion (e.g., head) that is shaped and sized to fit the base of the drive tip 502. The bracket 504 also includes two side portions that extend from the center portion of the bracket 504 in an opposite direction from the drive tip 502. The bracket 504 can be sized and shaped so that the side portions of the bracket 504 extend along the outside of a direct-push rod 506 (e.g., GeoProbe rod), to which force can be applied to drive the assembly 500 into the ground by a direct-push rig/machine. The bracket 504 includes apertures defined by and extending longitudinally along the side portions of the bracket 504 through which an air supply line 508 (e.g., flexible tube) is interwoven. As the assembly 500 is driven into the ground by application of driving forces to the rod 506, the air supply line 508 is pulled down into the borehole (and outside of the direct-push rod 506) by the frictional engagement of the line 508 with the bracket 504 due to the line 508 being interwoven with the apertures of the bracket 504. This configuration can be called a "tethered candle."

A quick connection component 510 secures a candle portion of the assembly 500 to the drive tip 502. The quick connection 510 can be attached to the base of the drive tip 502 and can allow for quick attachment of the candle portion thereto. For instance, the candle portion can include a male threaded connection component 512 (e.g., ¾-inch male threaded connection) that is attached to a conduit 514 that surrounds and contains one or more oxidant candles (not depicted). The male threaded connection component 512 can be attach to the quick connection component 510, so as to quickly secure the oxidant candles within the conduit 514 to the drive tip 502. The quick connection 510, the threaded connection component 512, and the conduit 514 are sized and shaped to be enclosed inside the direct-push rod 506, which will be withdrawn from the assembly 500 and the borehole created by the drive tip 502 once the assembly 500 has been installed at an appropriate location.

Figure 5A:
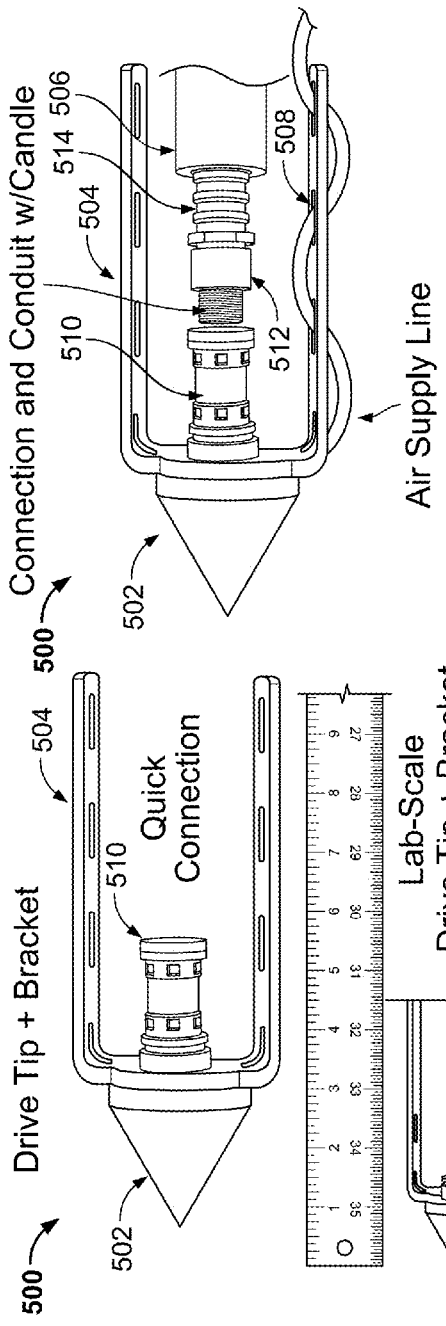
FIGS. 5A-D depict an example direct-push oxidant candle assembly that can be used for installation of an oxidant candle through direct-push methods.
Figure 5B:
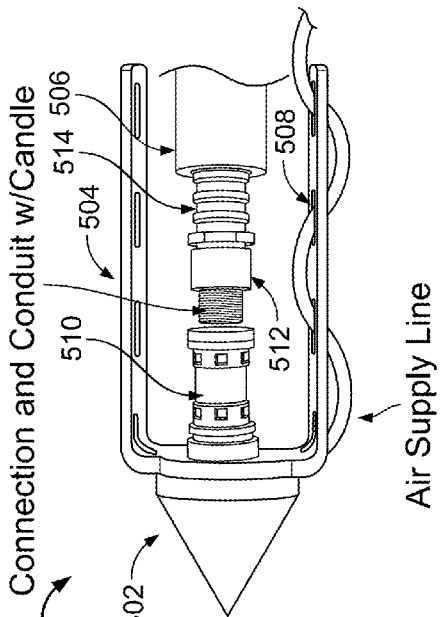
Figure 5C:
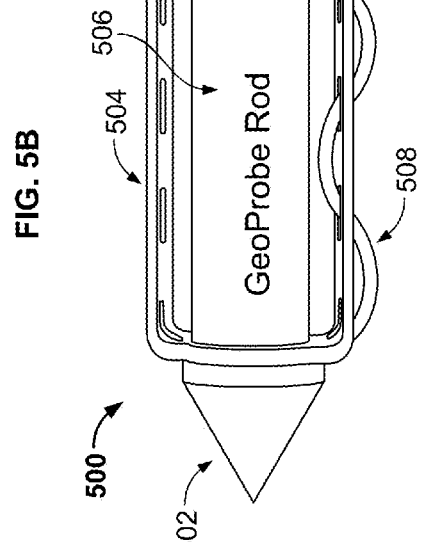
Figure 5D:
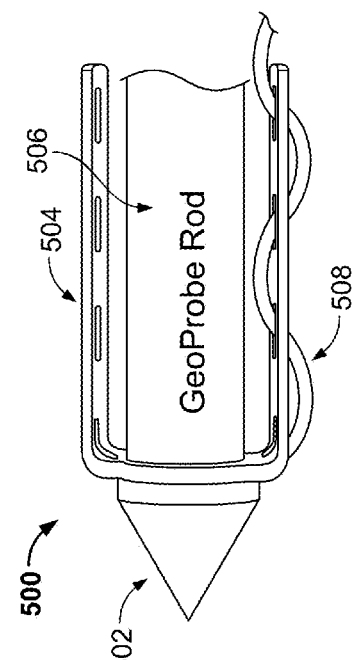

To prevent the air-supply line 508, which runs outside of the rod 506, from being damaged during installation, a protective shield 516 (e.g., piece of sheet metal) is connected to the drive tip 502 and extends around the bracket 504 and the supply line 508, as depicted in FIG. 5C.

Rather than just inserting the aeration tip and then bubbling air beneath the base of a fully exposed oxidant candle, a structural pathway for the air to travel vertically up and around the candles is provided by, in the examples depicted in FIGS. 5A-D, the conduit 514. Without such a structure providing a pathway for the air being supplied through the air supply line 508, it is possible that air could become trapped in the formation and cause groundwater to divert away from the candles. The air that is bubbled below the candle and eventually directed to the surface can be vented through a manifold to a location on the surface, such as a building or other structure housing an air compressor that is being used to supply air to the air supply line 508.

The rod 506 can be a standard GeoProbe rode with a 2.25 inch outside diameter (OD). In order for the direct-push candles (not depicted) to fit inside such sizing of the rod 506, the candle and structural enclosure should be less than 1.6 inches in diameter. For instance, candles that are used can be molded as cylinders that have a 1 inch OD and are 1 foot in length. To divert the air up and around these candles, a structural pathway should be selected that will fit within the inside diameter of the rod 506 (e.g., 1.6 inches) and that will provide sufficient space for air flow around the candles. Such structural pathways can include, for example, aluminum conduits, which are often used to house electrical wires in construction, and PVC screens with proper dimensions. Aluminum conduit can provide a variety of advantages, including being inexpensive, porous (e.g., allowing permanganate to move out from within the conduit), able to be easily cut to desired lengths, and able to easily fit inside the GeoProbe rod. Aluminum conduits can have a number of disadvantages, including leaving little space for air flow once the oxidant candle was placed inside the conduit and corrosion of the conduit with time that could impede chemical oxidant release. PVC screens can be custom-cut and conditioned to include the same advantages of conduits, and can additionally provide more space for air flow and be free from corrosion. Other structural pathways can also be used in the assembly 500.

The assembly 500 can have any of a variety of appropriate sizes and shapes. An example scale is depicted next to the ruler in FIG. 5A. Other sizes and scales are also possible.

Laboratory Tests of Direct-Push Oxidant Candles

A variety of laboratory tests were performed using direct-push oxidant candle assemblies, as described above with regard to FIGS. 5A-D.

Figure 6:
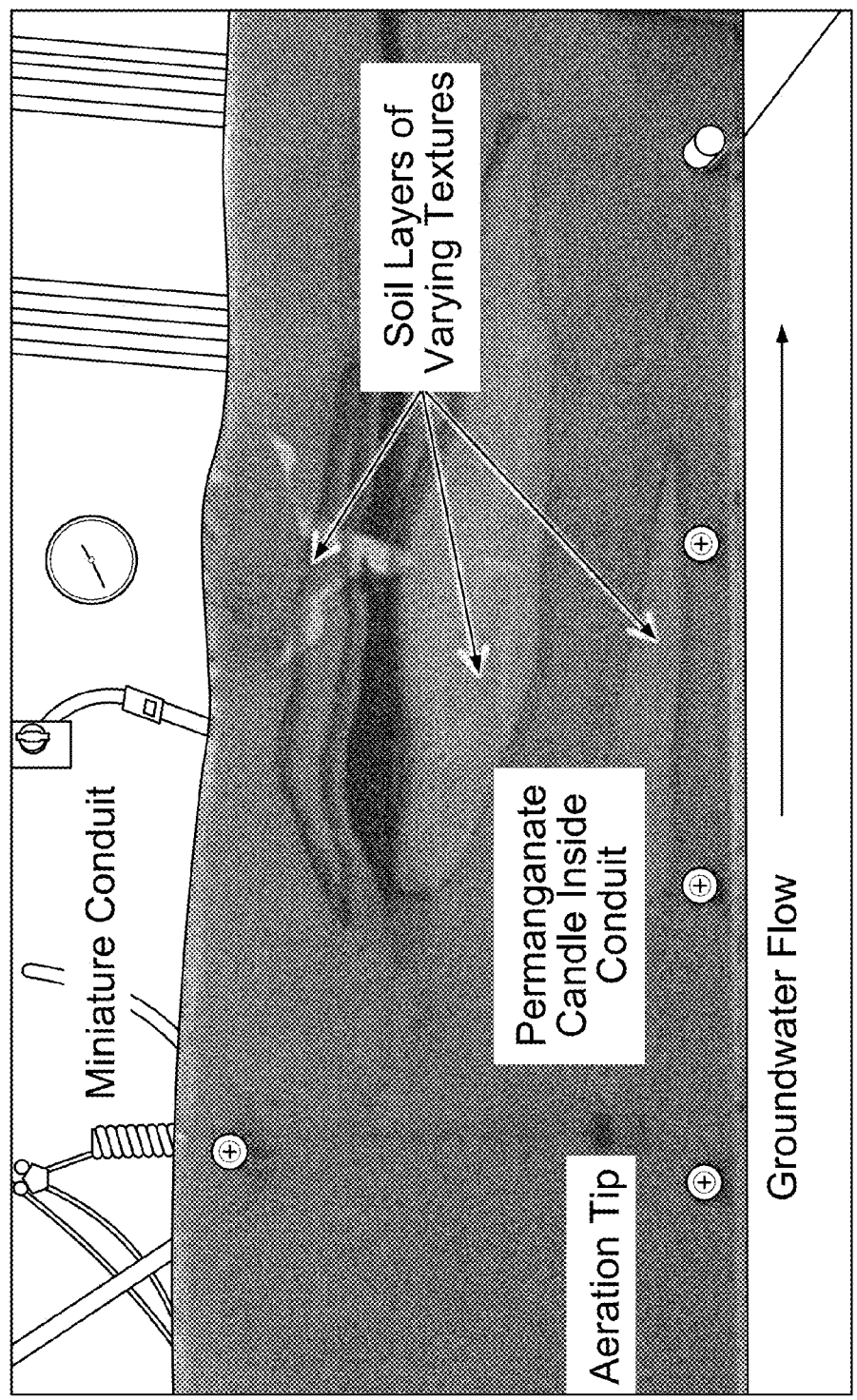
FIG. 6 is a photograph of an example flow box in which laboratory tests were performed.

FIG. 6 is a photograph of an example flow box in which laboratory tests were performed. Tests were performed using a miniature aeration tip and smaller diameter aluminum conduit. These experiments were designed to answer several questions. The first question was: Using the conduit as a carrier for the candles, how would bubbling air at the base of the conduit influence permanganate distribution? To answer that question, the flow box was set up with the following parameters: Flow rate going into and out of the flow box was 5 ml/min; with this flow rate, we tested the effects of air versus no air. Soil layers of various textures were also included in the flow box design, as depicted in FIG. 6.

Figure 7:
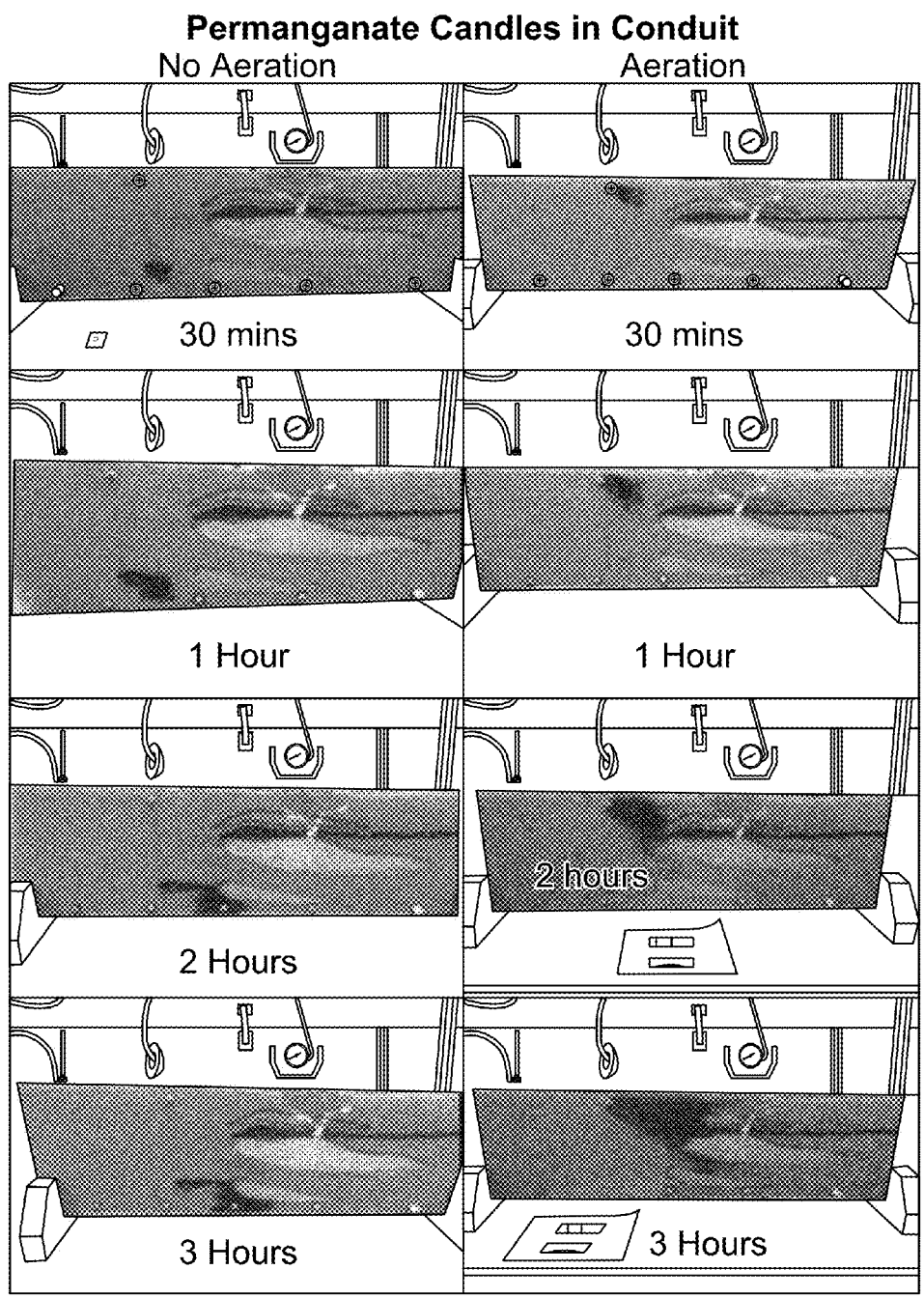
FIG. 7 depicts photographs showing the results of experiments performed with and without aeration in the flow box depicted in FIG. 6.

FIG. 7 depicts photographs showing the results of experiments performed with and without aeration in the flow box depicted in FIG. 6. Results from these tests showed that without aeration, the permanganate dissolving from the candle started to accumulate at the base of the candle unit. In contrast, with aeration, the opposite occurred and the permanganate was observed to first come out of the top of the candle unit and eventually spread more uniformly through the soil layers, as depicted in the progressions from the photographs at 30 minutes, 1 hour, 2 hours, and 3 hours in FIG. 7.

Figure 8:
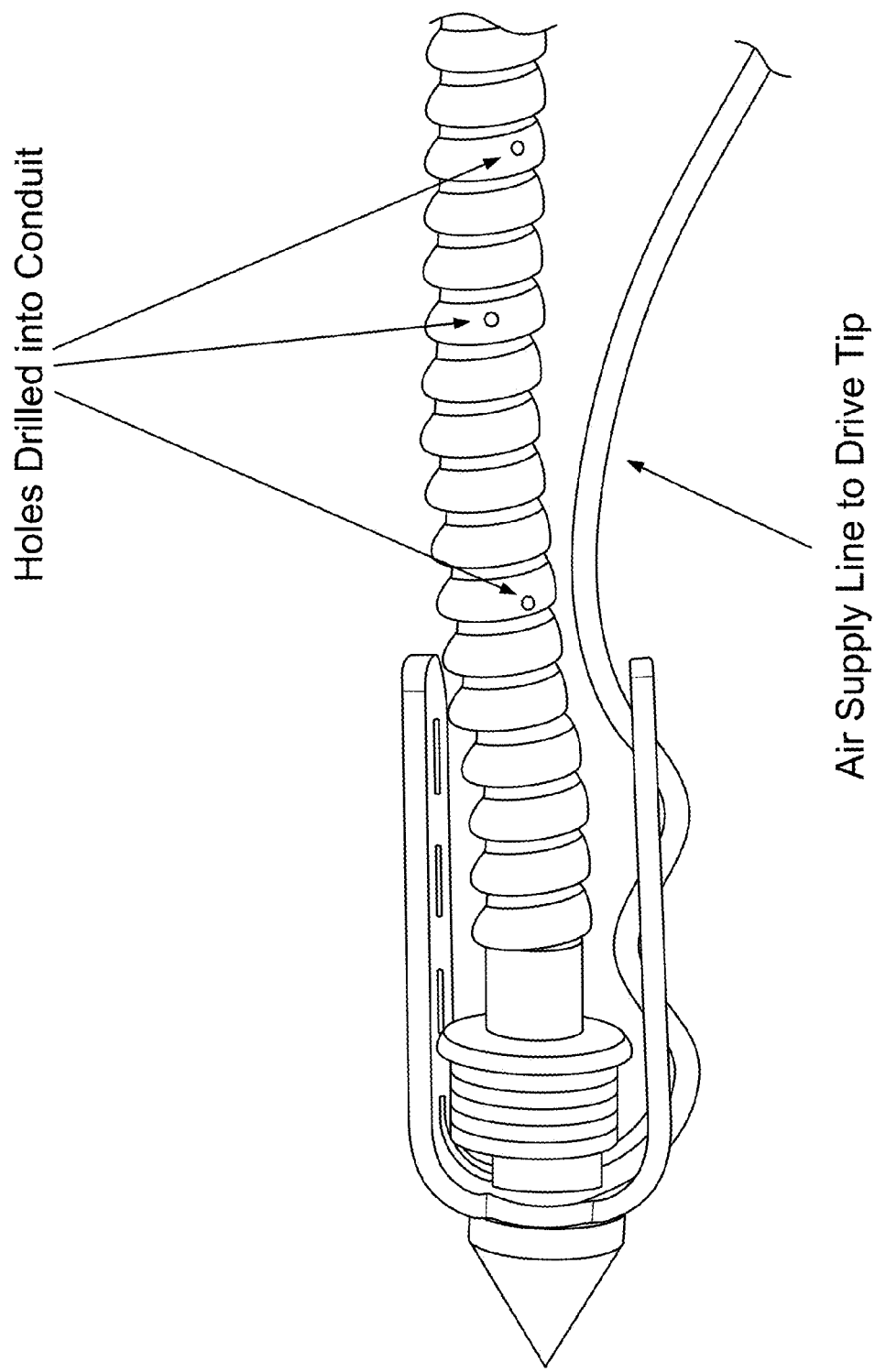
FIG. 8 is a photograph of an example variation on the direct-push oxidant candle assembly with holes positioned along the length of the structural pathway.

FIG. 8 is a photograph of an example variation on the direct-push oxidant candle assembly with holes positioned along the length of the structural pathway, which in this example is a conduit. In the depicted example, holes were drilled along two sides of the conduit, although holes could be drilled on fewer or more sides of the conduit. The depicted example can have any of a variety of sizes and scales. For instance, the depicted example can have a length of approximately 10 inches, with the tip and the bracket being approximately 4 inches in length. Other dimensions and scales are also possible.

Figure 9:
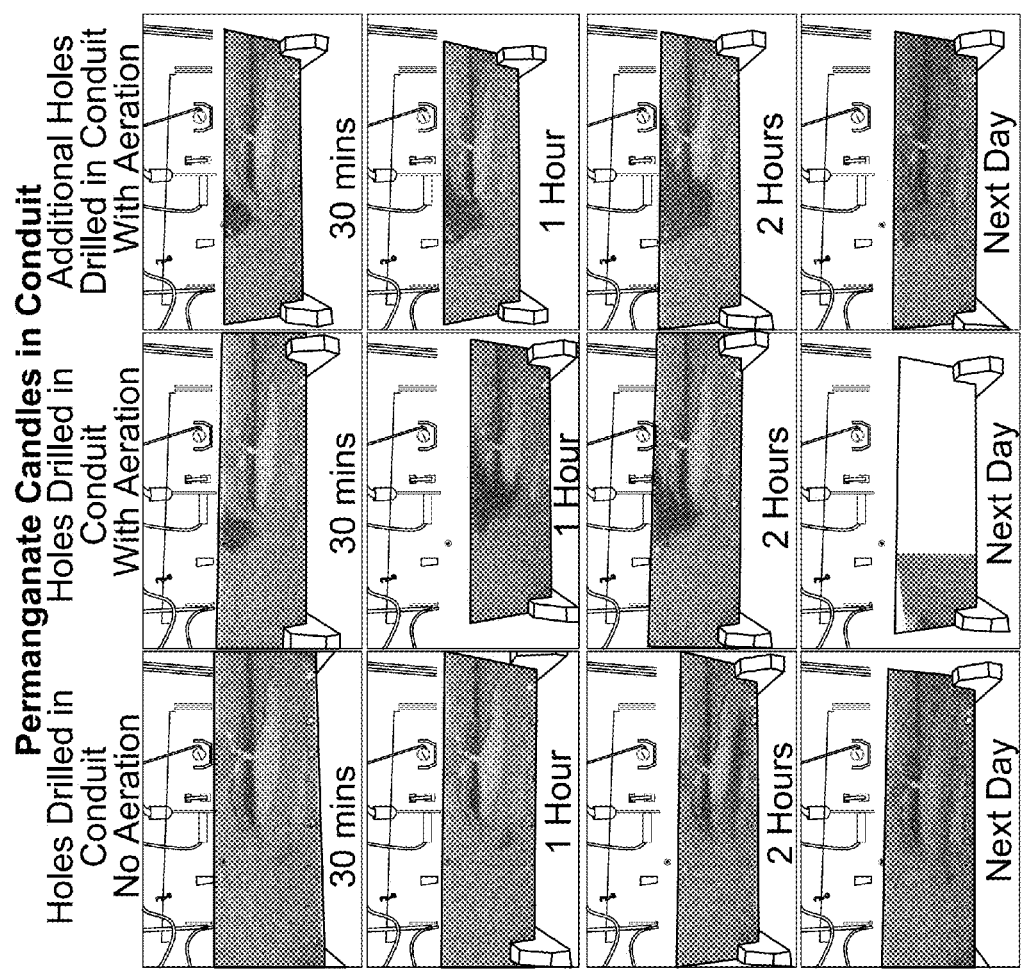
FIG. 9 includes photographs showing the results of experiments performed in a first test with holes drilled in the conduit and no aeration, a second test with holes drilled in the conduit and aeration, and a third test with additional holes drilled in the conduit and aeration.

FIG. 9 includes photographs showing the results of experiments performed in a first test with holes drilled in the conduit and no aeration, a second test with holes drilled in the conduit and aeration, and a third test with additional holes drilled in the conduit and aeration. By adding the holes, and then more holes, the release of permanganate was visually recorded, as depicted in time sequence of photographs in FIG. 9. The results showed that oxidant release was improved by adding more holes and distribution of the oxidant was more uniform in the transport experiments. By using holes and no aeration, less density driven flow was also observed.

FIG. 10 depicts photographs of tests comparing the distribution of oxidants with and without aeration for full-sized candled in an aluminum conduit. As showed by these results, in stagnant water (no aeration), the permanganate will sink. However, with aeration, the distribution is greatly enhanced by the bubbling action creating an upward turbulence that brings the permanganate to the top.

Figure 11:
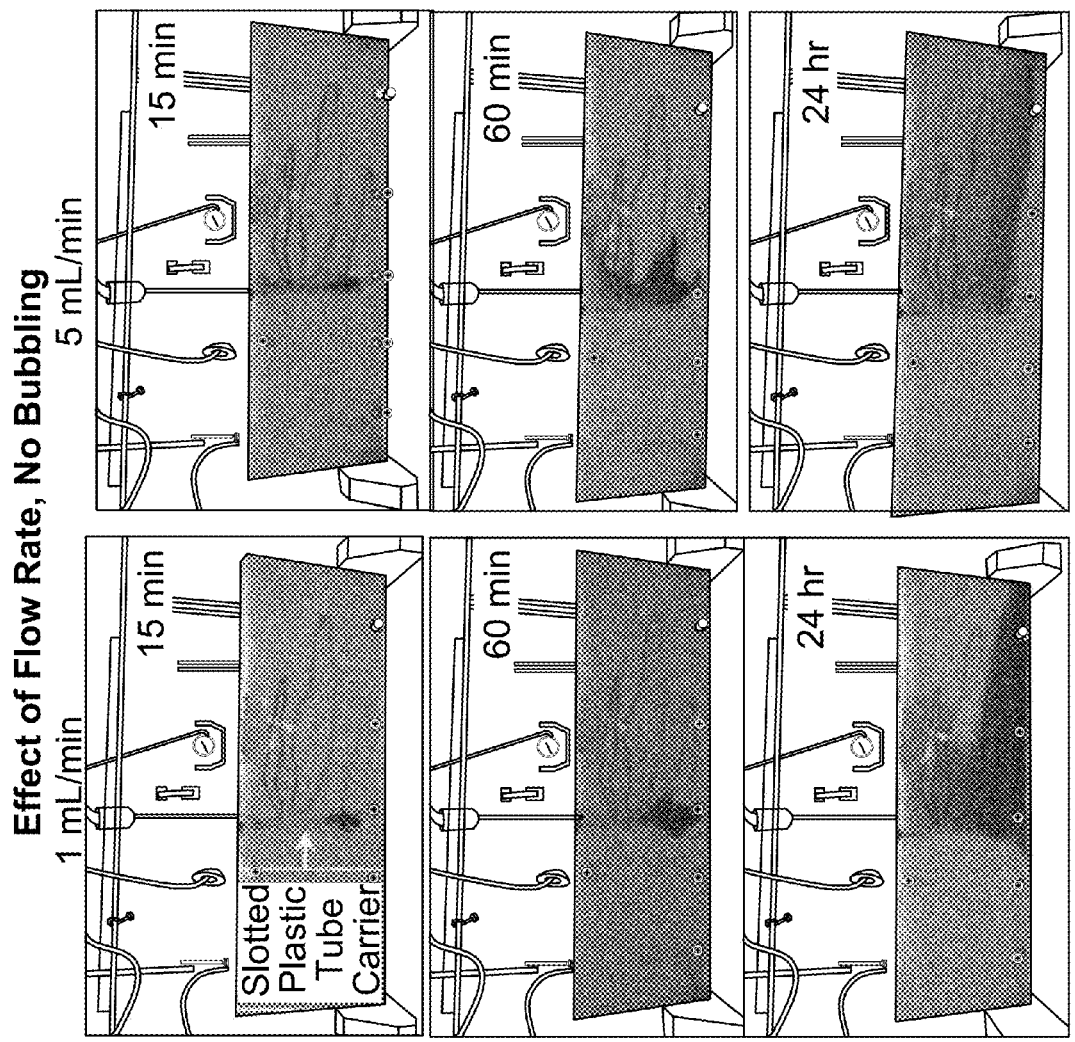
FIG. 11 depicts photographs showing the results of tests comparing the difference between advection and density-driven flow with no aeration.

FIG. 11 depicts photographs showing the results of tests comparing the difference between advection and density-driven flow with no aeration. For example, downward density driven flow from candles will not always be observed. With ample advection and the right type of candle housing, horizontal spreading of oxidants (e.g., permanganate) can be observed. In experiments using a plastic screen, it was found that higher flow rates negated the need for bubbling air beneath the candle. At the low flow rate (1 ml/min), some evidence of density flow was observed but at the higher flow rate (5 ml/min), better horizontal distribution of permanganate was observed, even when bubbling was not used.

FIGS. 12A-D depict another example direct-push oxidant candle assembly 1200 that can be used for installation of an oxidant candle through direct-push methods. The example assembly 1200 is similar to the assembly 500 described above with regard to FIGS. 5A-D, but with a few differences. In particular, the assembly 1200 includes a central air line 1202 that is enclosed inside of the rod 506 during installation instead of outside the rod 506, as with the air supply line 508. The central air line 1202 can help avoid possible damage that could result from field installation of an air supply line external to the rod 506, such as the air supply line 508.

In depicted assembly 1200, the central air line 1202 travels down the assembly 1200 through holes in the oxidant candles 1204, which in this example are a collection of circular disks with holes in the center. Other shapes and configurations of the candles 1204 are also possible. For example, the air line 1202 can travel down the side of the candles 1204, which may be solid (no hole) and/or can include one or more notches in their side walls to fit the air line 1202. In another example, the candles 1204 can be taller than the circular disks depicted as part of the example assembly 1200 (e.g., the candles 1204 can be rod-shaped).

In the assembly 1200, the candles 1204 are surrounded by a braided sleeve 1206 and geotextile fabric 1208. The braided sleeve 1206 and the geotextile fabric 1208 can serve a similar function as the conduit 514 by defining as a structural pathway through which air can travel from the base of the assembly 1200 at the tip 502, along the candles 1204, and be vented at the surface. The assembly 1200 may be call the "bundled candle."

The example assembly 1200 also includes an anchor component 1210 that, similar to the bracket 504 and the supply line protector 516, extends from the base of the drive tip 502 and in a direction that is opposite the drive tip 502. The anchor component 1210 can ensure that the bundled candle assembly 1200 stays in place after the desired drive point has been reached so that the drive tip 502 does not retract when the rod 506 is pulled up. As depicted, the anchor component 1210 can be flared outward so that it will dig into the surrounding soil and retain its position in the event that the drive tip 502 begins moving backward with the rod 506 as the rod 506 is being retracted. The bracket 504 and/or the supply line protector 516 can provide a similar anchoring function as the anchor component 1210. For example, the supply line protector 516 can be flared out in a similar manner.

The advantages of the bundled candle assembly 1200 are that there is a reduced chance the air line 1202 will be damaged during installation, the smaller candles can provide more surface area (faster release), and water flow in and out of the candle zone can be more rapid through the geotextile fabric than the aluminum conduit. The disadvantages of the bundled candle assembly 1200 are that they may be more difficult to install (may not slide in and out of the rod 506 as easily as the conduit 514) and they may take more time to install due to having to connect air lines between candles (e.g., couplings may be used between each candle segment, such as every five foot candle segment). Such connections can provide potential opportunities for air leaks.

The depicted examples in FIGS. 12A-D can have any of a variety of appropriate shapes, sizes, and scales. For instance, the candles 1204 in FIG. 12A can have a diameter of between 1-2 inches, the example depicted in FIG. 12B can have a length of approximately 8 inches, and the example depicted in FIG. 12D can have a length of approximately 10 inches. Other sizes and scales are also possible.

Figure 13:
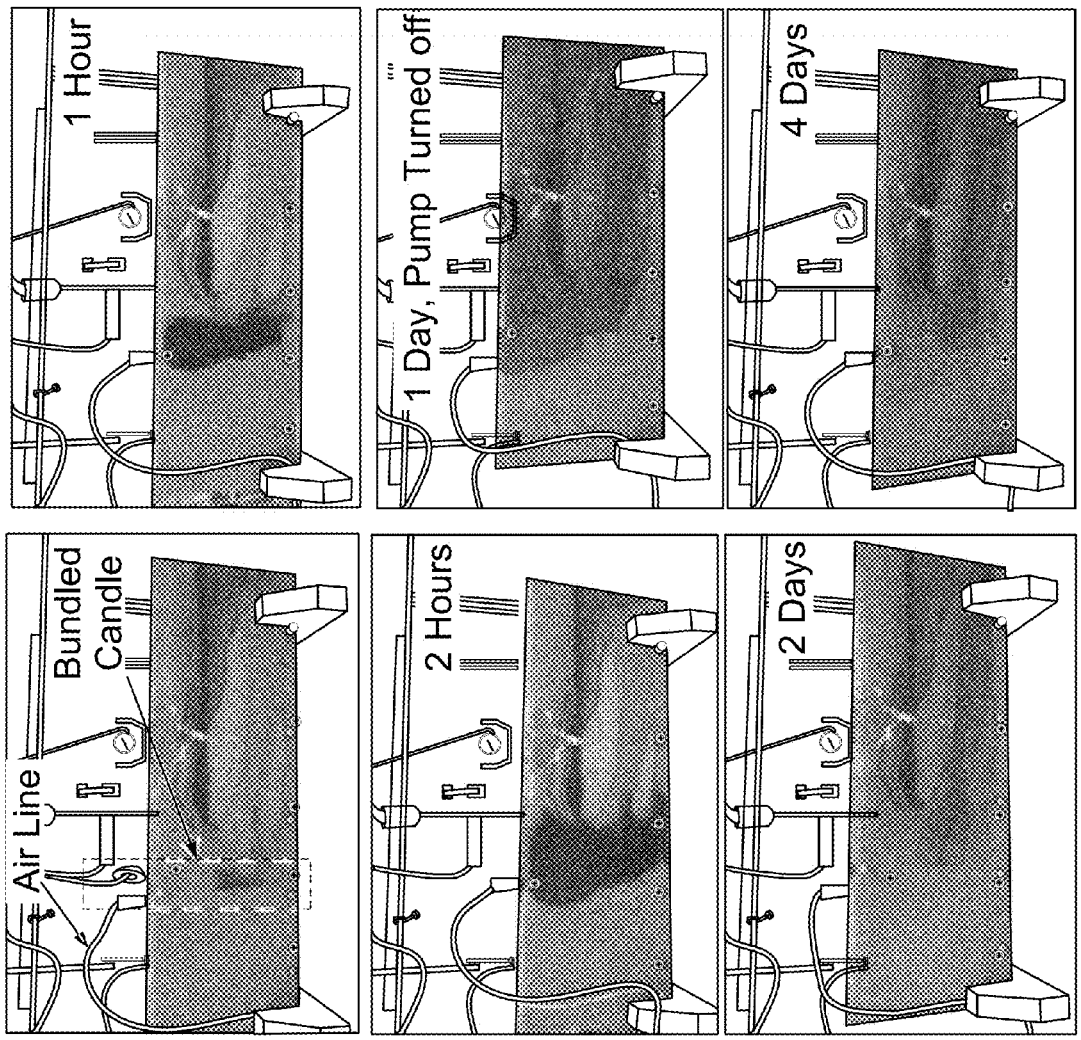
FIG. 13 depicts photographs of an example test with a bundled candle apparatus.

FIG. 13 depicts photographs of an example test with a bundled candle apparatus. As depicted in the time progression in the photographs, a steady and uniform release of permanganate was detected with advection. The higher surface area of the candles in the bundled candle apparatus resulted in larger flushes of permanganate than that observed with the tethered candle apparatus described above. In the narrow 2D flow box used for the test, the rapid release of permanganate from the bundled candle apparatus resulted in some migration of the permanganate going against the flow gradient (see permanganate distribution near the surface at T=1 day).

Figure 14:
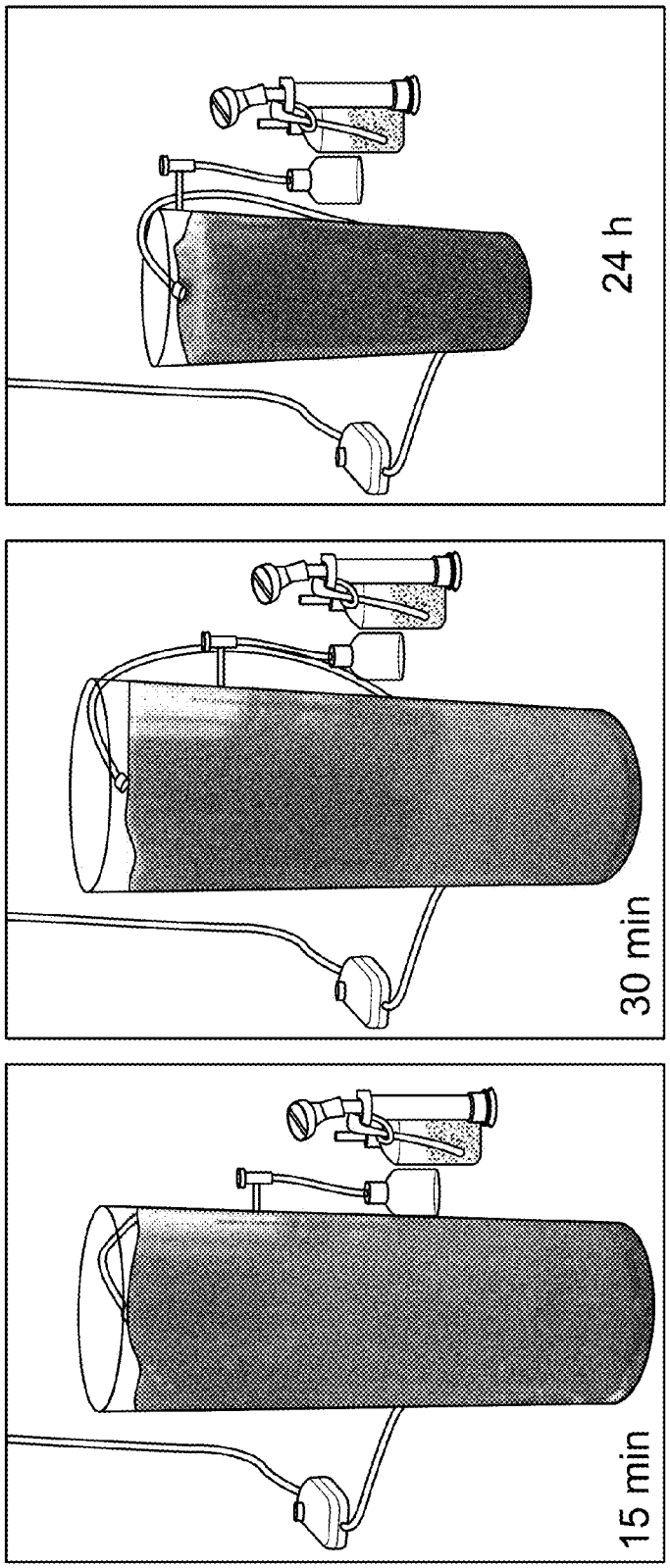
FIG. 14 depicts photographs of an example test using a field-scale sized bundled candle apparatus in a clear glass tank containing saturated sand.

FIG. 14 depicts photographs of an example test using a field-scale sized bundled candle apparatus in a clear glass tank containing saturated sand. As depicted in the time progression in the photographs, permanganate released from the top of the candle was observed to be distributed throughout the test chamber.

Chemical Analyses

Chemical analyses can be performed as part of the tests and using the candle apparatuses described throughout this document, including analyses regarding quantification of permanganate and persulfate concentrations, VOC analysis, and water quality parameters. For example, permanganate concentrations can be measured colormetrically at one or more appropriate sizes (e.g., 525 nm) with a spectrophotometer (e.g., a HACH DR2800 Visual Spectrum spectrophotometer). In another example, persulfate can also analyzed colormetrically with iodide and a spectrophotometer (e.g., the Hach DR2800) at one or more appropriate settings (e.g., 450 nm). When appropriate, both permanganate and persulfate samples can be diluted with $H_2O$ so that measured concentrations can fall within appropriate linear absorbance ranges (<150 mg $L^{-1}$). Groundwater samples can be analyzed for VOCs with, for example, a gas chromatograph/mass spectrometer using EPA method 8260B. Water samples can be analyzed for pH, conductivity, dissolved oxygen, temperature, and/or oxidation/reduction potential using, for example, a YSI 556 MPS.

Candle Testing and Composition

Figure 15:
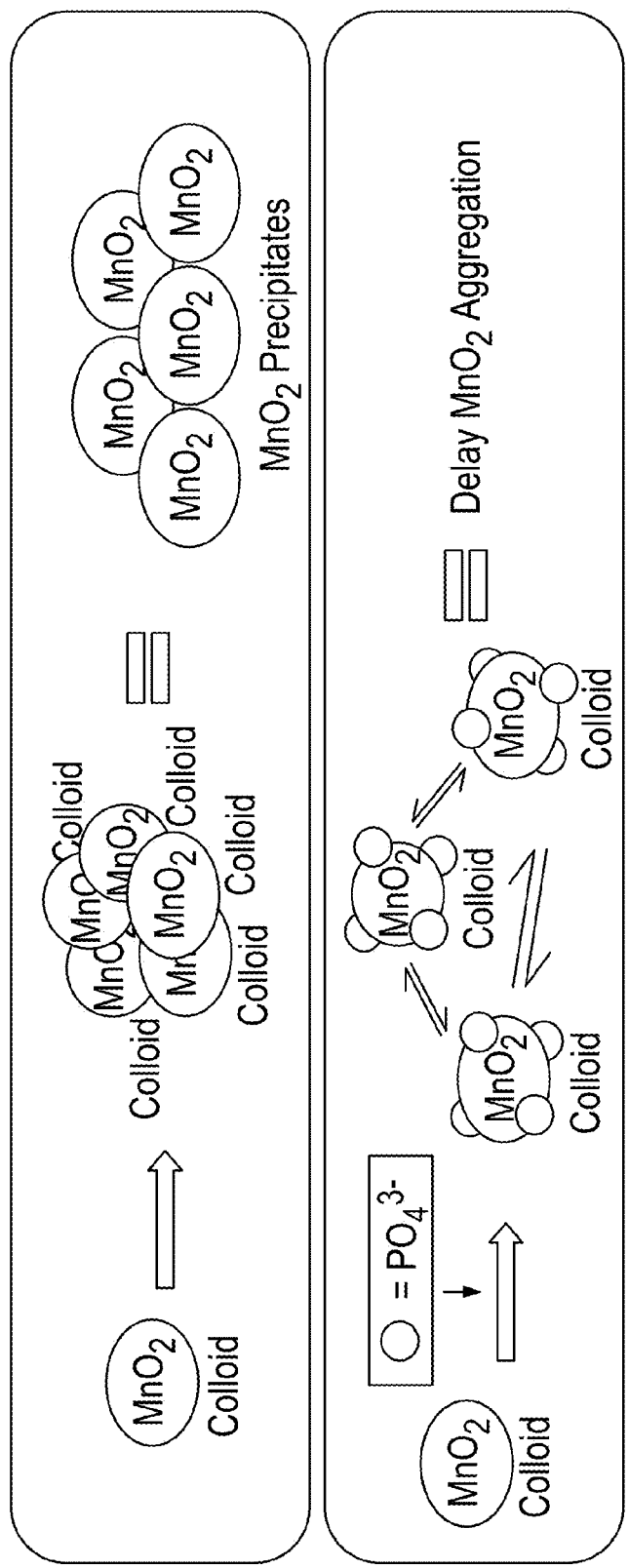
FIG. 15 depicts a schematic of how $MnO_2$ precipitation can be mitigated with phosphate additives.

In addition to developing the example direct-push candles described above, candle formulations have been developed to improve upon the release characteristics of the slow-release oxidants. To develop such compositions, tests were performed measuring the release characteristics of the oxidant candles when immersed in contaminated groundwater from a test field site. One of the challenges to using permanganate candles is that when permanganate dissolves from the wax matrix and reacts with organic contaminants, the product of the reaction is the insoluble precipitate manganese dioxide ($MnO_2$). This oxide can coat the outside of the candle over time and impede the release of permanganate. The precipitation of $MnO_2$ can be minimized by including a stabilization aid, such as sodium hexametaphosphate (SHMP), in the candle formulation, as depicted in FIG. 15.

Adding SHMP to the candle formulation can improve the total mass of permanganate released and the linearity of the release curves, which can prevent permanganate candles from scaling up and stopping the release of permanganate. Less oxide buildup was observed on candles with higher SHMP concentrations. At low TCE concentrations (<1 mg/L), it was found that including around 2% SHMP (w/w) in the candle composition was likely to improve the longevity of the fieldscale candles. One of the research question addressed related to whether the 2% SHMP-fortified permanganate candles could also perform under highly contaminated conditions with multiple contaminants, such as those encountered in source zones.

Release characteristics of SHMP-permanganate candles in water were compared with release characteristics of the SHMP-permanganate candles highly contaminated groundwater at field sties. Since persulfate candles do not form oxides that may otherwise slow release rates, they were also included in the treatment as a comparison. As part of the comparison, contaminated groundwater from the test site was collected and brought back to the laboratory for experimentation. Multiple organic contaminants were detected in varying concentrations, as depicted in Table 1 below.

TABLE 1

Contaminant concentration ranges of groundwater used in laboratory experiments.

| Contaminant | Concentration Range (μg/L) |
|---|---|
| Benzene | n.d-7.2 |
| 1,1,1-Trichloroethane | 2.2-26 |
| Trichloroethene | n.d-2.1 |
| 1,2,4-Trimethylbenzene | n.d-12 |
| 1,3,5-Trimethylvenzene | n,d-5.0 |
| Vinyl chloride | 1.8-22 |
| Total Xylenes | 320-4446 |

Figure 16:
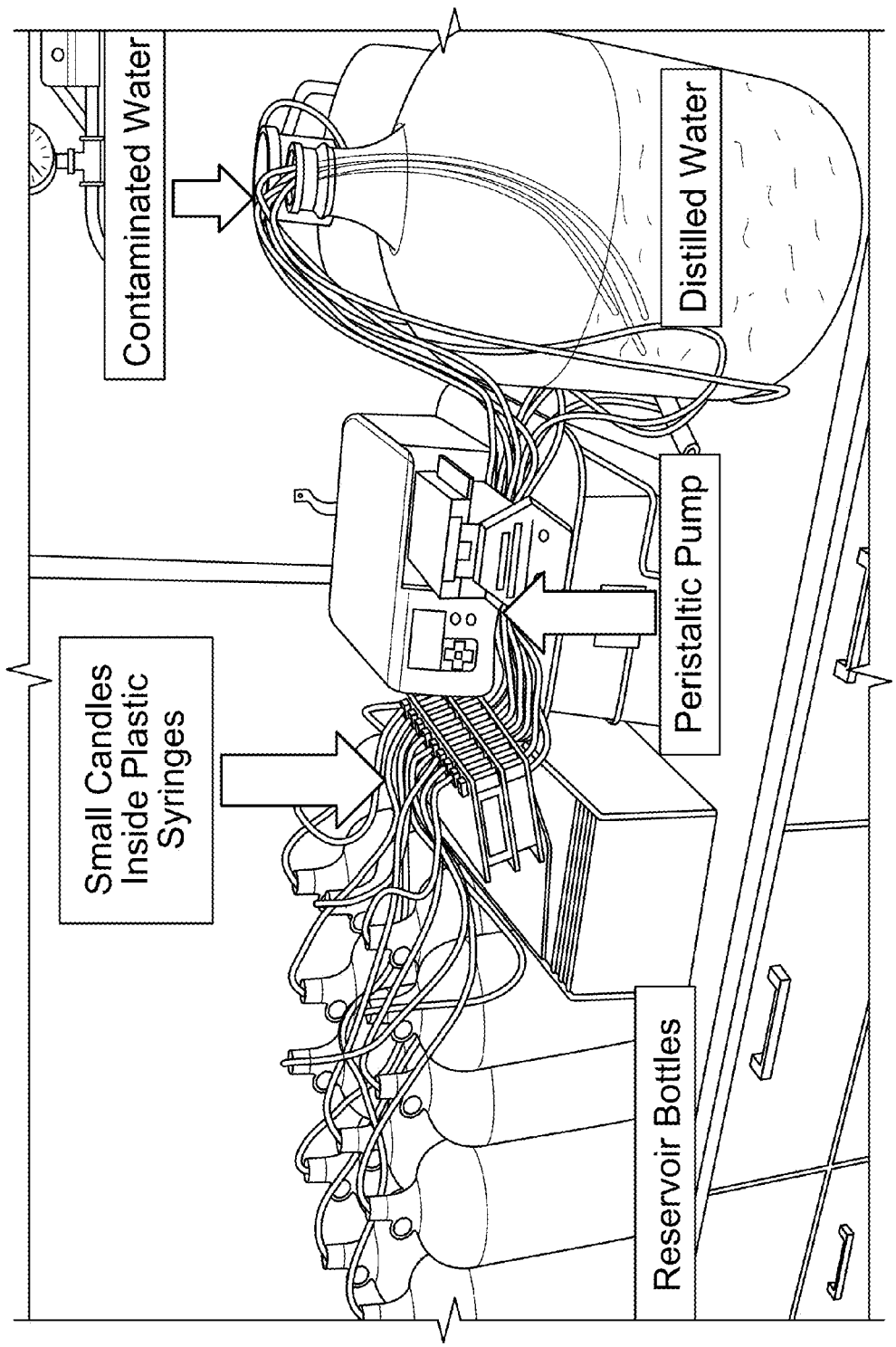
FIG. 16 is a photograph of an example flow-through system.

FIG. 16 is a photograph of an example flow-through system. Flow-through experiments were performed examining the oxidant released from the miniature oxidant candles as determined using the example flow-through system, as depicted in FIG. 16. This system consisted of a peristaltic pump that continuously pumped either distilled water or contaminated water from a field site (Table 1) into small syringes that contained miniature versions of our oxidant candles (permanganate candles contained 2% by weight SHMP and persulfate candles). Outflow from candle holders went into 2-L glass bottles where oxidant concentrations and volume of outflow was periodically measured and recorded (FIG. 16). Experimental treatments (permanganate vs persulfate candles and distilled water versus contaminated water) were replicated 3 times. Cumulative mass of oxidant recovered was recorded.

Results showed notable differences in the mass of oxidant recovered from the candles. When contaminated water was used, some of the oxidant released from the candle is consumed by reacting with the organic contaminants. When distilled water was used, most of the mass of oxidant recovered represents what was released from the candle.

FIGS. 17A-B depict results from tests performed using the flow-through system from FIG. 16. Referring to the graphs from FIG. 17A, a comparison of oxidant mass recovered from the candles showed that in distilled water, the mass of permanganate and persulfate were roughly the same (~650 mg). However, when contaminated water was used, less permanganate than persulfate was recovered (~400 mg vs. ~550 mg). Referring to FIG. 17B, photographs of the miniature candles at the end of the experiment showed that the permanganate candles had a much starker difference in appearance between those that were used to treat distilled water versus contaminated water. The permanganate candles that treated contaminated water were covered with an oxide coating, which would slow release rates. By comparison, the persulfate candles in contaminated water showed only a slight change in color from those that were in distilled water. These results indicate that in highly contaminated water, like that present at the test site, the persulfate candles could potentially perform better by providing a more consistent mass of oxidant released over time.

Figure 18A:
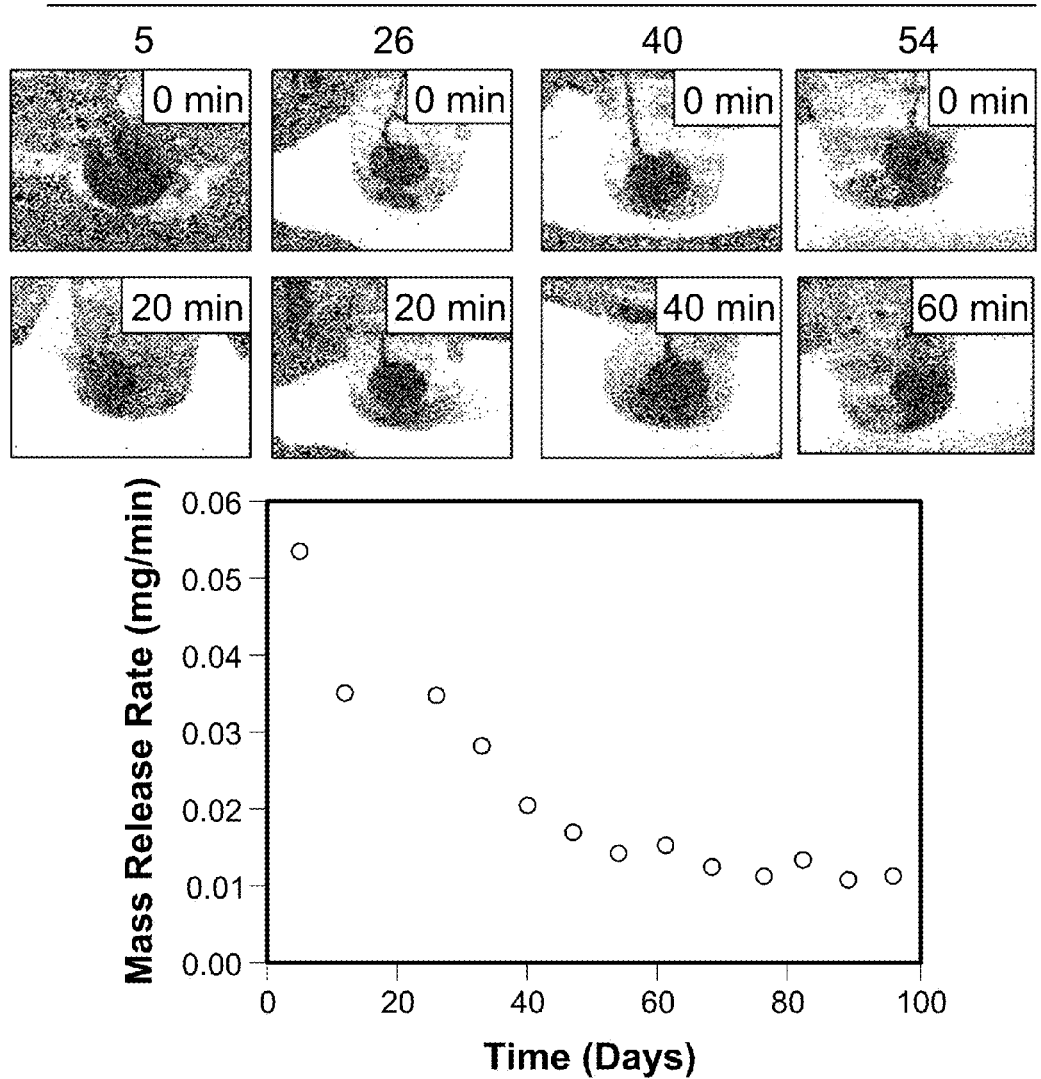
FIGS. 18A-B depicts the results from such a 2-phase test evaluating the oxidant release rate under various conditions.
Figure 18B:
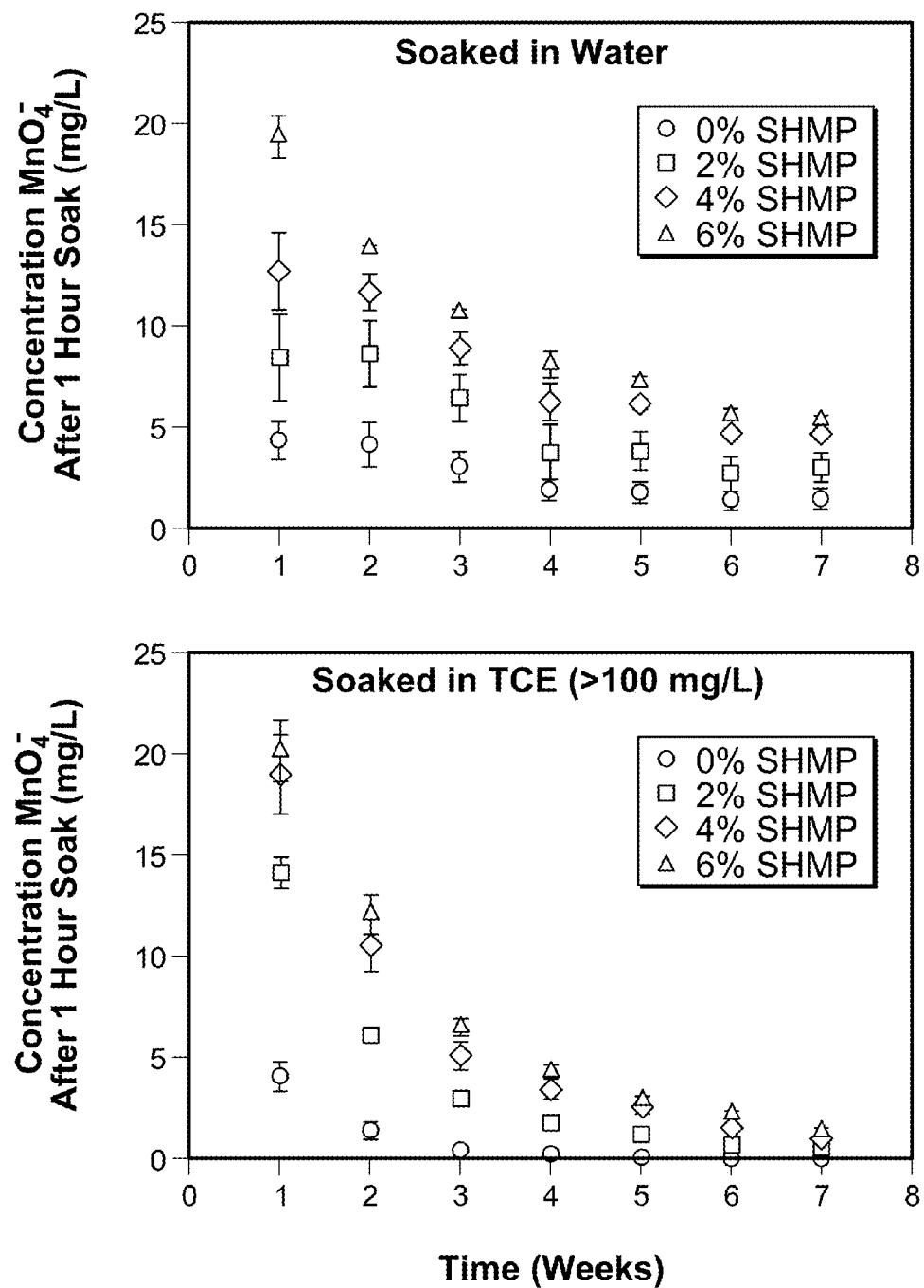

Given that results from flow-through tests using contaminated water were controlled by two processes, namely oxidant release and oxidant consumption, a different 2-phase test was designed to isolate these processes. FIGS. 18A-B depicts the results from such a 2-phase test evaluating the oxidant release rate under various conditions. In these tests, permanganate candles were allowed to soak in either contaminated or uncontaminated water, and then the release rates over a period of days/weeks were measured. In the test depicted in FIG. 18A, permanganate candles were first allowed to soak in contaminated water for various time frames (Phase 1, top row of photographs in FIG. 18A). Then, at selected times, the candles were removed from the contaminated water and placed in distilled water (Phase 2, second row of photographs in FIG. 18A). The mass of permanganate released into the distilled water was then recorded for 20 to 60 mins. By taking this approach, the temporal change in release rates could be recorded and the effect of contaminated water on the process determined.

In the test depicted in FIG. 18B, permanganate candles with varying percentages of SHMP incorporated therein (0% SHMP, 2% SHMP, 4% SHMP, 6% SHMP) were tested under two different conditions. In the first condition, results of which are depicted in the top graph in FIG. 18B, the candles were soaked in uncontaminated water. In the second test condition, results of which are depicted in the bottom graph in FIG. 18B, the candles were soaked in contaminated water. The difference in the release rates under these two conditions and with varying levels of SHMP incorporated into the candles are depicted in these graphs in FIG. 18B.

A potential concern during these tests was that the groundwater was too contaminated for the permanganate candles and that with time, the candles would become covered with oxides and stop releasing permanganate. Unlike installations at permanent wells where carriers are removed once per year to refurbish the candles by physically removing the oxide coatings, the direct-push candles designed for these tests are generally not designed to be physically refurbished once installed. However, refillable direct-push installations are possible, as depicted in and described with regard to FIG. 4D.

Figure 19:
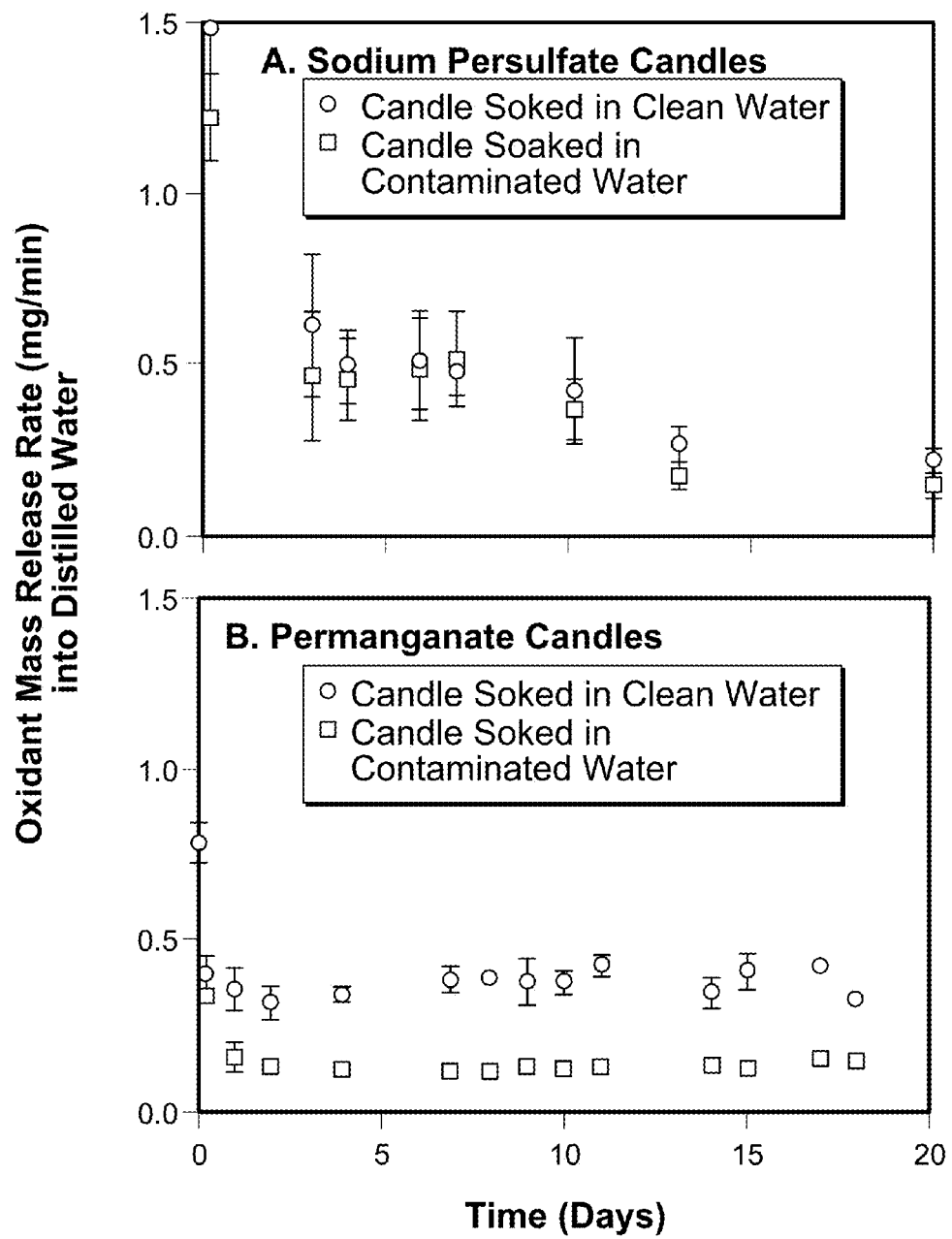
FIG. 19 depicts the release rates of oxidant candles into clean water when previously soaked in either clean or contaminated water.

Referring to the graph in FIG. 18, the results showed that, while the oxidant release rate did indeed decrease with time, the release rate did start to plateau after 40 d and was holding steady after 100 days of soaking in contaminated water. By comparison, when repeating the experiment with both permanganate and persulfate candles, little difference was observed in release rates when the persulfate candles were soaked in contaminated water versus clean water. The permanganate candles on the other hand, showed lower release rates when soaked in contaminated water versus clean water, as depicted in FIG. 19, which depicts the release rates of oxidant candles into clean water when previously soaked in either clean or contaminated water. These results confirm that the oxide buildup observed to occur on the permanganate candles (containing 2% SHMP) over time, as depicted in FIG. 18, can decrease release rates.

Figure 20:
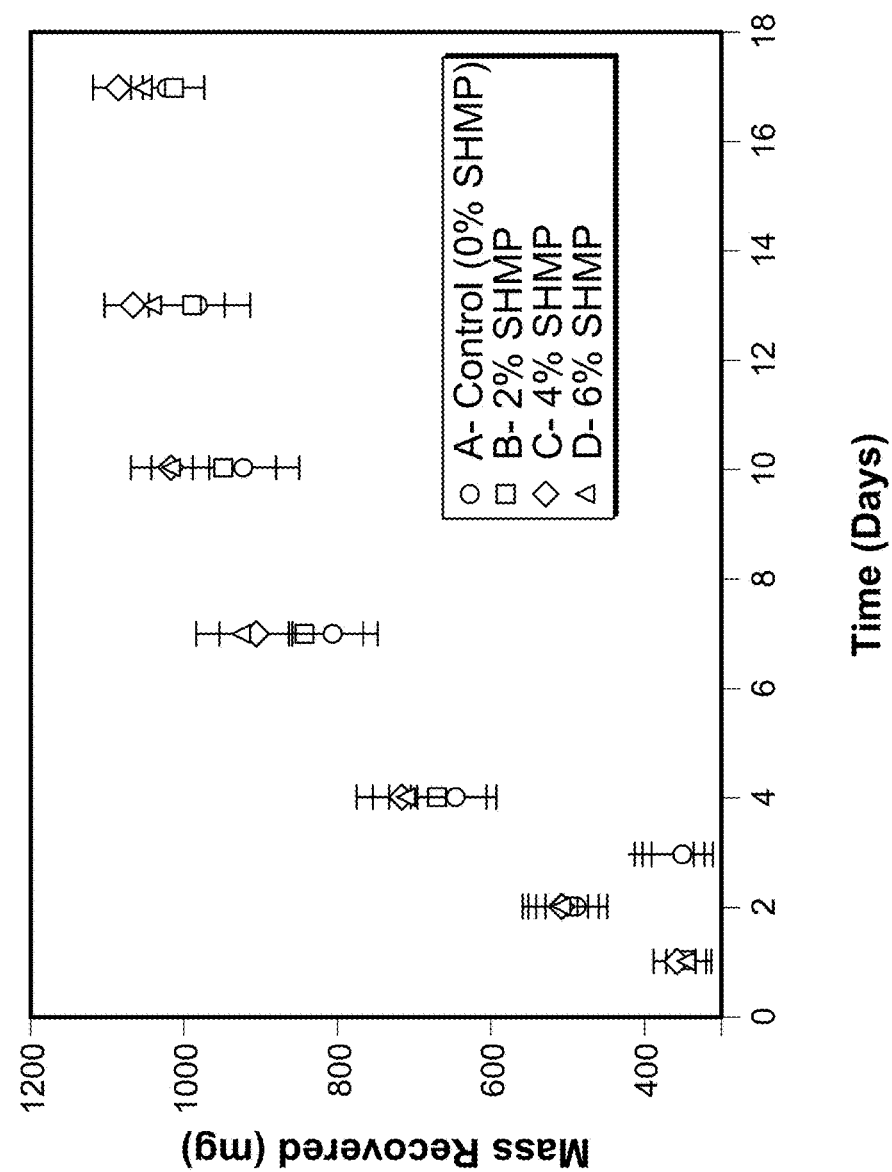
FIG. 20 is a graph depicting the results of mass recovered in response to increasing the percentage of SHMP incorporated into a permanganate candle.

FIG. 20 is a graph depicting the results of mass recovered in response to increasing the percentage of SHMP incorporated into a permanganate candle. While the effects of oxide buildup can be diminished with the incorporation of SHMP, the 2% by weight may not be sufficient. By increasing the percentage of SHMP incorporated into the permanganate candle to 4 or 6%, more permanganate was recovered from the candles in a flow through experiment where 1000 ug/L of TCE was continuously pumped over the candles, as depicted in FIG. 20. Thus when direct-push permanganate candles are going to be used to treat highly contaminated chlorinated ethenes, using 4 to 6% SHMP in the candle formulation may be preferable and recommended.

Example Field Installation and Test

To field test the direct-push oxidant candles, a test location that was the site of former solvent company was selected. The site had been leased to the solvent company from 1966 to 1988, during which the company operated a chemical storage and distribution facility. Improper disposal practices resulted in contamination of soil and groundwater at volatile organic compounds (VOCs) in concentrations exceeding Nebraska's Department of Environmental Quality voluntary cleanup goals (Table 2, below).

TABLE 2

Nebraska's Department of Environmental Quality Voluntary Cleanup Screening Levels for Groundwater.

| Constituent of Concern | Groundwater Voluntary Cleanup µg/L |
|---|---|
| 1,1,1-Trichloroethane (TCA) | 200 |
| 1,1-Dichloroethane (DCA) | 200 |
| 1,1-Dichloroethene (1.1-DCE) | 7.0 |
| 1,2,4-Trimethylbenzene (1,2,4-TMB) | 3.1 |
| 1,3,5-Trimethylbenzene (1,3,5-TMB) | 3.1 |
| Benzene | 5.0 |
| Chloroethane | 23 |
| Ethylbenzene | 700 |
| Tetrachlorethene (PCE) | 5.0 |
| Toluene | 1000 |
| Trichloroethene (TCE) | 5.0 |
| Vinyl Chloride (VC) | 2 |
| Xylene (Total) | 10000 |
| Cis-1,2-dichloroethene (cDCE) | 70 |
| Trans-1,2,-dichloroethene (tDCE) | 100 |

Figure 21A:
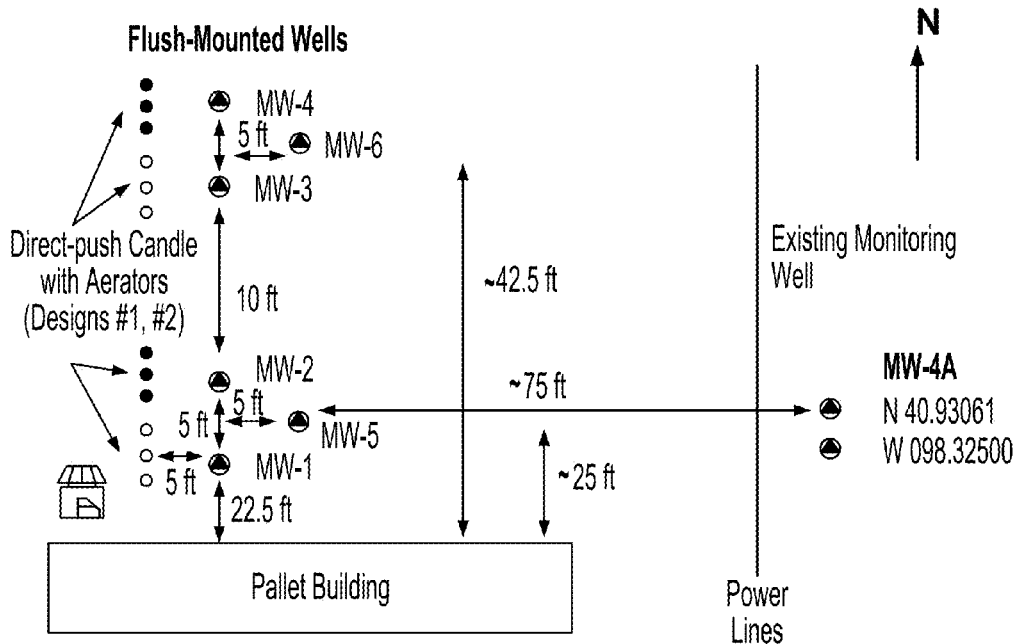
FIGS. 21A-B provide an overview of the example test site.
Figure 21B:
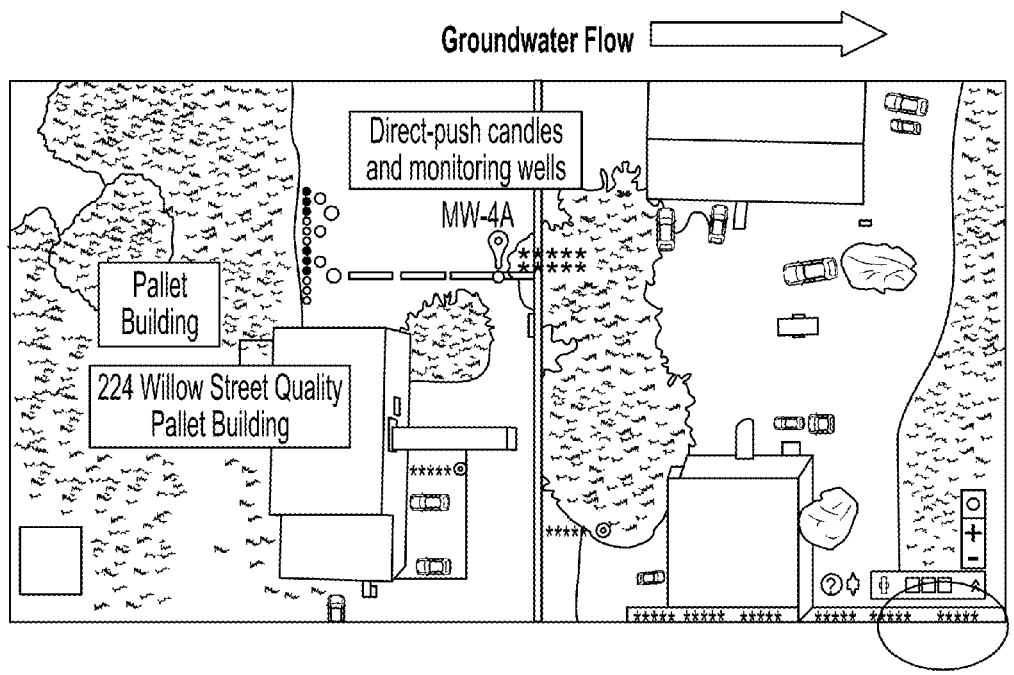

FIGS. 21A-B provide an overview of the example test site. FIG. 21A is a plot plan of locations of monitoring wells and direct-push oxidant candles. FIG. 21B is an aerial view of the treatment site. Both tethered and bundled candle apparatuses were used at the test site, with white dots indicating the locations of tethered candle apparatuses and black dots indicating the locations of bundled candle apparatuses. Six 2-inch monitoring wells were installed to a depth of 25 feet and screened between 10 and 25 feet. All wells were first sampled for background VOC concentrations. Two configurations of the direct-push candles were then installed 5 and 10 feet up gradient from the monitoring wells, as depicted in FIGS. 21A-B.

The initial plan was to test the effect of aeration on the distribution of permanganate and removal of VOCs. To accomplish this, two identical sets of oxidant candles were installed, one set was up gradient from MW-1 and MW-2 and the other was up gradient from MW-3 and MW-4, as depicted in FIGS. 21A-B. To test the effects of aeration, aerating the second set was delayed until 45 d after candle installation. The hypothesis was that the delay in aeration would cause a more stratified distribution of permanganate and VOC decreases would reflect this distribution. Baseline sampling taken before candle installation however, showed that VOC contamination was not uniform across the test area. This discrepancy in baseline values negated the ability adequately test aeration versus no aeration on VOC removal.

As presented in the Laboratory Tests section above, designs of direct-push candles included "tethered candles" and "bundled candles." As described above, tethered candles use an outside bracket that "pulls" the air supply line down the borehole outside of the GeoProbe rod. Bundled candles use the same drive tip (minus the bracket) with the air line being located in or around the middle of the oxidant candle, staying inside of the Geo Probe rod.

Figure 22A:
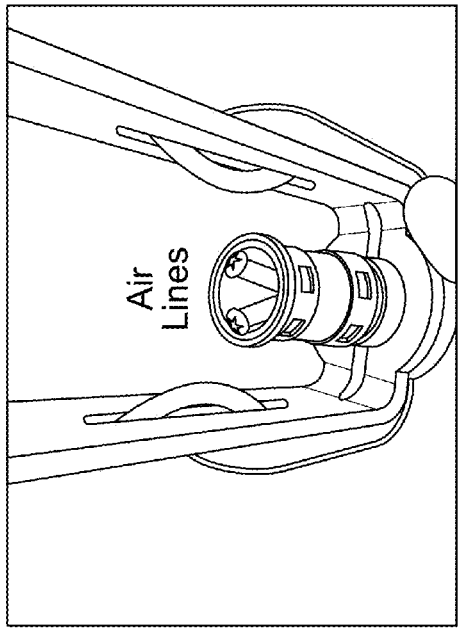
FIGS. 22A-D depict an example construction of a tethered direct-push candle apparatus for field installation.
Figure 22B:
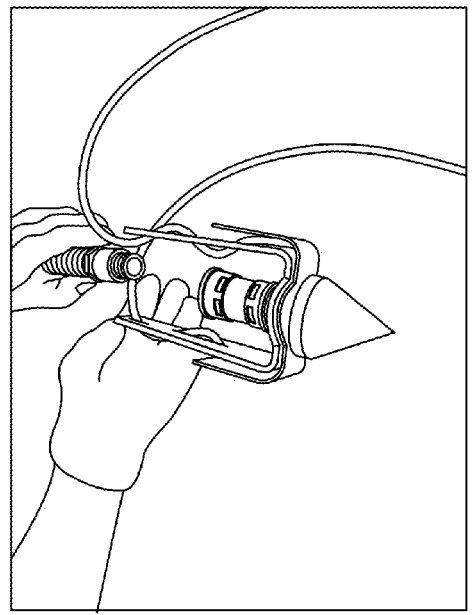
Figure 22C:
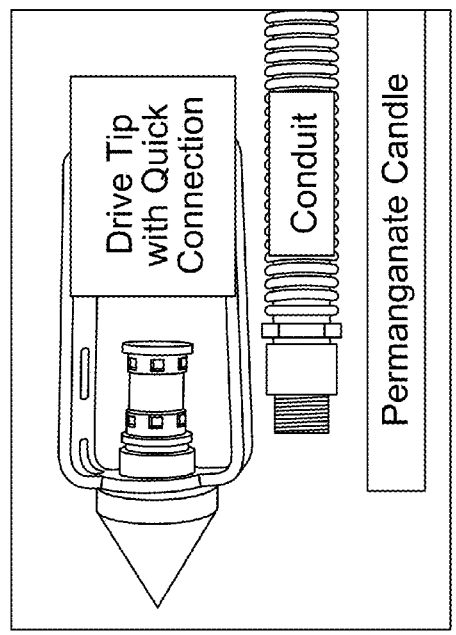
Figure 22D:
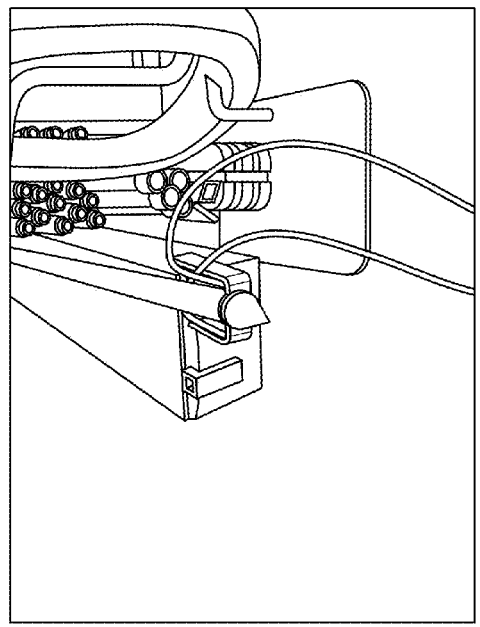

FIGS. 22A-D depict an example construction of a tethered direct-push candle apparatus for field installation. To create the example tethered candle that is depicted, approximately one hundred 1 inch diameter by 1 foot length permanganate candles were made in batches with the following composition: 45 g $KMnO_4$+10 g was+0.9 g sodium hexametaphosphate (SHMP). Once the composition was melted and thoroughly mixed, the molten mixture was poured into a 1-ft cardboard mold and allowed to cool. Once solidified, the oxidant candles were removed from the casing and placed inside the aluminum conduit depicted in FIG. 22A, which also depicts the drive tip with quick connection component. FIG. 22B depicts the air-lines, which travel down the outside of the GeoProbe rod and are threaded through the bracket, terminating within quick connection component. With the end of the air lines being located within the quick connection component, air will be released into and bubble up through the structural pathway (e.g., conduit, PVC screen, geotextile fabric) surrounding the oxidant candles. Also depicted in FIG. 22B, multiple (two) air lines are depicted as being used to supply aeration for the direct-push candle assembly—one being threaded through each side of the bracket. Other numbers of air supply lines can be used (e.g., 3 air supply lines, 4 air supply lines), other numbers of arms of the bracket can extend from the drive tip (e.g., 3 bracket arms, 4 bracket arms), and other ratios of air supply lines to bracket arms can be used (e.g., 2 air supply lines/bracket arm, 3 air supply lines/bracket arm). FIG. 22D depicts the direct-push drive tip connecting to the oxidant candle. FIG. 22C depicts the assembled oxidant candle inside the GeoProbe rod.

Figure 23:
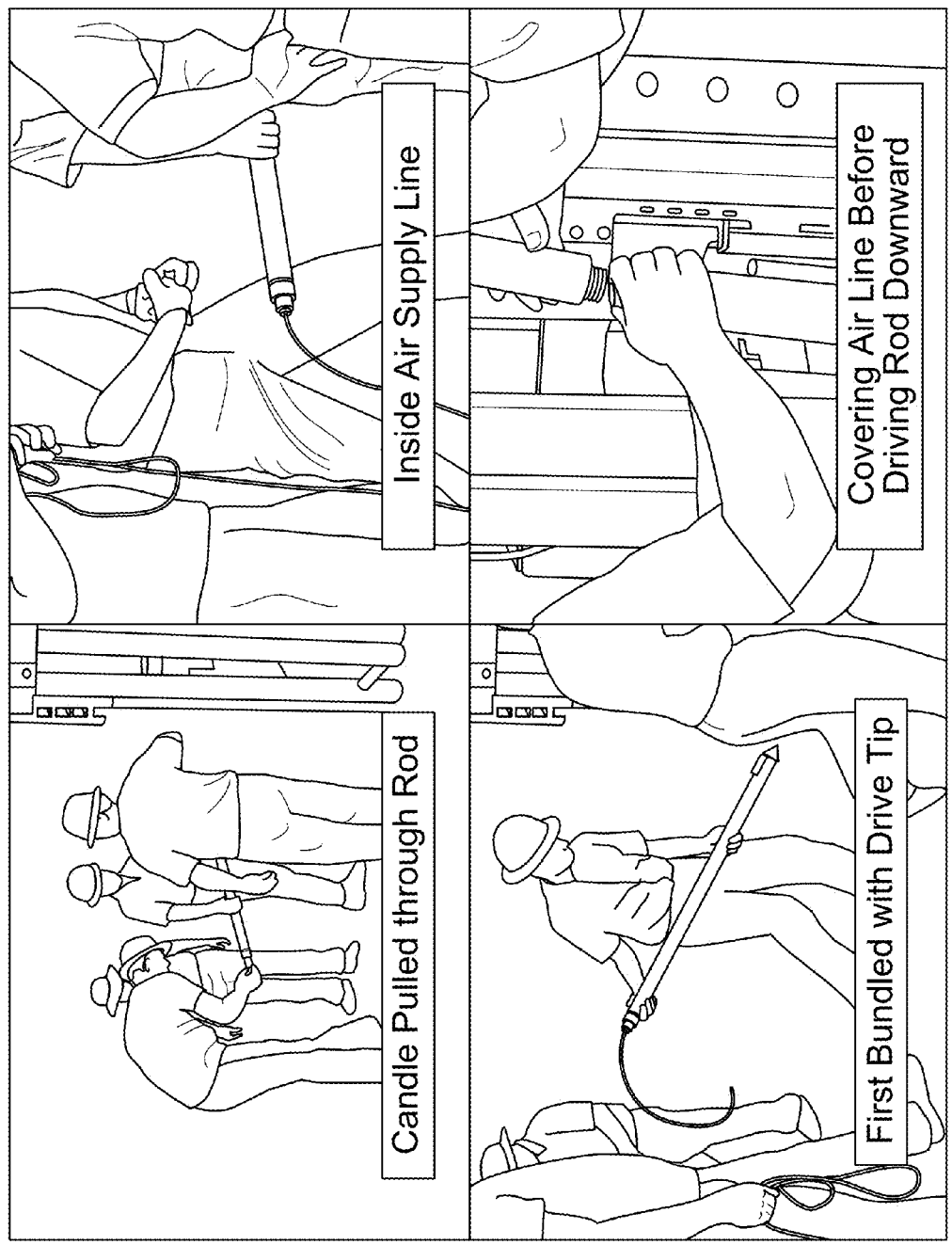
FIG. 23 depicts photographs of an example bundled candle apparatus being assembled for installation.

FIG. 23 depicts photographs of an example bundled candle apparatus being assembled for installation. For the bundled candles, several hundred individual circular candles were manufactured. These candles were manufactured by using the same composition as the permanganate cylinders. This mixture was heated and mixed and then cast into a plastic mold. Upon cooling, a hole was drilled into the center. These candles were than strung together with the central air line and covered with a braided sleeve and black geotextile fabric as described above with regard to FIGS. 12A-D. Installation of these candles included the bundled candle being pulled inside the rod with a string and then the central air line being covered with a short rod before driving the candle into the ground.

Figure 24:
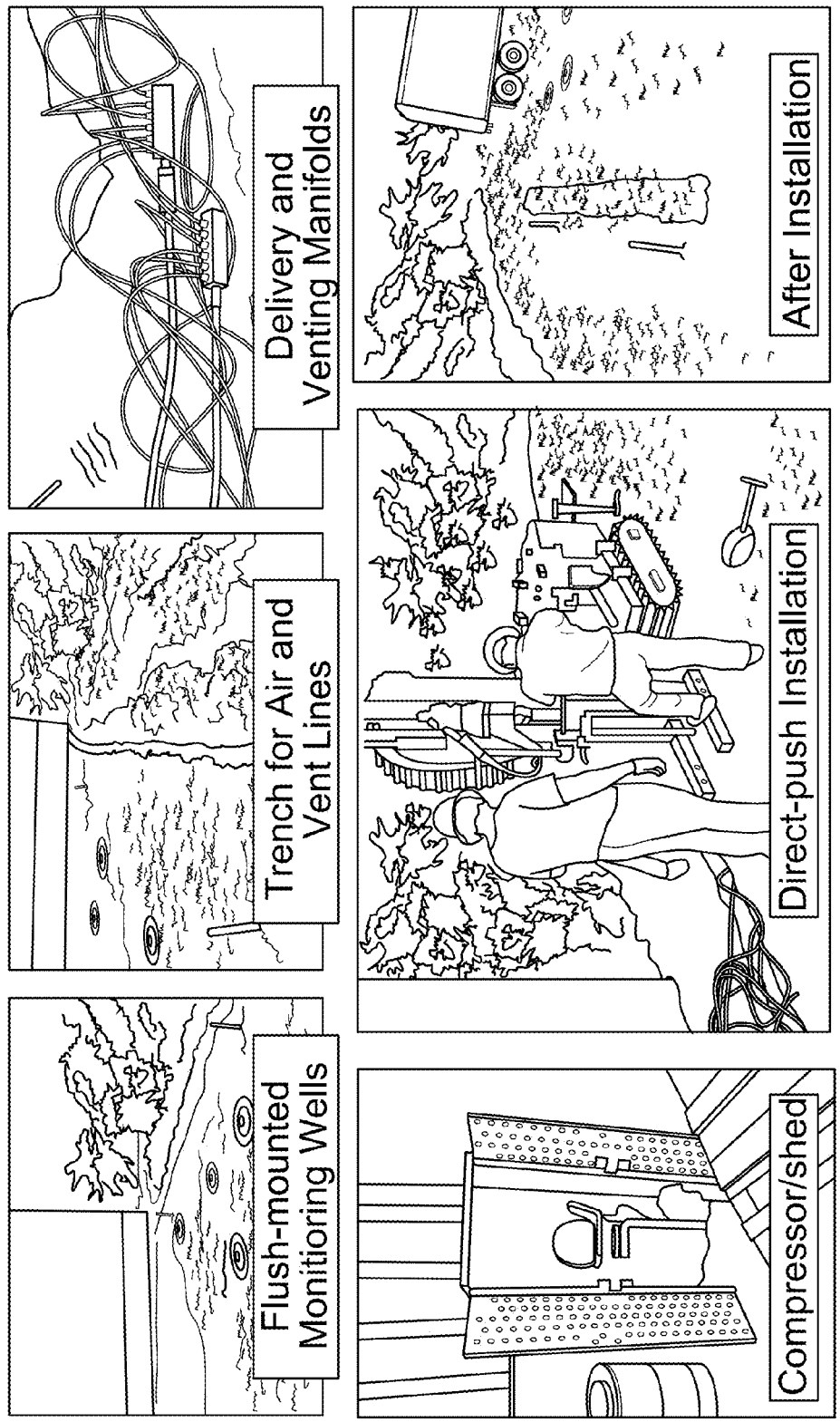
FIG. 24 depicts example installation of the direct-push candles at the test site depicted in FIG. 21.

FIG. 24 depicts example installation of the direct-push candles at the test site depicted in FIG. 21. Both the tethered and bundle candles were installed at the test site, with three sets of tethered candles being placed up gradient from MW-1 and MW-3. Likewise, three sets of bundle candles were placed up gradient from MW-2 and MW-4. Both sets of candles were installed with the GeoProbe to a depth of 25 feet and covered 14 feet of the aquifer (25-11 ft. bgs). GeoProbe installation of the candles using a three man crew took approximately 7 h. Given that these installations were as part of an initial testing phase, it is anticipated that installation times will be shorter with additional experience. Candles up gradient from MW-1 and MW-2 received air from the compressor on Day 1; Candles up gradient from MW-3 and MW-4 started receiving air on Day 45.

Field Test Results

Groundwater samples were taken before, and 65 days after, candle installation. In addition, one VOC sample was taken 72 d after candle installation from MW-1. Monitoring wells MW-1, MW-2 and MW-5 were down gradient from oxidant candles that received air on the day they were installed (Day=0). Consequently, data for these wells are grouped together, as described in Table 3 below. Monitoring wells MW-3, MW-4 and MW-6 were down gradient from oxidant candles that did not start to regularly receive air until 45 d after candle installation, as described in Table 4 below. Baseline values showed that well MW-5 had the highest VOC concentrations and the most number of contaminants (Table 3). By contrast, MW-4 was the monitoring well furthest north of the pallet building and had no detectable VOC concentrations (Table 4). As indicated by the measurement, contaminant concentrations were much higher near the pallet building (e.g., MW-1, MW-2, and MW-5) than the monitoring wells further north of the pallet building (MW-3, MW-4, MW-6).

Results from the VOC sampling after candle installation showed a significant reduction in VOC concentrations for first group of monitoring wells. Monitoring wells MW-1, MW-2 and MW-5 all had numerous non-detect values at Day 65 (Table 3). The only notable increase was for total xylenes in MW-5, where values more than doubled (Table 3). While the engineering firm managing this site similarly observed an increase in some VOCs after using the Fenton's reagent to treat another part of this site and attributed this to the dislodging of VOCs from the soil matrix, additional laboratory work conducted in preparation for treating another site also observed some increases in VOCs when just treating the ground water (no soil present). Thus, it appears that transformation of trimethylbenzenes to dimethylbenzenes (i.e., xylenes) and methylbenzene (toluene) could occur from the chemical treatment. Chemical transformation of xylene to ethylbenzene is also a possibility through a free radical reaction.

Results from the second set of monitoring wells (MW-3, MW-4, MW-6) showed mainly decreases in xylene but increases in toluene, ethylbenzene and 1, 1-DCA (Table 4). While increases in 1, 1-DCA cannot be easily explained from a chemical reaction, increases in toluene and ethylbenzene concurrent with decreases in xylene have been observed in laboratory experiments. Nonetheless, despite the increases observed, all VOC values with the exception of toluene and 1, 1-DCA in MW-6, were below Nebraska DEQ voluntary cleanup values at Day 65 (Table 2).

TABLE 3

VOC concentrations in monitoring wells located down gradient from tethered candles (MW-1) and bundled candles (MW-2). Both sets of candles started receiving aeration on day of candle installation (T = 0).

| Well | Sampling Date | Days After Candle Installation | Toluene | 1,1,1-TCA | Vinyl Chloride | Total Xylene | 1,1-DCA | Cis-1,2-DCE | Ethyl benzene |
|------|---------------|-------------------------------|---------|-----------|----------------|--------------|---------|-------------|---------------|
|      |               |                               |         |           |                | µg/L         |         |             |               |
| MW-1 | May 16, 2014  | 0                             | 307     | 2.2       | 1.8            | 320          | 4.5     | 1.2         | 33            |
|      | Jul. 31, 2014 | 85                            | n.d.    | n.d.      | n.d.           | 4.9          | n.d.    | n.d.        | n.d.          |
|      | Aug. 1, 2014  | 72                            | n.d.    | n.d.      | n.d.           | n.d.         | n.d.    | n.d.        | n.d.          |
| MW-2 | May 15, 2014  | 0                             | 100     | n.d.      | 1.8            | 317          | 4.4     | n.d.        | 35            |
|      | Jul. 31, 2014 | 65                            | n.d.    | n.d.      | n.d.           | n.d.         | 2.1     | n.d.        | n.d.          |

| Well | Sampling Date | Days After Candle Installation | Benzene | Isopropyl benzene | Napthalene | n-Propylbenzene | PCE | Toluene | 1,1,1-TCA |
|------|---------------|-------------------------------|---------|-------------------|------------|-----------------|-----|---------|-----------|
|      |               |                               |         |                   | µg/L       |                 |     |         |           |
| MW-3 | May 27, 2014  | 0                             | 7.2     | 2.5               | 1.7        | 2.7             | 2.5 | 3,682   | 26        |
|      | Jul. 31, 2014 | 65                            | n.d.    | n.d.              | n.d.       | n.d.            | n.d.| 4,424   | n.d.      |
|      | Jul. 31, 2014 Duplicate | 65                  | n.d.    | n.d.              | n.d.       | n.d.            | n.d.| 3,892   | n.d.      |

| Well | Sampling Date | 1,2,4-Trimethylbenzene | 1,3,5-Trimethylbenzene | Vinyl Chloride | Total Xylene | 1,1-DCA | Cis-1,2-DCE | Ethylbenzene |
|------|---------------|------------------------|------------------------|----------------|--------------|---------|-------------|--------------|
|      |               |                        |                        |                | µg/L         |         |             |              |
| MW-3 | May 27, 2014  | 12                     | 5.0                    | 22             | 4,448        | n.d.    | 5.6         | 546          |
|      | Jul. 31, 2014 | n.d.                   | n.d.                   | n.d.           | 10,880       | n.d.    | n.d.        | n.d.         |
|      | Jul. 31, 2014 Duplicate | n.d.         | n.d.                   | n.d.           | 9,769        | 143     | n.d.        | n.d.         |

TABLE 4

VOC concentrations in monitoring wells located down gradient from tethered candles (MW-3) and bundled candles (MW-4). Both sets of candles started receiving continuous aeration 45 days after candle installation (T = 45).

| Well | Sampling Date | Days After Candle Installation | Toluene | Vinyl Chloride | Total Xylene | 1,1-DCA | Ethyl Benzene |
|------|---------------|-------------------------------|---------|----------------|--------------|---------|---------------|
|      |               |                               |         |                | µg/L         |         |               |
| MW-3 | May 27, 2014  | 0                             | 5.5     | n.d.           | 150          | n.d.    | 10            |
|      | Jul. 31, 2014 | 65                            | 7.5     | n.d.           | 94           | 6.1     | 33            |
| MW-4 | May 27, 2014  | 0                             | n.d.    | n.d.           | n.d.         | n.d.    | n.d.          |
|      | Jul. 31, 2014 | 65                            | n.d.    | n.d.           | n.d.         | n.d.    | n.d.          |
| MW-6 | May 27, 2014  | 0                             | 353     | 3.7            | 2,150        | 12      | 188           |
|      | Jul. 31, 2014 | 65                            | 1,345   | n.d.           | 1,482        | 264     | 264           |

Permanganate concentrations were monitored 6 times following candle installation at multiple depths (12, 18 and 24 ft bgs). Concentrations recorded for each sampling and well are listed in the Appendix (Tables A1, A2). Given that the permanganate concentrations were not stable but fleeting due to the oxidation of organic contaminants by the permanganate, the recorded values (Tables A1, A2) likely underestimated the actual permanganate concentrations because samples were transported back to the laboratory before permanganate concentrations were measured. Future sites where permanganate candles are used will likely quantify the permanganate concentrations in the field.

Figure 25:
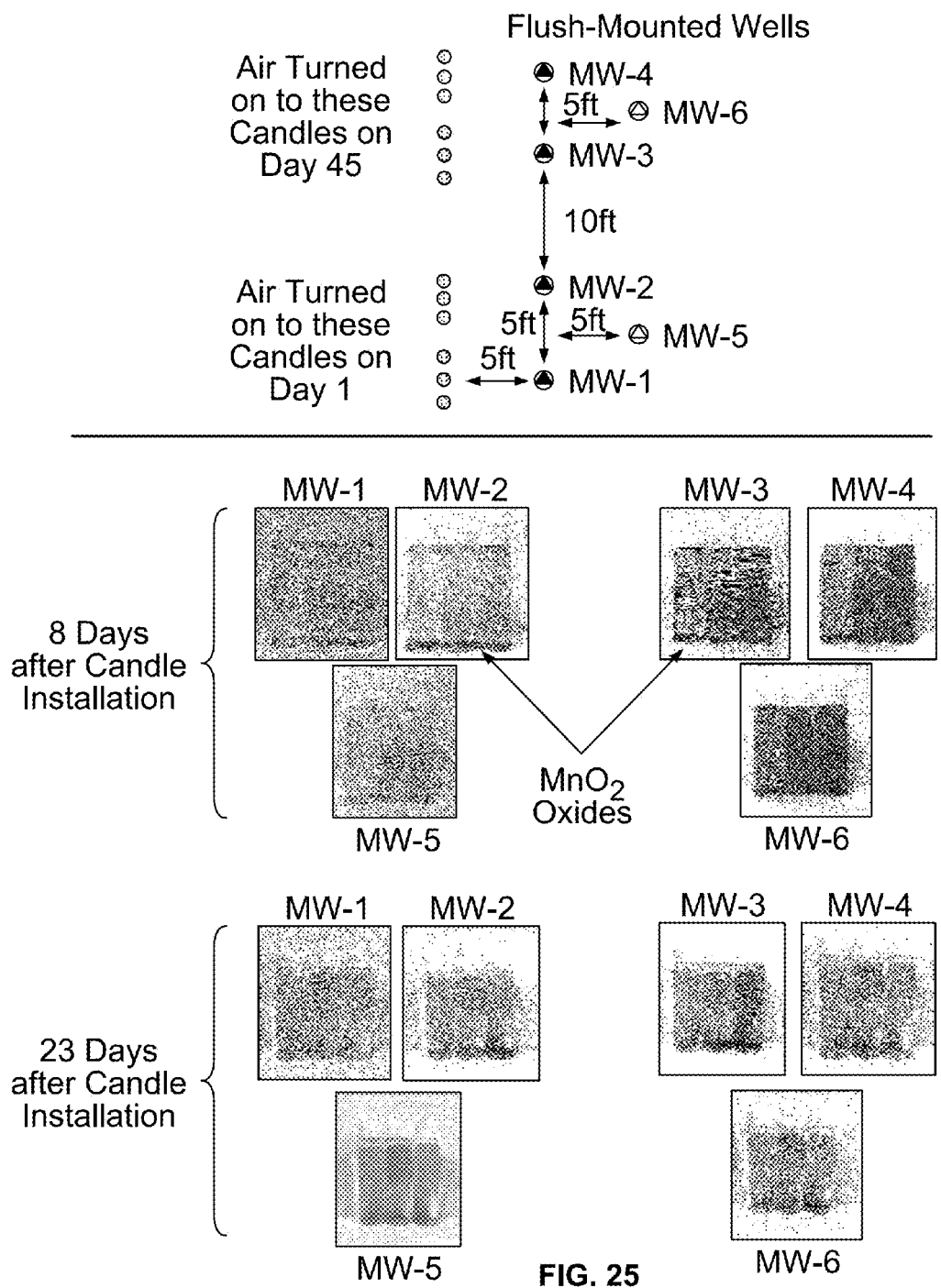
FIG. 25 depicts, at the top, a plot plan of monitoring well locations and, at the bottom, photographs of groundwater samples taken at the monitoring well locations for permanganate measurements.

FIG. 25 depicts, at the top, a plot plan of monitoring well locations and, at the bottom, photographs of groundwater samples taken at the monitoring well locations for permanganate measurements. Eight days after candle installation, all monitoring wells were sampled at three depths and permanganate was present in 4 of the 6 wells, as depicted in FIG. 25. The differences in permanganate concentrations observed between the two sets of wells can be explained by the spatial differences in VOC concentrations across the field site. Monitoring well MW-5, which had the highest concentrations and most number of detectable VOCs (Table 3) had no visible signs of permanganate (Day 8, FIG. 25). By contrast, MW-4 had no detectable VOCs and permanganate was present at all depths (FIG. 25). Many samples were also observed to contain precipitated $MnO_2$, indicating a consumption of permanganate occurred from the oxidation of organic contaminants (FIG. 25).

It is also noteworthy that even though the candles up gradient of MW-3, MW-4 and MW-6 did not initially received aeration, permanganate was present at all three depths in these wells at the Day 8 sampling. Although permanganate concentrations increased with depth, the fact that permanganate was present throughout the screen indicates that density driven flow was not as dominant as we had observed in some of our laboratory transport experiments described above (e.g., FIG. 7). As illustrated in one of our transport experiments, if the advection rate is high enough, density driven flow may not occur (see FIG. 11). Hydrological characteristics of the test site, which were measured previously by an outside engineering firm, indicate a linear groundwater velocity of 302 ft/yr, as described in Table 5 below. Thus, groundwater advection at the test site appears to be sufficient in preventing density driven flow.

TABLE 5

Hydraulic parameters of test site based on Slug Testing.

| Parameter | Value |
| --- | --- |
| Hydraulic Gradient | 0.0016 ft/yr |
| Linear Groundwater Velocity | 302 ft/yr |
| Hydraulic Conductivity | 160 ft/day |
| Porosity | 0.30 (30%) |

There is some evidence that aeration of the oxidant candles influenced permanganate distribution. In MW-3, MW-4, and MW-6, permanganate concentrations were highest at the lowest depth (24 ft, Table A2) for the first three sampling. After aeration began on Day 45, permanganate concentrations were low but some of the wells had the highest recorded concentrations at the 12 ft depth (Table A2) for the last three sampling.

Later samplings of the monitoring wells showed only minor traces of permanganate. For instance, at 23 d after candle installation, permanganate was only visible in MW-3 at the lowest depth (24 ft, FIG. 25). As observed in previous studies and demonstrated in our laboratory testing (FIG. 18), oxidant candles initially release a flush of permanganate. This occurs from the initial dissolution of the permanganate crystals at the outer surface of the candle. With time, the dissolution front moves into the interior of the candle. This increases the diffusion pathway and decreases the rate of permanganate release. The highly visible permanganate concentrations observed at 8 days is likely a consequence of the initial flush of permanganate from the candles. As the mass of permanganate released from the candles decreased, these lower concentrations were likely consumed before migrating to the monitoring wells.

Even though permanganate was not visible in the groundwater samples taken on the day VOCs were sampled (Day 65), chemical analysis indicated a decrease in VOC concentrations (Tables 3 and 4). These data support that the oxidant candles were effective.

Additional evidence that the candles continued to release permanganate even when later samplings did not verify the presence of permanganate in the monitoring wells was gleaned from two other observations. On Day 72, additional groundwater was pumped from MW-1 to obtain water for some additional laboratory experiments. During the pumping of this well, approximately 10 gallons of water was removed and permanganate was clearly visible in the groundwater. VOC analysis of this 72d water sample showed no detectable VOCs were present (Table 3, Day 72). Within a few hours however, the pink color observed in the water brought back to the laboratory disappeared indicating that permanganate was reacting with the organic contaminants in the groundwater. The second piece of evidence that permanganate was still being released from the candles occurred on Day 58, when we momentarily disconnected the air lines to the bottom of the candles and used those lines to sample the pore water at the base of a few candles. Results from this sampling showed permanganate was present in the pore water (16.6-26.4 mg/L). Thus, despite some oxide buildup on the candles that had undoubtedly occurred, evidence from our laboratory tests (FIGS. 18, 19) and field sampling indicate that the oxidant candles are still releasing permanganate into the aquifer.

During groundwater sampling for permanganate, a multi-meter water quality probe was used to record groundwater characteristics of conductivity, dissolved oxygen, ORP, and pH. Results from these measurements are presented in the Appendices (see Tables A3-A8). Some observations from these measurements include the information detailed in the following paragraphs regarding ORP values, dissolved oxygen (DO), and conductivity and pH.

Regarding OPR values, MW-1 and MW-2 were the monitoring wells closest to the oxidant candles that received aeration on Day 1. Background ORP values (i.e., before candle installation) for these wells were 1.5 and 13.4 mV (Table A3). At the last sampling (Day 99), ORP values ranged from 76.1 to 529.7 mV, indicating a significant increase. MW-5 was located down gradient of MW-1 and MW-2. ORP values in MW-5 went from a baseline value of 17.9 mV to a high of 105 mV (Day 51, 12 ft depth, Table A3) then decreased to −222 to −195 mV at Day 99 (Tables A3). So why did ORP values increase in MW-1 and MW-2 but eventually decrease in MW-5? VOC analysis of MW-1 and MW-2 showed practically all the VOCs initially present were not detectable at day 65 (Table 3), while VOC analysis of MW-5 showed significant concentrations of toluene and xylenes (Table 4). These contaminants are readily degradable organics and likely caused the system to become anaerobic.

MW-3 and MW-4 were down gradient of candles that began receiving air on Day 45. ORP values for these wells were between −59.2 to 50.2 mV before candle installation. At Day 99, the ORP values ranged from −37.5 to 568.3 mV (Table A4), with most depths having highly positive ORP values. MW-6 was down gradient of MW-3 and MW-4 and like MW-5, showed an increase than decrease in ORP with time (Table A4). MW-6 also had high concentrations of VOCs on Day 65 and likely had significant microbial activity.

Regarding DO, temporal changes in dissolved oxygen values resembled changes in ORP values with one exception. Significant temporal increases were noted in the wells located closest to the oxidant candles (MW-1, MW-2, and MW-4) while only slight increases were observed in MW-3 (Table A6). As observed with ORP values, the DO values of MW-5 increased and then decreased (Table A5). MW-6 values continued to stay low (<1.00 mg/L) during the sampling period (Table A6).

Regarding conductivity and pH, conductivity values on average increased in the monitoring wells through the first 50 d after candle installation. Following that, the conductivity values declined and became lower than the baseline values (Table A7). This increase then decrease in conductivity values could reflect the initial advection of permanganate released by the candles and the associated products that may have formed. Temporal pH monitoring showed that the pH of all monitoring wells increased approximately by 0.4 pH units between Day 0 and Day 99 (Table A8).

Additional Direct-Push Candle Designs

Figure 26A:
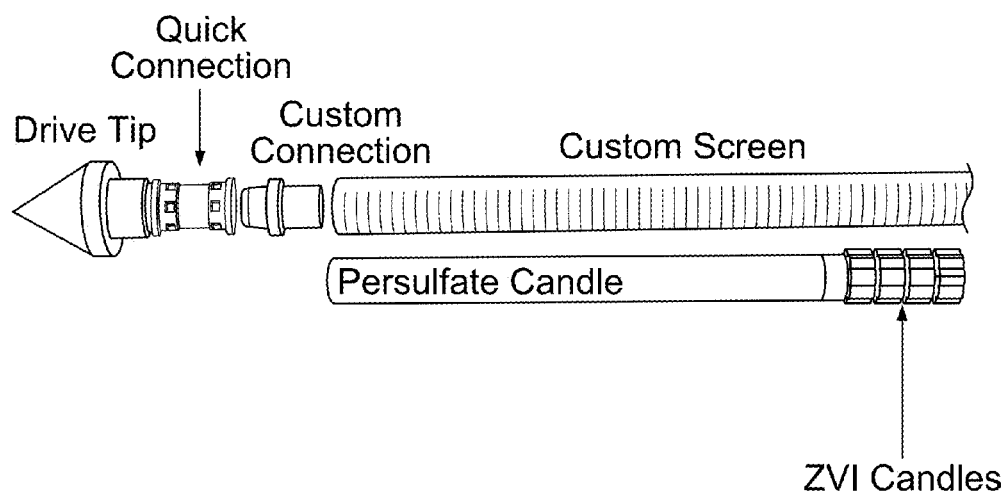
FIGS. 26A-B depict an example direct-push candle assembly.
Figure 26B:
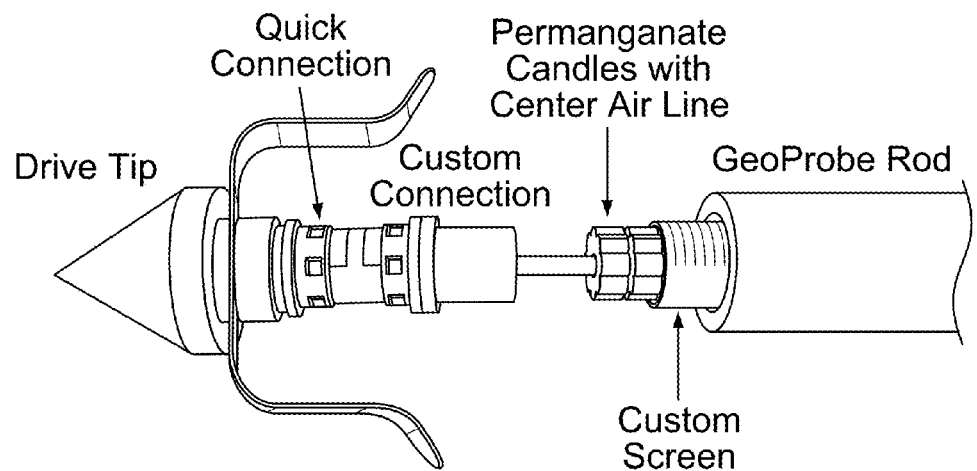
Figure 28:
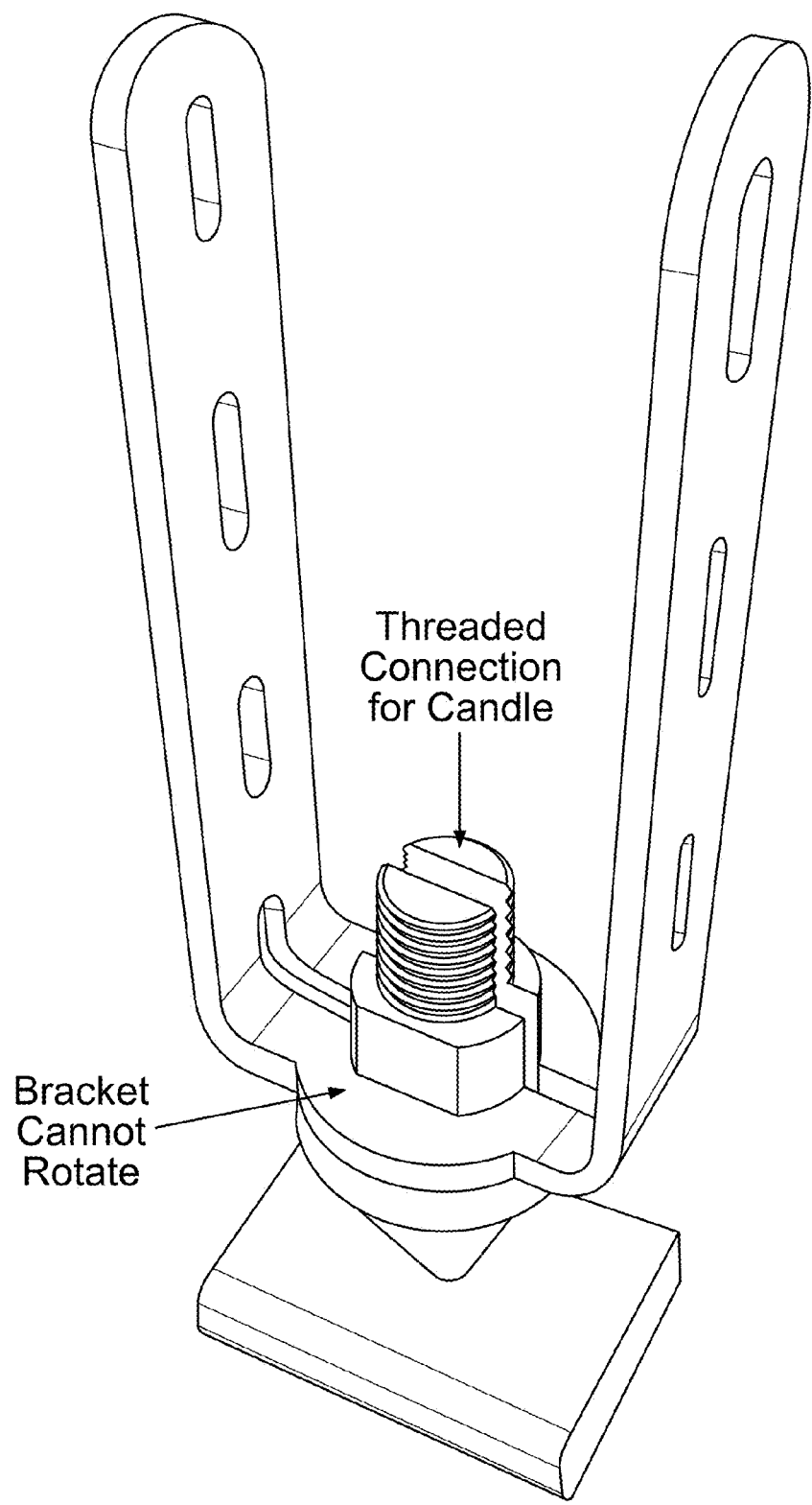
FIG. 28 depicts an example drive tip and bracket that can be used with a direct-push candle apparatus.

Additional direct-push candle apparatuses and assemblies are also possible, as depicted in FIGS. 26-28. FIGS. 26A-B depict an example direct-push candle assembly. FIG. 26A depicts components for a direct-push candle apparatus using persulfate and zerovalent iron candles, and a PVC screen (custom screen) for the structural pathway surrounding the candle. FIG. 26B depicts the assembly of the candle apparatus within an example drive rod (GeoProbe rod). For instance, as depicted in the examples in FIGS. 26A-B, the aluminum conduit described in the configurations above has been replaced with a custom constructed thin PVC screen. This screen can be dimensioned and shaped so that it has wide enough inside diameter to allow for 1 inch persulfate or permanganate candles to fit inside and an outside diameter that is small enough to fit inside a standard 2.25 in GeoProbe rod. To incorporate such a PVC screen, a custom adapter may be constructed. In practice, PVC glue can be used secure the adaptor to both ends of the custom screen. Once in place, the custom connection can have a ¾ inch male pipe taper thread (i.e. MPT) that clicks into a quick connection. Such quick connections allow the custom screen to be connected to the drive tip and additional screens.

FIG. 27 depicts the example direct-push candle assembly from FIG. 26 being used with both a tethered and bundled air line configuration. For example, the direct-push candle design described with regard to FIGS. 26A-B with the custom screen and adaptor can be installed and used with both the tethered air line design (top pictures) or bundled air line design (bottom pictures). Smaller permanganate candles can be placed inside the custom screen without the center air line and air could be supplied with the tethered bracket. Permanganate and/or persulfate candles, separately or together, could be used with either the tethered and/or bundled design.

FIG. 28 depicts an example drive tip and bracket that can be used with a direct-push candle apparatus. In this example, the drive tip and bracket are separate physical structures that lock into place, which prevents the bracket from rotating during installation. In the depicted example, the drive tip and bracket are keyed together through the use of one or more flattened sides. Other mechanisms to lock-in the orientation of the drive tip relative to the bracket can also be used.

Figure 29:
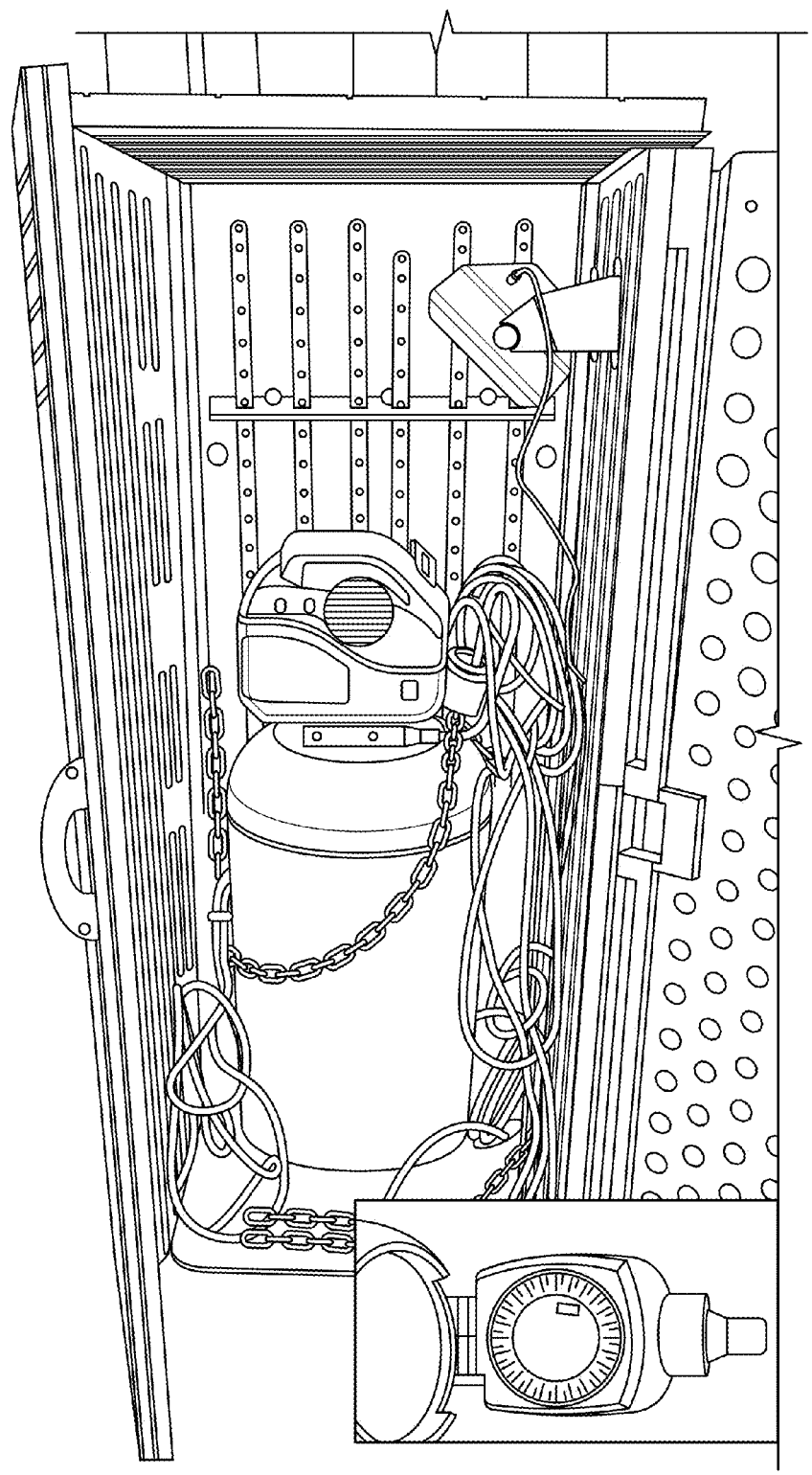
FIG. 29 depicts an example configuration of a compressor, a fan, and a timer that is used to supply air used with field installed direct-push candle apparatuses.

FIG. 29 depicts an example configuration of a compressor, a fan, and a timer that is used to supply air used with field installed direct-push candle apparatuses. For example, air compressors can become overheated, which can cause them to shut down. To prevent this, a small fan can be used to continuously cool the compressor and an electrical timer that automatically cuts the power to the compressor can be used. This allows the compressor to reset in the event that it overheats and restart itself when the power comes back on.

Additional Test Sites

An additional test site for direct-push candles described in this document was identified as a former petroleum service station that had a leaking underground storage tank, which contaminated the groundwater. It was discovered that vapor intrusion of petroleum hydrocarbons had moved into the basement of the nearby resident, which was just 70 ft. east of the site. Site assessments have delineated the extent of the contaminated plume and two ISCO treatments have been performed. To date, the petroleum odors have not been fully eliminated from the residence basement and this site is still under active investigation.

In preparation for treating the test site, batch experiments were ran with contaminated ground water collected from the site. The results of these tests are depicted below in Table 6.

TABLE 6

Chemical analysis of groundwater sampled from Freeman site.

| Compound | Control µg/L |
| --- | --- |
| Naphthalene | 478 |
| Toluene | 1,184 |
| 1,2,4-Trimethylbenzene | 1,036 |
| 1,3,5 Trimethylbenzene | 232 |
| Total Xylenes | 5,886 |
| Ethylbenzene | 1,518 |
| Vinyl Acetate | 4,136 |

Using this same groundwater we set up a lab test where 40-mL of this groundwater was treated with miniature oxidant candles. Treatments included:
1. Control (no candle)
2. Wax candle (no oxidant)
3. Persulfate candle
4. Permanganate candle
5. Persulfate+zerovalent iron candle
6. Zerovalent iron candle Treatments were run in triplicate for two weeks at 16° C. (groundwater temperature).

Solutions were combined from three reps into two reps (for each treatment) and submitted for analysis.

Table 7 details the results of this treatments from the additional test site. The 14 d control treatment confirms that the 14 d holding time did not result in loss of all the contaminants under the conditions they were stored (Table 7). Thus, treatments showing lower concentrations than those of the 14 d Control are valid results. Many of the contaminants are hydrophobic so it is not surprising that the wax candle (used as one of the controls) would adsorb many of the contaminants. Such treatment in the field may not be viable. While oxidant candles adsorb and degrade, wax would only adsorb. Based on the oxidant candle results, the persulfate+zerovalent iron (ZVI) candles performed the best (Table 7), which informed the candle selection for the additional test site. These results indicate that installation of these candles in the contaminated zones (via ERi, electrical resistivity imaging) at the additional test site can provide a reasonable chance that the contaminants will be degraded.

Figure 30:
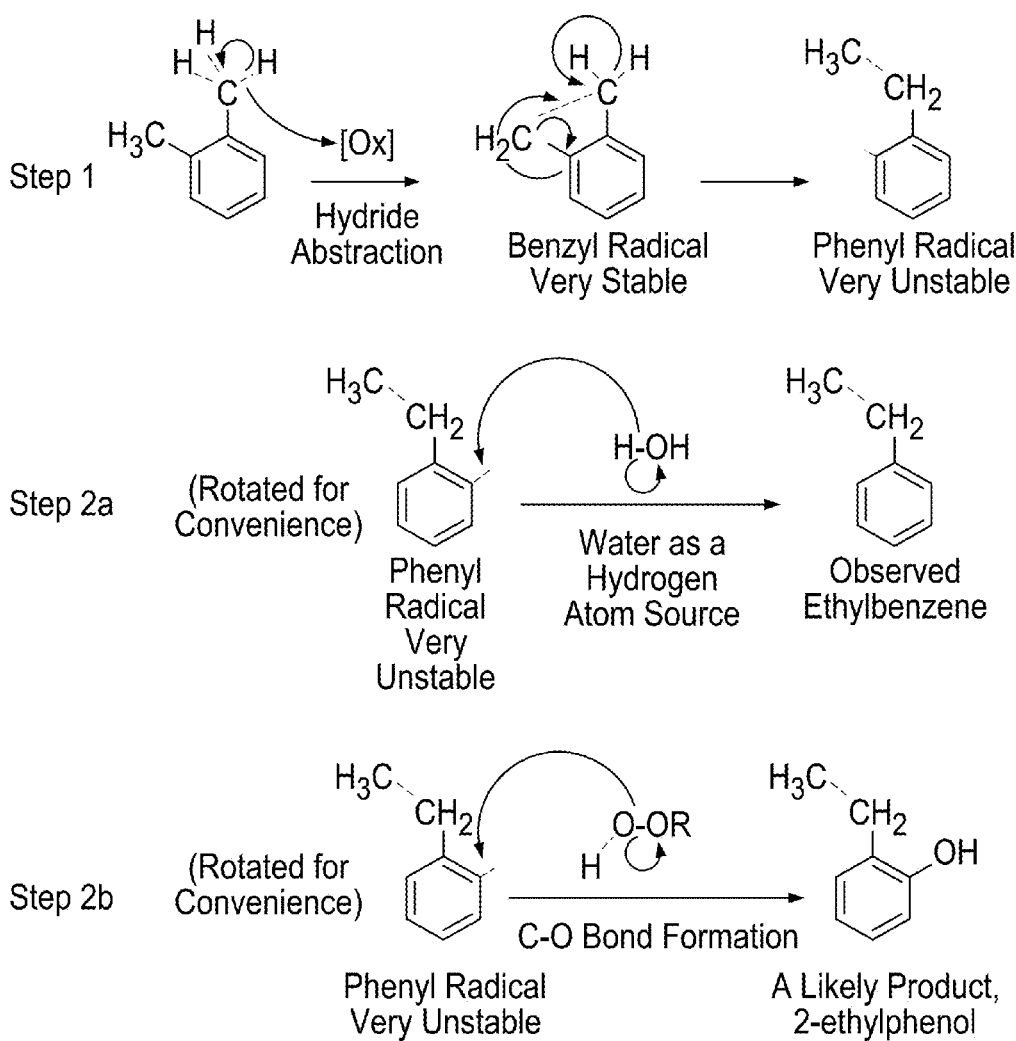
FIG. 30 provides treatment pathways to test these hypotheses regarding the treatment of VOCs.

A second laboratory experiment to be conduct for this additional site and future sites is the treatment of individual VOCs to determine if the decrease in some VOCs is causing an increase in other VOCs. As mentioned above, the transformation of trimethylbenzenes to dimethylbenzenes (i.e., xylenes) and methylbenzene (toluene) may be occurring from some treatments. Chemical transformation of xylene to ethylbenzene is also a possibility through a free radical reaction. From a chemical perspective, these types of reactions should not be occurring from an oxidative treatment. Nevertheless, this is what has been observed. Thus, to make sure these observations are not being confounded by treating contaminated water that contains a mixture of VOCs, tests can be performed to treat individual VOCs and determine if other VOCs are formed. For instance, would the treatment of 1,2,4-Trimethylbenzene result in the formation of xylene? Would treating xylene alone result in the formation of toluene or ethylbenzene? FIG. 30 provides treatment pathways to test these hypotheses regarding the treatment of VOCs. In particular, FIG. 30 depicts a radical oxidation of ortho-xylene to ethylbenzene and/or to 2-ethy/phenol, where [Ox]=oxidant (permanganate or persulfate).

Modeling Oxidant Candles Zone of Influence

Figure 31:
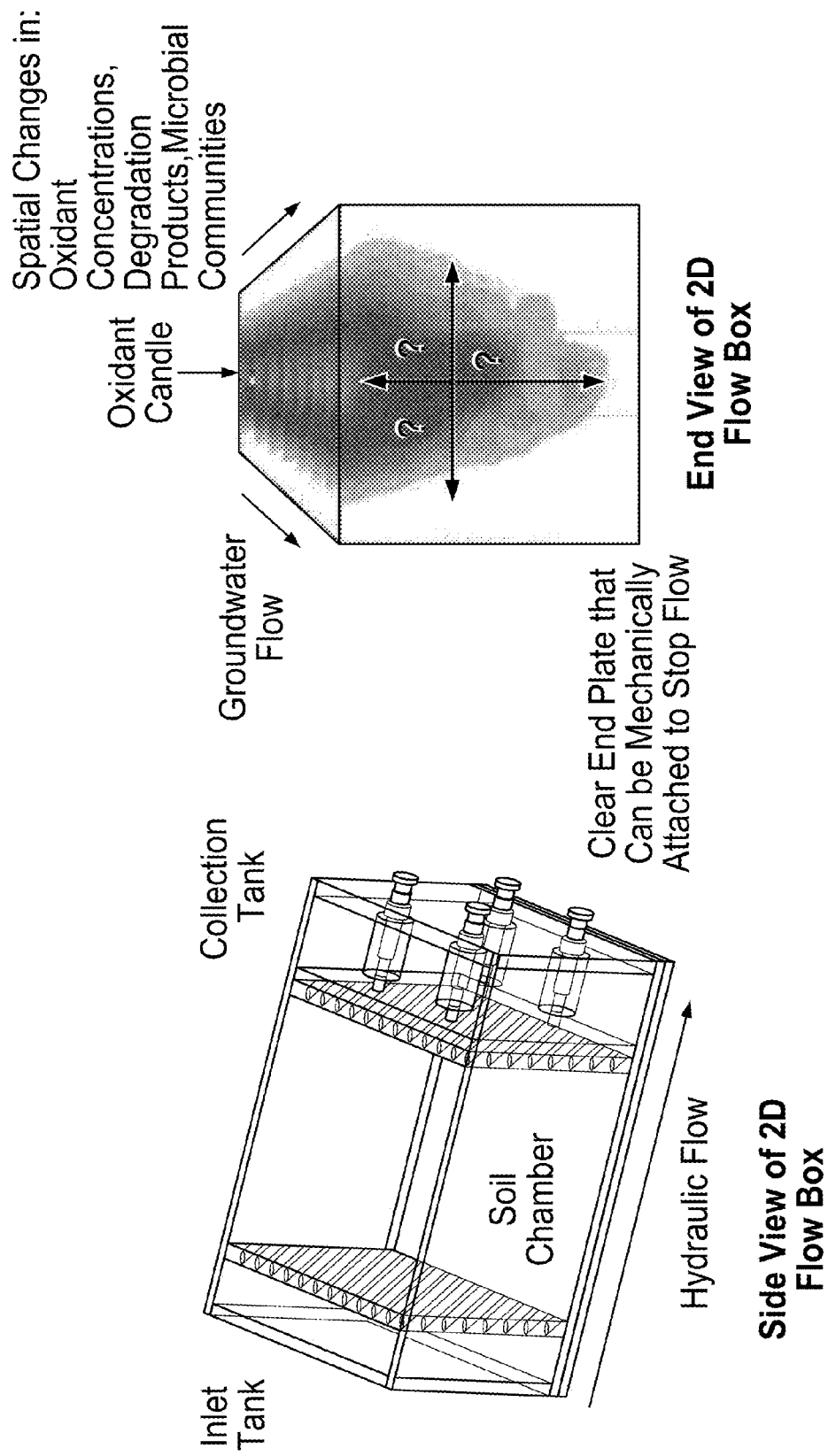
FIG. 31 depicts a side view of a schematic drawing of a 2D flow box and a projected end view of a 2D tank with permanganate candles.
Figure 32:
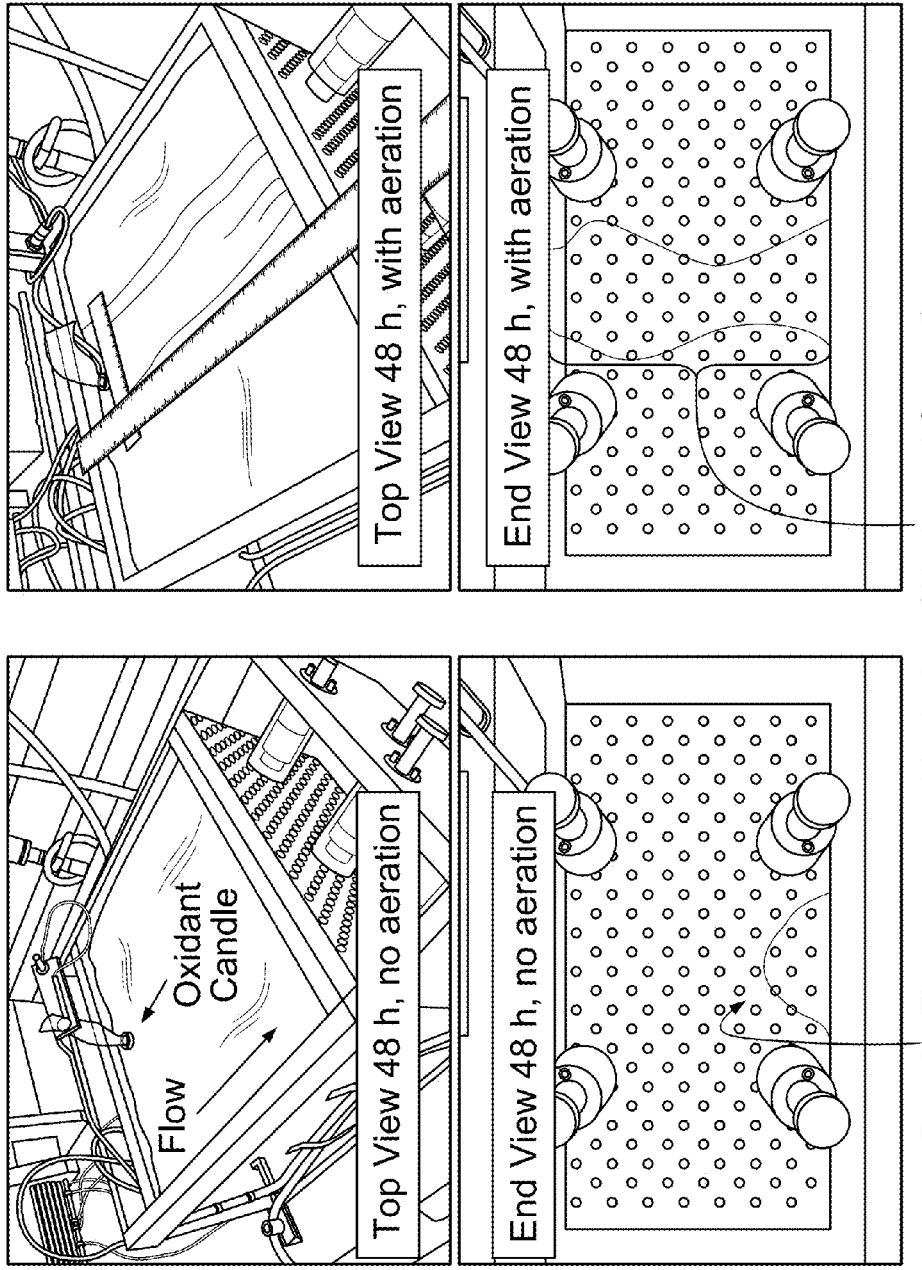
FIG. 32 depicts top and end view of an example 2D flow box during experimentation with and without aeration on miniature oxidant candles.

Quantifying and modeling how the aerators facilitate the horizontal spreading of the oxidant with advection can provide a variety of helpful insights, such as the spacing requirements of the candles in the field, which can be used for future technology cost projections. Such quantifying and modeling of horizontal oxidant spreading with advection may be accomplished, for example, using an open, wider groundwater flow model as the experimental unit, as depicted in FIGS. 31-32. In particular, FIG. 31 depicts a side view of a schematic drawing of a 2D flow box and a projected end view of a 2D tank with permanganate candles, and FIG. 32 depicts top and end view of an example 2D flow box during experimentation with and without aeration on miniature oxidant candles. Such open model is may be fabricated out of acrylic plates (i.e. transparent), which will allow for visualization of water and oxidant flow. Such a model can be packed with layers of soil to simulate various types of aquifers. Miniature candles with pneumatic circulator tips can be inserted into the groundwater flow model along with the slow-release oxidant candle. Quantifications of the effectiveness of the candles in dispersing the oxidant under a constant hydraulic gradient, with and without aeration, can be determined.

To acquire data on horizontal spreading, a wider 2D flow box can use a perforated plate on the outlet chamber that can be mechanically closed to temporarily stop flow, as depicted in FIGS. 31-32. The permanganate-colored water in the outlet chamber cab then be drained to reveal and photograph the lateral spreading of the oxidant in the soil chamber. Temporal data can be achieved by refilling the outlet tank with water and opening the perforated chamber so that flow can continue. Photographs of the oxidant plume emulating from the oxidant candle can be scanned and digitized such that the dimensions and area of the plume can be determined. By imposing various treatment parameters in the flow box (i.e., soil texture, multiple soil layers, linear velocity, aeration rate, and distance), the resulting oxidant plume measurements can be used in model development.

Another possibility is to install a set of nested wells at a site that has no contamination so that modeling can be performed on the distribution pattern of oxidants being released from the candles.

A three dimensional numerical model can be developed to simulate the radius of influences of slow-release candle with and without pneumatic circulators. Simulations can include a coupling of flow field with transport of the oxidant from the slow-release candles.

For the conditions without pneumatic circulators, saturated groundwater can be simulated using Darcy's Law combined with continuity equation, which can be implemented using the subsurface flow module of COMSOL multiphysics modeling and simulation software (e.g., COMSOL, Inc., Burlington, Mass.,). When pneumatic circulators are used, groundwater flow patterns close to the candle can be completely redirected due to the air-liquid mixing process (See FIGS. 31-32). Since the turbulent motion can have a great influence on the transport of the oxidant, a multiphase turbulence model can be used. Gas-liquid two-phase flow can be simulated based on the mass and momentum balance principles. Computational fluid dynamic (CFD) can be conducted with a simulation using the CFD module of COMSOL.

Transport of oxidant is controlled by advection, diffusion, dispersion, and reaction processes, which can be expressed as:

$$\frac{\partial(\theta C^k)}{\partial t} = \frac{\partial}{\partial x_i}\left(\theta D_{ij}\frac{\partial(C^k)}{\partial x_j}\right) - \frac{\partial}{\partial x_i}(\theta v_i C^k) + F_s^k + \sum R_n \quad (1)$$

where, $\theta$ is porosity of the subsurface medium, $C^k$ is the dissolved concentration of species k, t is time, $X_{ij}$ is distance along the respective Cartesian coordinate axis, $D_{ij}$ is hydrodynamic dispersion coefficient tensor, $v_{ij}$ is pore velocity, $F_s^k$ is the sink flux for species k, $\Sigma R_n$ is the chemical reaction term. Here, $v_i$ can be obtained from the flow simulation with or without pneumatic circulators. $F_s^k$, the oxidant release flux, can be obtained from the experiments.

The numerical model can be applied to simulate the experiments conducted using the wider 2D tank (FIGS. 31-32). The architecture (width, height, area) of oxidant plumes generated down gradient from the oxidant candles can be validated by comparing model predictions with the experimentally measured values. The validated model can then be used to simulate the radius of influences in different related scenarios, such as varied soil texture (sands to silty clays), single versus multiple soil layers of varying hydraulic conductivity, hydraulic gradient, and aeration rate.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. In some cases, the actions recited in the claims can be performed in a different order and still achieve desirable results.

A number of implementations have been described. Nevertheless, it will be understood that various modifications may be made without departing from the spirit and scope of the invention. For example, the saturation controllers 204 and 206 can map the input x to the output s according to various functions. For example, where permanganate candles are described, persulfate may additionally or alternatively be used, and vice versa. In another example, components from tethered direct-push candle apparatuses may be used with and/or as substitutes for components in bundled direct-push candle apparatuses, and vice versa.

Accordingly, other implementations are within the scope of the following claims.

TABLE A1

Temporal Changes in Permanganate Concentrations in Monitoring Wells MW-1, MW-2, and MW-5. Oxidant Candles up gradient from these wells received air at T = 0 d.

Permanganate Concentrations
Sampling Dates and Days after Candle Installation

| Well-Depth (ft) | Jun. 4, 2014 8 d | Jun. 19, 2014 23 d | Jun. 26, 2014 30 d mg/L | Jul. 17, 2014 51 d | Jul. 24, 2014 58 d | Sep. 3, 2014 99 d |
|---|---|---|---|---|---|---|
| MW1-12 | 0.79 | 1.04 | 0.41 | 0.66 | 0.60 | 0.66 |
| MW1-18 | 1.29 | 1.18 | 0.38 | 0.61 | 0.55 | 0.44 |
| MW1-24 | 1.04 | 0.85 | 0.32 | 0.41 | 0.43 | 0.92 |
| MW2-12 | 2.60 | 1.45 | 0.12 | 0.50 | 0.30 | 0.42 |
| MW2-18 | 4.20 | 0.32 | 0.14 | 0.31 | 0.25 | 0.39 |
| MW2-24 | 6.58* | 2.15 | 0.16 | 0.38 | 0.17 | 1.08 |
| MW5-12 | 2.65 | 0.73 | 0.97 | 5.19 | 3.38 | 0.89 |
| MW5-18 | 2.63 | 0.88 | 1.02 | 2.80 | 2.23 | 0.65 |
| MW5-24 | 2.26 | 0.87 | 1.22 | 2.34 | 0.77 | 0.63 |

*Colored text indicates sample was visibly pink when obtained in the field.

TABLE A2

Temporal Changes in Permanganate Concentrations in Monitoring Wells MW-3, MW-4, and MW-6. Oxidant Candles up gradient from these wells started receiving air on Day 45.

Permanganate Concentrations
Sampling Dates and Days after Candle Installation

| Well-Depth (ft) | Jun. 4, 2014 8 d | Jun. 19, 2014 23 d | Jun. 26, 2014 30 d mg/L | Jul. 17, 2014 51 d | Jul. 24, 2014 58 d | Sep. 3, 2014 99 d |
|---|---|---|---|---|---|---|
| MW3-12 | 8.90 | 0.47 | 0.25 | 1.74 | 1.55 | 0.65 |
| MW3-18 | 9.12 | 0.90 | 0.46 | 0.62 | 0.31 | 4.29 |
| MW3-24 | 15.57 | 13.17 | 11.62 | 5.64 | 0.28 | 3.92 |
| MW4-12 | 13.08 | 1.47 | 0.16 | 0.63 | 0.33 | 0.61 |
| MW4-18 | 20.63 | 0.84 | 0.16 | 0.57 | 0.65 | 0.85 |
| MW4-24 | 44.56 | 0.76 | 0.13 | 0.58 | 0.84 | 0.57 |
| MW6-12 | 13.72 | 1.55 | 0.89 | 2.68 | 1.52 | 0.95 |
| MW6-18 | 18.08 | 0.75 | 0.83 | 1.05 | 1.03 | 0.82 |
| MW6-24 | 41.49 | 1.98 | 0.59 | 0.47 | 0.79 | 0.75 |

*Colored text indicates sample was visibly pink when obtained in the field.

TABLE A3

Temporal Changes in ORP Values in Monitoring Wells MW-1, MW-2, and MW-5. Oxidant Candles up gradient from the wells received air at T = 0 d.

Oxygen-Reduction Potentials
Sampling Dates and Days after Candle Installation

| Well-Depth (ft) | May 15, 2014 | Jun. 19, 2014 23 d | Jun. 26, 2014 30 d | Jul. 17, 2014 51 d mV | Jul. 24, 2014 58 d | Jul. 31, 2014 65 d | Sep. 3, 2014 99 d |
|---|---|---|---|---|---|---|---|
| MW1-12 | 13.4 | 146.8 | 138.3 | 101.5 | 63.0 | 86.5 | 76.1 |
| MW1-18 | | 183.8 | 175.4 | 109.9 | 78.9 | | 113.0 |
| MW1-24 | | 204.7 | 265.7 | 96.7 | 84.6 | | 529.3 |
| MW2-12 | 1.5 | 136.4 | 209.8 | 79.3 | 70.5 | 85.4 | 331.6 |
| MW2-18 | | 280.3 | 207.9 | 101.1 | 74.0 | | 405.3 |
| MW2-24 | | 545.8 | 212.0 | 49.9 | 83.4 | | 529.7 |
| MW5-12 | 17.9 | 31.1 | 29.4 | 105.0 | −132.2 | −150.7 | −222.0 |

TABLE A3-continued

Temporal Changes in ORP Values in Monitoring Wells MW-1, MW-2, and MW-5. Oxidant Candles up gradient from the wells received air at T = 0 d.

| | | | Oxygen-Reduction Potentials Sampling Dates and Days after Candle Installation | | | | |
|---|---|---|---|---|---|---|---|
| Well-Depth (ft) | May 15, 2014 | Jun. 19, 2014 23 d | Jun. 26, 2014 30 d | Jul. 17, 2014 51 d mV | Jul. 24, 2014 58 d | Jul. 31, 2014 65 d | Sep. 3, 2014 99 d |
| MW5-18 | | 11.8 | 36.2 | −99.4 | −119.2 | | −186.9 |
| MW5-24 | | −6.5 | −5.8 | −96.5 | −100.5 | | −195.2 |

TABLE A4

Temporal Changes in ORP Values in Monitoring Wells MW-3, MW-4, and MW-6. Oxidant Candles up gradient from these wells started receiving air on Day 45.

| | | | Oxygen-Reduction Potentials Sampling Dates and Days After Candle Installation | | | | |
|---|---|---|---|---|---|---|---|
| Well-Depth (ft) | May 15, 2014 | Jun. 19, 2014 23 d | Jun. 26, 2014 30 d | Jul. 17, 2014 51 d mV | Jul. 24, 2014 58 d | Jul. 31, 2014 65 d | Sep. 3, 2014 99 d |
| MW3-12 | 50.2 | 51.7 | −26.2 | −103.3 | −100.4 | −105.0 | −37.5 |
| MW3-18 | | 416.7 | 408.9 | −5.0 | −78.0 | | 541.9 |
| MW3-24 | | 578.8 | 556.3 | 515.9 | 6.9 | | 568.3 |
| MW4-12 | −59.2 | 180.0 | 438.5 | 346.1 | 13.9 | 4.8 | 374.5 |
| MW4-18 | | 64.1 | 403.0 | 282.3 | 459.6 | | 347.0 |
| MW4-24 | | 70.6 | 379.4 | 263.6 | 452.4 | | 328.7 |
| MW6-12 | −9.6 | −27.0 | 35.6 | −92.6 | −100.4 | −99.6 | 14.6 |
| MW6-18 | | 72.6 | −1.5 | −61.8 | −48.2 | | −79.2 |
| MW6-24 | | 233.5 | 81.6 | −25.4 | −27.4 | | −90.8 |

TABLE A5

Temporal Changes in Dissolved Oxygen in Monitoring Wells MW-1, MW-2, and MW-5. Oxidant Candles up gradient from these wells received air at T = 0 d.

| | | | Dissolved Oxygen Concentrations Sampling Dates and Days after Candle Installation | | | | |
|---|---|---|---|---|---|---|---|
| Well-Depth (ft) | May 15, 2014 | Jun. 19, 2014 23 d | Jun. 26, 2014 30 d | Jul. 17, 2014 51 d mg/L | Jul. 24, 2014 58 d | Jul. 31, 2014 65 d | Sep. 3, 2014 99 d |
| MW1-12 | 3.20 | 4.40 | 10.32 | 6.04 | 4.69 | 6.78 | 5.60 |
| MW1-18 | | 4.00 | 9.23 | 4.72 | 5.01 | | 3.28 |
| MW1-24 | | 3.27 | 7.65 | 3.38 | 3.76 | | 2.41 |
| MW2-12 | 2.80 | 8.29 | 9.41 | 5.97 | 6.12 | 9.28 | 7.20 |
| MW2-18 | | 4.45 | 8.71 | 6.46 | 5.95 | | 5.77 |
| MW2-24 | | 4.80 | 9.27 | 2.96 | 4.29 | | |
| MW5-12 | 0.30 | 0.94 | 4.48 | 1.15 | 0.59 | 1.10 | 0.72 |
| MW5-18 | | 0.65 | 1.15 | 0.81 | 0.44 | | 0.58 |
| MW5-24 | | 0.56 | 0.37 | 3.70 | 0.79 | | 0.30 |

TABLE A6

Temporal Changes in Dissolved Oxygen in Monitoring Wells MW-3, MW-4, and MW-6. Oxidant Candles up gradient from these wells started receiving air on Day 45.

| | | | Dissolved Oxygen Concentrations Sampling Dates and Days After Candle Installation | | | | |
|---|---|---|---|---|---|---|---|
| Well-Depth (ft) | May 15, 2014 | Jun. 19, 2014 23 d | Jun. 26, 2014 30 d | Jul. 17, 2014 51 d mg/L | Jul. 24, 2014 58 d | Jul. 31, 2014 65 d | Sep. 3, 2014 99 d |
| MW3-12 | 0.42 | 0.48 | 0.61 | 0.33 | 0.30 | 0.30 | 0.51 |
| MW3-18 | | 0.54 | 1.09 | 0.43 | 0.34 | | 0.40 |
| MW3-24 | | 0.46 | 0.94 | 0.67 | 0.42 | | 0.39 |

TABLE A6-continued

Temporal Changes in Dissolved Oxygen in Monitoring Wells MW-3, MW-4, and MW-6. Oxidant Candles up gradient from these wells started receiving air on Day 45.

Dissolved Oxygen Concentrations
Sampling Dates and Days After Candle Installation

| Well-Depth (ft) | May 15, 2014 | Jun. 19, 2014 23 d | Jun. 26, 2014 30 d | Jul. 17, 2014 51 d mg/L | Jul. 24, 2014 58 d | Jul. 31, 2014 65 d | Sep. 3, 2014 99 d |
|---|---|---|---|---|---|---|---|
| MW4-12 | 0.26 | 0.40 | 2.78 | 5.61 | 3.66 | 6.30 | 7.58 |
| MW4-18 |  | 0.33 | 2.96 | 5.60 | 2.05 |  | 3.08 |
| MW4-24 |  | 0.40 | 1.73 | 4.22 | 1.36 |  | 1.38 |
| MW6-12 | 0.26 | 0.43 | 0.30 | 0.32 | 0.25 | 0.46 | 0.65 |
| MW6-18 |  | 0.36 | 0.27 | 0.56 | 1.06 |  | 0.31 |
| MW6-24 |  | 0.39 | 0.30 | 0.58 | 1.02 |  | 0.30 |

TABLE A7

Temporal Changes Conductivity in Monitoring Wells.

| Well-Depth | May 15, 2014 | Jun. 19, 2014 | Jun. 26, 2014 | Jul. 3, 2014 | Jul. 17, 2014 | Jul. 24, 2014 | Jul. 31, 2014 | Sep. 3, 2014 |
|---|---|---|---|---|---|---|---|---|
| MW1-12 | 0.866 | 0.917 | 0.917 | 0.960 | 1.097 | 0.923 | 0.778 | 0.855 |
| MW1-18 |  | 0.932 | 0.916 | 0.975 | 1.082 | 0.913 |  | 0.796 |
| MW1-24 |  | 0.935 | 0.925 | 0.988 | 1.044 | 0.904 |  | 0.706 |
| MW2-12 | 0.859 | 0.975 | 0.939 | 0.915 | 0.873 | 0.808 | 0.709 | 0.830 |
| MW2-18 |  | 0.983 | 0.948 | 0.949 | 0.867 | 0.785 |  | 0.672 |
| MW2-24 |  | 0.992 | 0.943 | 0.940 | 0.855 | 0.765 |  | 0.560 |
| MW5-12 | 0.832 | 0.904 | 1.007 | 1.051 | 1.053 | 1.033 | 0.965 | 0.998 |
| MW5-18 |  | 0.907 | 1.005 | 1.028 | 1.033 | 0.962 |  | 0.813 |
| MW5-24 |  | 0.908 | 1.002 | 1.054 | 1.009 | 0.918 |  | 0.746 |
| MW3-12 | 0.800 | 1.018 | 0.969 | 1.010 | 0.953 | 0.817 | 0.695 | 1.010 |
| MW3-18 |  | 0.983 | 0.958 | 0.989 | 0.887 | 0.774 |  | 0.828 |
| MW3-24 |  | 0.953 | 0.957 | 0.983 | 0.839 | 0.739 |  | 0.683 |
| MW4-12 | 0.892 | 1.235 | 1.159 | 1.042 | 0.910 | 0.760 | 0.864 | 0.736 |
| MW4-18 |  | 1.128 | 1.083 | 1.058 | 0.903 | 0.729 |  | 0.684 |
| MW4-24 |  | 0.988 | 0.975 | 1.013 | 0.852 | 0.723 |  | 0.719 |
| MW6-12 | 0.888 | 0.808 | 0.956 | 0.920 | 0.954 | 0.865 | 0.802 | 0.901 |
| MW6-18 |  | 0.898 | 0.964 | 0.971 | 0.931 | 0.862 |  | 0.820 |
| MW6-24 |  | 0.895 | 0.940 | 0.960 | 0.887 | 0.822 |  | 0.688 |
| Averages | 0.856 | 0.964 | 0.976 | 0.989 | 0.946 | 0.839 | 0.802 | 0.780 |

TABLE A8

Temporal Changes pH in Monitoring Wells.

| Well-Depth | May 15, 2014 | Jun. 19, 2014 | Jun. 26, 2014 | Jul. 3, 2014 | Jul. 17, 2014 | Jul. 24, 2014 | Jul. 31, 2014 | Sep. 3, 2014 |
|---|---|---|---|---|---|---|---|---|
| MW1-12 | 6.00 | 6.18 | 6.91 | 6.39 | 6.64 | 6.95 | 6.62 | 6.63 |
| MW1-18 |  | 6.31 | 6.99 | 6.63 | 6.56 | 6.93 |  | 6.38 |
| MW1-24 |  | 6.51 | 6.76 | 6.49 | 6.65 | 6.79 |  | 6.40 |
| MW2-12 | 6.25 | 6.71 | 7.19 | 6.91 | 7.08 | 7.19 | 7.17 | 7.45 |
| MW2-18 |  | 6.59 | 7.06 | 6.66 | 6.99 | 7.11 |  | 6.98 |
| MW2-24 |  | 6.52 | 7.03 | 6.55 | 6.85 | 6.88 |  | 6.73 |
| MW5-12 | 6.24 | 6.48 | 6.68 | 6.54 | 6.57 | 6.54 | 6.63 | 6.60 |
| MW5-18 |  | 6.44 | 6.58 | 6.54 | 6.60 | 6.63 |  | 6.56 |
| MW5-24 |  | 6.42 | 6.55 | 6.49 | 6.52 | 6.61 |  | 6.52 |
| MW3-12 | 6.57 | 6.54 | 6.72 | 6.44 | 6.52 | 6.56 | 6.56 | 6.71 |
| MW3-18 |  | 6.42 | 6.59 | 6.38 | 6.49 | 6.47 |  | 6.60 |
| MW3-24 |  | 6.36 | 6.47 | 6.40 | 6.46 | 6.43 |  | 6.53 |
| MW4-12 | 6.31 | 6.54 | 6.65 | 6.80 | 7.30 | 7.23 | 7.40 | 7.01 |
| MW4-18 |  | 6.52 | 6.67 | 6.55 | 7.04 | 6.65 |  | 6.63 |
| MW4-24 |  | 6.40 | 6.38 | 6.35 | 6.70 | 6.36 |  | 6.42 |
| MW6-12 | 6.30 | 6.46 | 6.57 | 6.36 | 6.54 | 6.59 | 6.62 | 6.87 |
| MW6-18 |  | 6.41 | 6.52 | 6.37 | 6.50 | 6.53 |  | 6.71 |
| MW6-24 |  | 6.34 | 6.38 | 6.39 | 6.39 | 6.49 |  | 6.63 |
| Averages | 6.28 | 6.45 | 6.70 | 6.51 | 6.69 | 6.72 | 6.83 | 6.69 |

What is claimed is:

1. A direct-push oxidant candle apparatus for the treatment of contaminated groundwater through direct-push installation methods, the apparatus comprising:
 a drive tip positioned at a bottom end of the apparatus, the drive tip having one or more front surfaces that are shaped to create a bore as force is applied to an opposite base surface of the drive tip;
 a structural pathway that is connected to and extends upwardly from the base surface of the drive tip;
 one or more oxidant delivery devices that are enclosed within the structural pathway; and
 one or more fluid supply lines that extend from one or more locations outside of the bore and that terminate at or near a bottom end of the structural pathway so that fluid supplied through the fluid supply lines travels through the structural pathway and along the one or more oxidant delivery devices.

2. The apparatus of claim 1, further comprising:
 a bracket with a front end that abuts, at least a portion of, the base surface of the drive tip and one or more arms that generally extend opposite a direction of the force that is being applied to the drive tip, the one or more arms of the bracket each defining a plurality of apertures,
 wherein the one or more fluid supply lines are each threaded through the apertures of one of the one or more arms of the bracket.

3. The apparatus of claim 2, further comprising:
 one or more shield components that extend around at least a portion of the one or more arms of the bracket so as to protect the fluid supply lines threaded through the one or more arms.

4. The apparatus of claim 3, wherein the one or more shield components emanate from between the base surface of the drive tip and the front end of the bracket, and terminate with a portion that flares laterally outward so as to form an anchor that prevents the drive tip from being retracted.

5. The apparatus of claim 2, wherein the arms of the bracket and the one or more fluid supply lines extend outside of a drive-rod that encloses the structural pathway.

6. The apparatus of claim 1, wherein the one or more fluid supply lines are enclosed within the structural path.

7. The apparatus of claim 6, wherein the one or more oxidant delivery devices each define one or more apertures through which the one or more fluid supply lines extend.

8. The apparatus of claim 6, wherein the one or more fluid supply lines and the structural pathway are enclosed within a drive-rod that applies the force to the base surface of the drive tip.

9. The apparatus of claim 6, further comprising:
 one or more anchor components that emanate from the base surface of the drive tip and terminate with a portion that flares laterally outward so as to form an anchor that prevents the drive tip from being retracted.

10. The apparatus of claim 1, wherein the one or more oxidant delivery devices comprise one or more oxidant candles.

11. The apparatus of claim 10, wherein the one or more oxidant candles comprise one or more permanganate candles.

12. The apparatus of claim 10, wherein the one or more oxidant candles comprise one or more persulfate candles.

13. The apparatus of claim 1, wherein the structural pathway comprises a conduit.

14. The apparatus of claim 13, wherein the conduit defines holes along one or more sides of the conduit that expose, at least a portion of, the one or more oxidant delivery devices to media surrounding the conduit.

15. A system for the treatment of contaminated groundwater at a site, the system comprising:
 an elongated air chamber that is positioned below ground at the site, the elongated air chamber extending from a first depth to a second depth below the ground;
 a structural pathway that is positioned in the elongated air chamber;
 one or more oxidant delivery devices that are enclosed within the structural pathway, the one or more oxidant delivery devices extending from the first depth to a third depth that is between the first depth and the second depth;
 one or more fluid supply lines that extend from one or more locations outside of the elongated air chamber and that terminate at or near a bottom end of the structural pathway so that fluid supplied through the fluid supply lines travels through the elongated air chamber and along the one or more oxidant delivery devices;
 a first type of fill material surrounding a bottom potion of the elongated air chamber, the first type of fill material being porous so as to permit the groundwater to interact with the one or more oxidant delivery devices; and
 a second type of fill material surrounding a top portion of the elongated air chamber, the second type of fill material being non-porous so as to create a seal around the top of the elongated air chamber.

16. The system of claim 15, further comprising:
 one or more exhaust lines that extend from a top of the structural pathway to one or more positions outside of the elongated air chamber, the one or more exhaust lines venting the fluid introduced into the structural pathway.

17. The system of claim 16, further comprising:
 a removal mechanism affixed to the top of the structural pathway that is configured to permit removal of the structural pathway with the one or more oxidant delivery devices from within the elongated air chamber.

18. The system of claim 15, wherein the elongated air chamber and the structural pathway each include perforations along their sidewalls so as to permit the groundwater to interact with the one or more oxidant delivery devices.

19. The system of claim 15, further comprising:
 a locator device that is embedded within and extends above the second type of fill material, the locator device providing identification for the elongated air chamber at the site.

20. The system of claim 15, wherein the bottom portion of the elongated air chamber extends above the third depth so that the one or more oxidant delivery devices are surrounded by only the first type of fill material.

* * * * *

UNITED STATES PATENT AND TRADEMARK OFFICE
CERTIFICATE OF CORRECTION

PATENT NO. : 9,925,574 B2
APPLICATION NO. : 15/086532
DATED : March 27, 2018
INVENTOR(S) : Mark Christenson and Steven Douglas Comfort Page 1 of 1

It is certified that error appears in the above-identified patent and that said Letters Patent is hereby corrected as shown below:

In the Specification

In Column 1 Lines 13-18, please delete "The disclosed technology was made with government support under a Small Technology Transfer grant (No. IR41ES22530-1A1) awarded by the National Institute of Health and a matching grant from the Nebraska department of Economic Development. The government has certain rights in the technology" and replace with --This invention was made with government support under R41 ES225301 awarded by the National Institutes of Health. The government has certain rights in the invention--

In the Claims

In Column 32 Line 29, in Claim 15, delete "potion" and insert --portion--, therefor Signed and Sealed this
Twelfth Day of January, 2021

Andrei Iancu
*Director of the United States Patent and Trademark Office*